United States Patent
Balzer et al.

(10) Patent No.: US 11,925,953 B2
(45) Date of Patent: Mar. 12, 2024

(54) FOAM GENERATING DEVICE

(71) Applicant: Sonny's HFI Holdings, LLC, Wilmington, DE (US)

(72) Inventors: Derek Balzer, Apple Valley, MN (US); Daniel Folk, River Falls, WI (US); Peter Schuller, Elko, MN (US); Daniel Paul Longhenry, Bloomington, MN (US)

(73) Assignee: Sonny's HFI Holdings, LLC, Wilmington, DE (US)

( * ) Notice: Subject to any disclaimer, the term of this patent is extended or adjusted under 35 U.S.C. 154(b) by 150 days.

(21) Appl. No.: 17/690,487

(22) Filed: Mar. 9, 2022

(65) Prior Publication Data
US 2022/0288612 A1 Sep. 15, 2022

Related U.S. Application Data

(60) Provisional application No. 63/161,063, filed on Mar. 15, 2021.

(51) Int. Cl.
*B05B 7/00* (2006.01)
*B05B 12/00* (2018.01)
(Continued)

(52) U.S. Cl.
CPC .......... *B05B 7/0025* (2013.01); *B05B 12/008* (2013.01); *B05B 12/02* (2013.01); *B05B 12/087* (2013.01); *B60S 3/042* (2013.01)

(58) Field of Classification Search
CPC ..... B05B 7/0025; B05B 12/008; B05B 12/02; B05B 12/087; B05B 3/003; B60S 3/042;
(Continued)

(56) References Cited

U.S. PATENT DOCUMENTS 2,021,079 A    11/1935   Mittendorf et al.
2,118,290 A    5/1938    Black
(Continued)

FOREIGN PATENT DOCUMENTS

EP     0076451 A1     4/1983
WO     2019018637 A1  1/2019

OTHER PUBLICATIONS

International Search Report and Written Opinion dated Sep. 1, 2022 in connection with International Patent Application No. PCT/US2022/019509, 16 pages.

(Continued)

*Primary Examiner* — Vishal Pancholi
(74) *Attorney, Agent, or Firm* — Dorsey & Whitney LLP

(57) ABSTRACT

A foam generating device includes a housing defining an agitation chamber and a conditioning chamber. A cartridge assembly arranged within the agitation chamber defines an agitation flow path of the solution to increase a quantity of a gas in the solution. A conditioning assembly arranged within the conditioning chamber defines a tortuous flow path for the solution including a plurality of cylindrical discs configured to sequentially receive the solution. Each of the discs defines a plurality of radial ribs on a first side and on a second side opposite the first side, the first and second sides separated by a floor, and a disc passage defined in the floor. The conditioning assembly is adjustable in order to selectively define the tortuous flow path with a first quantity of radial ribs and second quantity of radial ribs in order to alter the aeration of the solution along the tortuous path.

15 Claims, 27 Drawing Sheets

(51) Int. Cl.
*B05B 12/02* (2006.01)
*B05B 12/08* (2006.01)
*B60S 3/04* (2006.01)

(58) Field of Classification Search
CPC ............ B01F 25/4233; B01F 25/45221; B01F 23/235
See application file for complete search history.

(56) References Cited

U.S. PATENT DOCUMENTS

| | | |
|---|---|---|
| 2,118,295 A | 5/1938 | Crawford et al. |
| 2,236,084 A | 3/1941 | Brown |
| 2,506,179 A | 5/1950 | Taplin |
| 2,706,108 A | 4/1955 | Miner |
| 2,833,311 A | 5/1958 | Gaetano |
| 2,850,038 A | 9/1958 | Shabaker |
| 3,190,618 A | 6/1965 | Raphael |
| 3,323,550 A | 6/1967 | Lee |
| 3,375,855 A | 4/1968 | Deeks |
| 3,377,139 A | 4/1968 | MacGregor et al. |
| 3,386,458 A | 6/1968 | Wasserman et al. |
| 3,388,868 A | 6/1968 | Watson et al. |
| 3,532,126 A | 10/1970 | Boothe |
| 3,532,127 A | 10/1970 | Vogelsang et al. |
| 3,608,571 A | 9/1971 | Wilcox |
| 3,730,440 A | 5/1973 | Parkison |
| 3,744,762 A | 7/1973 | Schlicht |
| 3,791,587 A | 2/1974 | Drori |
| 3,806,097 A | 4/1974 | Devellian et al. |
| 3,941,355 A | 3/1976 | Simpson |
| 3,998,427 A | 12/1976 | Bentley |
| 4,069,976 A | 1/1978 | Chauvigne |
| 4,226,368 A | 10/1980 | Hunter |
| 4,253,608 A | 3/1981 | Hunter |
| 4,267,045 A | 5/1981 | Hoof |
| 4,514,095 A | 4/1985 | Ehrfeld et al. |
| 4,738,665 A | 4/1988 | Shepard |
| 4,869,849 A | 9/1989 | Hirose et al. |
| 4,917,687 A | 4/1990 | Oboyle |
| 5,005,604 A | 4/1991 | Aslanian |
| 5,036,880 A | 8/1991 | Safford et al. |
| 5,098,021 A | 3/1992 | Kah |
| 5,160,086 A | 11/1992 | Kuykendal et al. |
| 5,169,065 A | 12/1992 | Bloch |
| 5,213,260 A | 5/1993 | Tonkinson |
| 5,287,891 A | 2/1994 | Bourlon |
| 5,404,957 A | 4/1995 | McCormack |
| 5,887,977 A | 3/1999 | Morikawa |
| 6,095,196 A | 8/2000 | McCarty et al. |
| 6,238,081 B1 | 5/2001 | Sand |
| 6,244,297 B1 | 6/2001 | Baumann |
| 6,273,512 B1 | 8/2001 | Rajewski |
| 6,460,734 B1 | 10/2002 | Schroeder et al. |
| 6,471,146 B1 | 10/2002 | Kuykendal et al. |
| 7,520,661 B1 | 4/2009 | Lawson |
| 7,789,108 B1 | 9/2010 | Lawson |
| 7,909,502 B2 | 3/2011 | Ehrfeld et al. |
| 8,022,485 B2 | 9/2011 | Davies |
| 8,439,282 B2 | 5/2013 | Allen et al. |
| 8,500,042 B2 | 8/2013 | Brown et al. |
| 8,544,567 B2 | 10/2013 | Comeau et al. |
| 8,740,450 B2 | 6/2014 | Mogami et al. |
| 8,925,443 B2 | 1/2015 | Agarwal et al. |
| 9,132,393 B1 | 9/2015 | Ross |
| 9,258,949 B2 | 2/2016 | Nourian |
| 9,370,754 B2 | 6/2016 | McClimond |
| 9,433,954 B2 | 9/2016 | Analetto et al. |
| 9,561,481 B2 | 2/2017 | Schlueter et al. |
| 9,714,010 B2 | 7/2017 | Fazio et al. |
| 9,731,303 B2 | 8/2017 | Harris et al. |
| 9,943,815 B2 | 4/2018 | Matsumoto et al. |
| 10,589,236 B2 | 3/2020 | Mochizuki |
| 2001/0015231 A1 | 8/2001 | Sand |
| 2001/0054515 A1 | 12/2001 | Eddison et al. |
| 2003/0039169 A1 | 2/2003 | Ehrfeld et al. |
| 2003/0209611 A1 | 11/2003 | Harris et al. |
| 2003/0212149 A1 | 11/2003 | Grundmann et al. |
| 2004/0182436 A1 | 9/2004 | Graham |
| 2005/0104024 A1 | 5/2005 | Oliver |
| 2010/0276820 A1 | 11/2010 | Mogami et al. |
| 2012/0018218 A1 | 1/2012 | Rosenhauch |
| 2013/0025169 A1 | 1/2013 | McCarty et al. |
| 2013/0128688 A1 | 5/2013 | Doolin et al. |
| 2014/0042245 A1 | 2/2014 | Buckner |
| 2014/0291873 A1 | 10/2014 | McClimond |
| 2015/0137017 A1 | 5/2015 | Ambrosina et al. |
| 2015/0184806 A1 | 7/2015 | Beg et al. |
| 2015/0273489 A1 | 10/2015 | Harris et al. |
| 2018/0304285 A1 | 10/2018 | McClimond |
| 2019/0022607 A1 | 1/2019 | Flood |
| 2021/0252531 A1 | 8/2021 | Boily |
| 2021/0316258 A1 | 10/2021 | Folk et al. |
| 2021/0346895 A1 | 11/2021 | Schuller et al. |
| 2021/0354097 A1 | 11/2021 | Flood |
| 2023/0226505 A1 | 7/2023 | Folk et al. |

OTHER PUBLICATIONS

International Search Report and Written Opinion dated Aug. 10, 2021 in connection with International Patent Application No. PCT/US2021/031339, 12 pages.

International Preliminary Report on Patentability received for International Patent Application No. PCT/US2018/042879, dated Jan. 30, 2020.

International Search Report and Written Opinion received for International Application No. PCT/US2018/042879, dated Oct. 12, 2018.

Preliminary Office Action dated Apr. 20, 2022 in connection with Brazilian patent application No. BR112020001161-4, 7 pages including English translation.

Examination Report dated Oct. 4, 2021 in connection with European patent application No. 18750054.1, 7 pages.

Examination Report dated Nov. 16, 2020 in connection with European patent application No. 18750054.1, 7 pages.

Examination Report dated Apr. 13, 2021 in connection with European patent application No. 18750054.1, 10 pages.

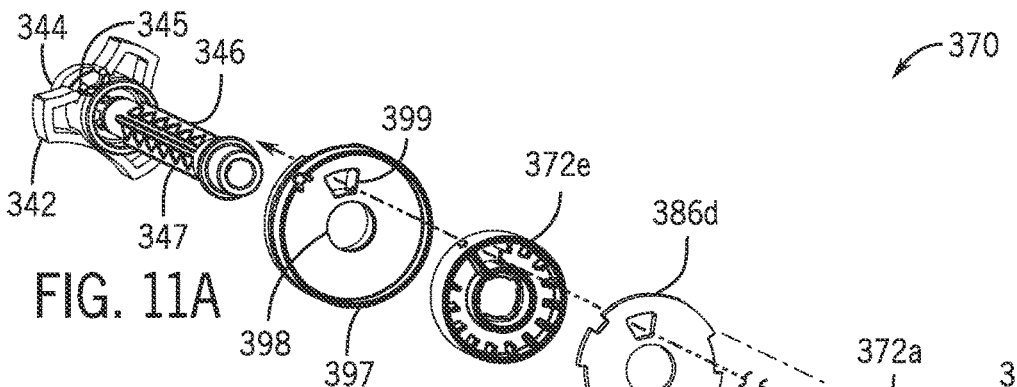
FIG. 11A
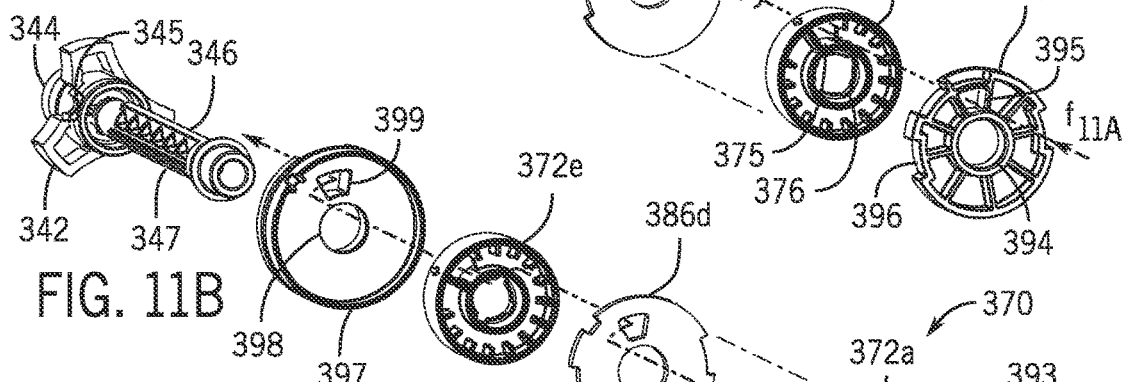
FIG. 11B
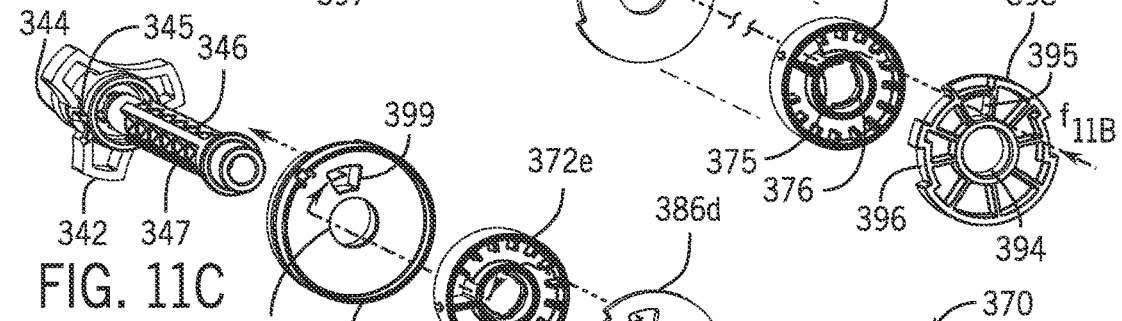
FIG. 11C
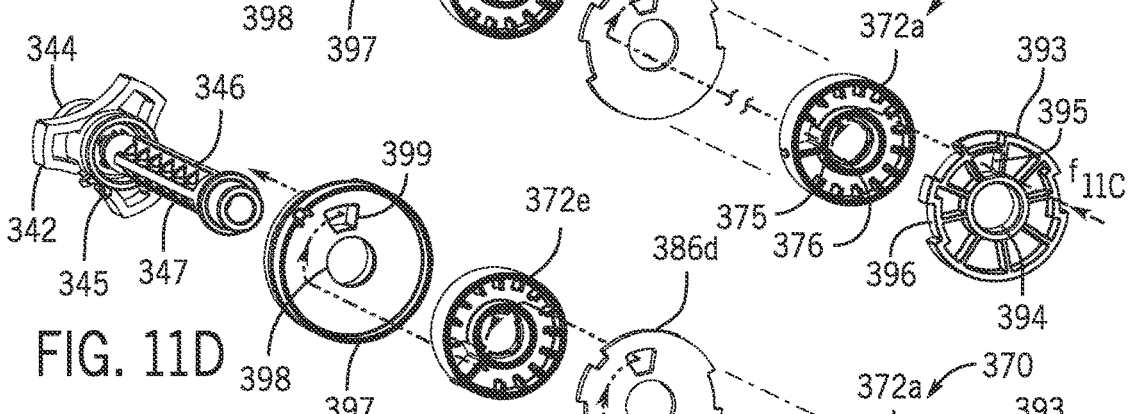
FIG. 11D
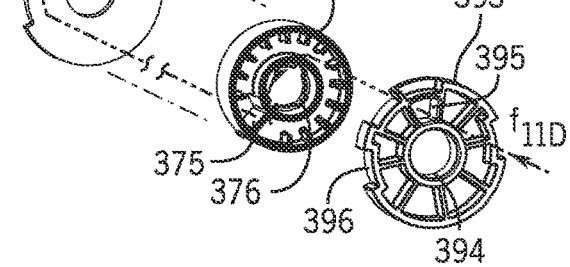

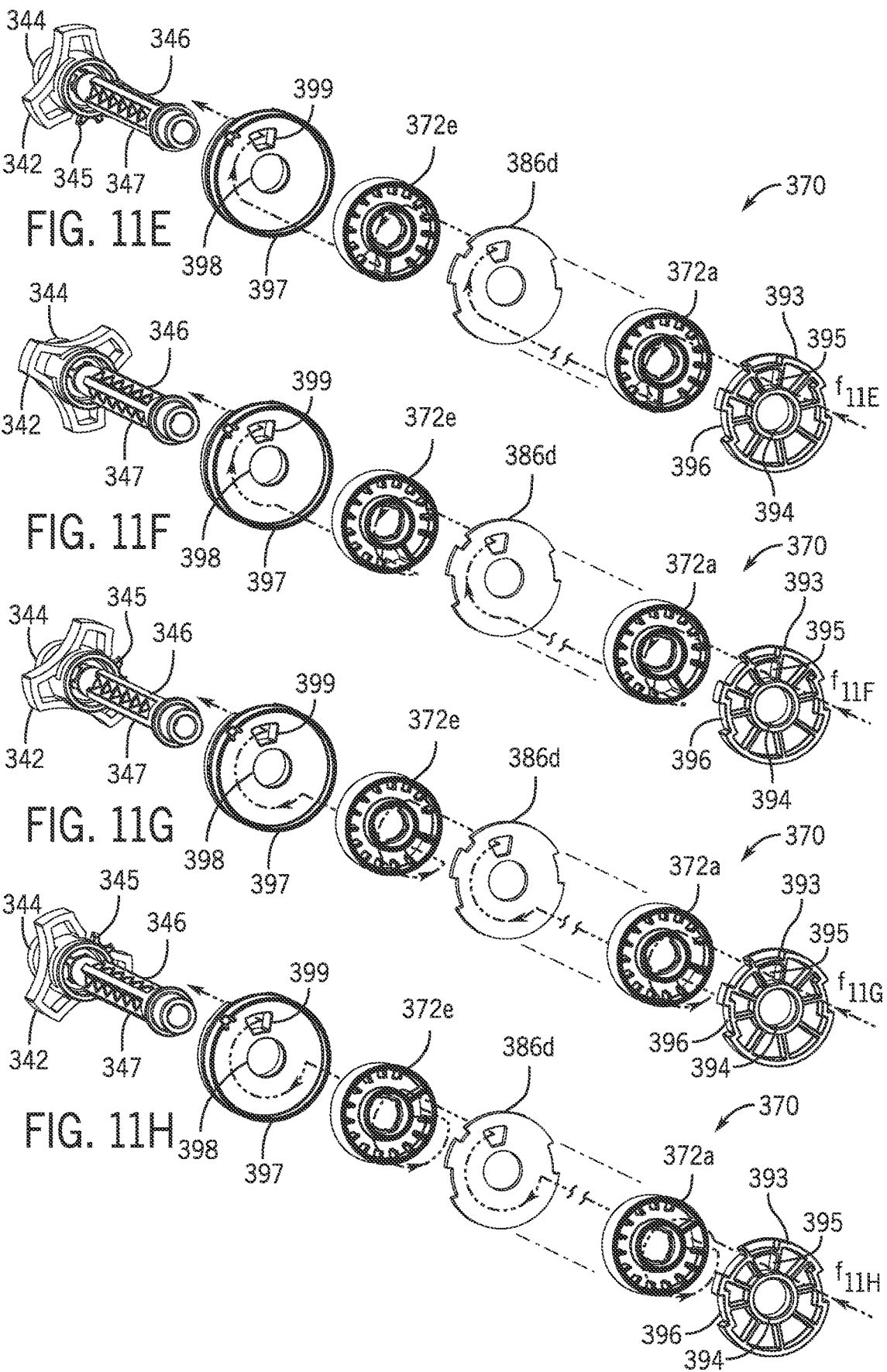

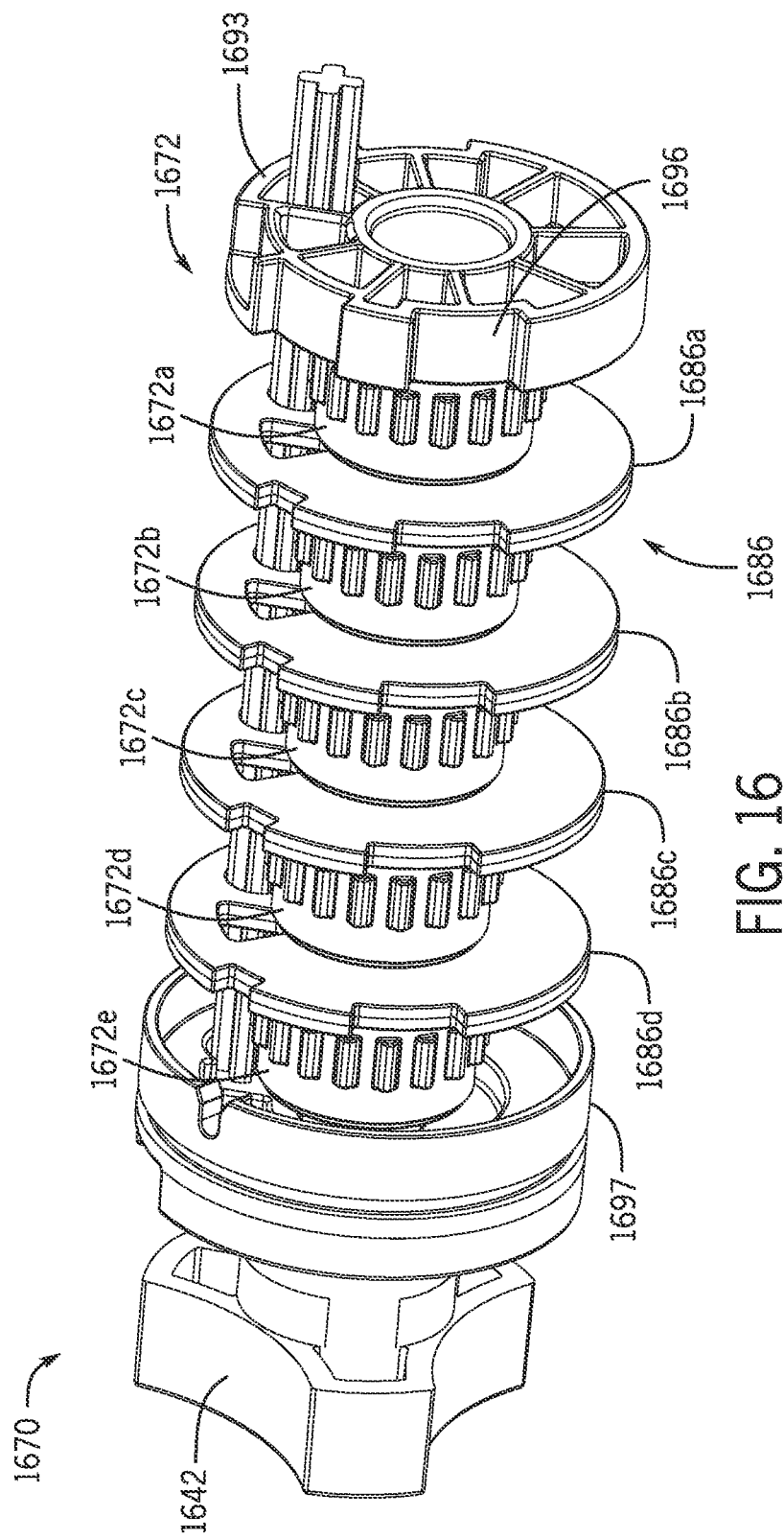

FOAM GENERATING DEVICE

CROSS-REFERENCE TO RELATED APPLICATIONS

This application claims priority to U.S. Provisional Patent Application No. 63/161,063 filed Mar. 15, 2021, entitled "FOAM GENERATING DEVICE," which is incorporated by reference herein, in the entirety and for all purposes.

FIELD

Disclosed are foam generating devices for use in applying foams to objects such as vehicles in vehicle washing.

BACKGROUND

Application of foams to objects may facilitate efficacy of the foamed solution, for instance, to facilitate certain foam deposition operations. Chemicals such as industrial soaps, detergents, degreasers, adjuvants, agricultural chemicals, and/or other chemical products may be diluted with water to form a solution. The solution may be agitated in order to generate a foam or other aerated substance that may be applied to an object to improve the efficacy of the solution or to improve its deposition or retention on the object. For example, agitation media may be used to interrupt a flow of the solution and aerate the solution for foam generation. In many traditional systems, the agitation media is locked in a rigid frame that defines a fixed-length flow path for the solution. Conventional systems may therefore limit the adaptability of the system, including limiting the ability to produce foams of different or variable consistencies. As such, the need continues to develop systems and techniques to facilitate foam generation.

SUMMARY

Embodiments of the present disclosure are directed to a foam generating device. The foam generating device includes a housing defining an agitation chamber and a conditioning chamber. The foam generating device further includes a cartridge assembly arranged within the agitation chamber. The cartridge assembly is configured to receive a solution and define an agitation flow path of the solution through a plurality of stages of agitation media, thereby increasing a quantity of a gas in the solution. As used herein "solution" may include a chemical and water mixture of varying compositions of concentrations. A solution may include a gas associated with the chemical and water mixture, which may be dissolved or partially dissolved therewith. The foam generating device further includes a conditioning assembly arranged within the conditioning chamber and configured to receive the solution from the cartridge assembly. The conditioning assembly defines a tortuous flow path for the solution. The tortuous flow path may include a plurality of cylindrical discs configured to sequentially receive the solution. Each of the discs define a plurality of radial ribs on a first side and on a second side opposite the first side. The first and second sides are separated by a floor. A disc passage is defined in the floor. The conditioning assembly is adjustable such that in a first position of the conditioning assembly, the tortuous flow path comprises a first quantity of radial ribs of the plurality of the radial ribs such that the solution travels along each of the first and second sides of the plurality of discs and is obstructed by the first quantity of the plurality of radial ribs during travel, thereby defining a first tortuous flow path length. The conditioning assembly is further adjustable such that in a second position of the conditioning assembly, the tortuous flow path includes a second quantity of the plurality of the radial ribs different from the first quantity such that the solution travels along each of the first and second sides of the plurality of discs and is obstructed by the second quantity of the plurality of ribs during travel thereby defining a second tortuous flow path length different from the first tortuous flow path length.

In another embodiment, the conditioning assembly is rotatable to adjust the conditioning assembly from the first position to the second position. The second quantity of radial ribs may be greater than the first quantity of radial ribs such that rotation to the second position increases aeration of the solution.

In another embodiment, the conditioning assembly may further include a plurality of control plates interposed with the plurality of cylindrical discs in the conditioning chamber. Each control plate may include a plate passage, where the solution travels through a plate passage of one of the plurality of control plates after traveling along the second side of the cylindrical disc. The foam generating device may further include a rod rotatable relative to the housing and configured to move the conditioning assembly from the first position to the second position. The rod may be engaged with either the cylindrical discs or the control plates and the other of the cylindrical discs or the control plates are fixed relative to the housing such that rotation of the rod rotates the cylindrical discs or control plates relative to the housing and the other of the cylindrical discs or the control plates. The rotation of the rod may cause one of a plurality of disc passages of the cylindrical discs or a plurality of plate passages of the control plates to rotate relative to the other such that alignment of one or more of the disc passages with one or more of the plate passages reduces the tortuous flow path length.

In another embodiment, the cartridge assembly may include a plurality of cartridges. Each cartridge may be configured to hold a stage of agitation media and resist movement of the stage of agitation media to an adjacent stage. The plurality of cartridges may include a first cartridge having a first agitation media holding chamber and a grate adjacent the first agitation media holding chamber. The grate may be configured to permit a flow of solution therethrough while restraining the passage of agitation media. The plurality of cartridges may further include a second cartridge, sealingly engaged with the first cartridge, and having a second agitation media holding chamber adjacent the grate opposite the first agitation media holding chamber. In some cases, at least one of the first cartridge or the second cartridge may include an annular lip configured to impede a flow or buildup of gas along an outer portion of the first agitation media holding chamber. The plurality of cartridges may be sealingly engaged with the agitation chamber such that the solution is directed through the plurality of cartridges and through each stage of agitation media held therein.

In another example, a foam generating system is disclosed. The foam generating system includes a foam generating device, such as any of the foam generating devices described herein. The foam generating system further includes a nozzle assembly removably coupled to the foam generating device. The nozzle assembly is configured to receive the foam produced by the foam generating device and spray the foam away from the foam generating device and towards a target.

In another embodiment, the nozzle assembly may include a spray member configured to receive the foam and deliver an oscillatory spray of the foam towards the target. The nozzle assembly may include one or more tapered surfaces along a foam flow path defined by one or more components of the nozzle assembly.

In another embodiment, a foam generating device is disclosed. The foam generating device includes a housing defining a conditioning chamber. The foam generating device further includes a conditioning assembly. The conditioning assembly includes a plurality of cylindrical discs within the conditioning chamber. Each conditioner disc has a disc passage and plurality of obstructions. The conditioning assembly further includes a plurality of control plates interposed with the plurality of cylindrical discs in the conditioning chamber. Each control plate has a plate passage. The condition assembly further includes a rod engaged with the plurality of cylindrical discs and configured to move the plurality of cylindrical discs relative to the plurality of control plates. In a first configuration of the rod, the disc passages of the plurality of cylindrical discs and the plate passage of the plurality of control plates define a conditioning flow path having a first length through the conditioning assembly. In a second configuration of the rod, the plurality of cylindrical discs is rotated such that the disc passage of the plurality of cylindrical discs and the plate passage of the plurality of control plates are misaligned and define the conditioning flow path having a second length through the conditioning assembly.

In another embodiment, the rod may be configured to rotate the plurality of cylindrical discs within the conditioning chamber and alter the conditioning flow path without altering a length of the foam generating device. Each conditioner disc may include a disc-shaped portion arranged radially from the rod. Each conditioner disc may further include a rim portion connected to a circumferential end of the disc-shaped portion and extending perpendicularly from opposing sides of the disc-shaped portion. Each control plate may define a face configured for seating an end of the rim portion of an adjacent conditioner disc and defining a portion of the conditioner path with the adjacent conditioner disc.

In another embodiment, the plurality of control plates are rotationally fixed relative to the housing. The plurality of cylindrical discs and the plurality of control plates may be arranged along an axis defined by the rod. The foam generating device may further include a torque knob configured to compress the plurality of cylindrical discs and the plurality of control plates toward one another. In some cases, a compression of the plurality of cylindrical discs and the plurality of control plates forms a seal between adjacent control plates and cylindrical discs. The seal may be relieved during movement of conditioner disc relative to the rotationally fixed control plates.

In another embodiment, the housing may further define an agitation chamber fluidically coupled to an inlet of the conditioning chamber. The foam generating device further includes a cartridge assembly arranged within the agitation chamber. The cartridge assembly may be configured to receive a solution and define an agitation flow path of the solution through a plurality of stages of agitation media, thereby increasing a quantity of a gas in the solution. The conditioning assembly may be configured to receive the solution and propagate the solution along the conditioning flow path, thereby mixing the solution and the gas with the plurality of obstructions to produce a foam.

In another embodiment, a method of producing foam with a foam generating device is disclosed. The method includes receiving a flow of a solution through a plurality of stages of agitation media. The method further includes dividing a quantity of gas through channels and pores of the agitation media. The method further includes directing the solution along a conditioning flow path having a first plurality of obstructions along a first length. The method further includes producing a first foam having a first consistency by inducing turbulence along the conditioning flow path from the first plurality of obstructions. The method further includes altering the conditioning flow path to have a second plurality of obstructions along a second length. The method further includes producing a second foam having a second consistency by inducing turbulence along the conditioning flow path from the second plurality of obstructions.

In another embodiment, the conditioning flow path may further include a plurality of partitioned openings configured to receive the solution. Each successive opening may provide access to a plurality of obstructions along the conditioning flow path. The first plurality of obstructions and the second plurality of obstructions include subsets of the plurality of obstructions separated by a first partitioned opening.

In another embodiment, the altering of the conditioning flow path may include rotating the plurality of openings relative to each other and exposing the plurality of obstructions along the conditioning flow path. In some cases, the plurality of partitioned openings may be interposed with a plurality of control plates. Each control plate may have a plate passage. The solution may travel through a plate passage after traversing the obstructions of an adjacent subset of the plurality of obstructions. The rotating may further include rotating the plurality of openings relative to the plurality of control plates.

In another embodiment, a foam generating device is disclosed. The foam generating device includes a housing. The foam generating device further includes a cartridge assembly received by the housing. The cartridge assembly is configured to receive a solution and define an agitation flow path of the solution through a plurality of stages of agitation media, and thereby increase a quantity of a gas in the solution to produce an agitated solution. The foam generating device further includes a conditioning assembly received by a conditioning chamber of the housing and configured to receive agitated solution from the cartridge assembly. The conditioning assembly includes a plurality of first members. Each of the plurality of first members have a plurality of obstructions and a first member passage. The conditioning assembly further includes a plurality of second members interposed with the plurality of first members. Each of the second members have a second member passage. The conditioning assembly further includes an adjustable member engaged with the plurality of first members and the plurality of second members. The adjustable member is configured to move the plurality of first members relative to the plurality of second members. In a first configuration of the adjustable member, the first member passages of the plurality of first members and the second member passages of the plurality of second members define a conditioning flow path having a first length through the conditioning assembly that spans a first subset of obstructions of the plurality of obstructions. Further, in a second configuration of the adjustable member, the plurality of first members is rotated such that the first member passages of the plurality of first members and the second members passages of the plurality of second members are misaligned and define the conditioning flow path having a second length through the conditioning assembly that spans a second subset of obstructions of the plurality of obstructions.

In another embodiment, the plurality of obstructions may include ribs. In turn, the adjustable member may be configured to adjust a position of at least two of the plurality of first members within the conditioning chamber and alter the conditioning flow path without altering a length of the foam generating device.

In another embodiment, each first member includes a disc-shaped portion arranged radially from the adjustable member. Each first member may further include a rim portion connected to an end of the disc-shaped portion and extending perpendicularly from opposing sides of the disc-shaped portion. Additionally, each second member may define a face configured for seating an end of the rim portion of an adjacent first member and defining a portion of the conditioning flow path with the adjacent first member.

In another embodiment, the plurality of first members may be rotationally fixed relative to the housing. The plurality of first members and the interposed plurality of second members may be compressed relative to one another in the first configuration or the second configuration such that seals are defined between adjacent pairs of the first members and the second members.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIGS. 11A-11H depict a conditioning operation of a conditioning assembly in first through eighth configurations according to implementations of the present disclosure;

FIG. 16 depicts a conditioning assembly according to implementations of the present disclosure;

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to devices and systems for the production of foam. Broadly, the foam produced may include a variety of aerated solutions having certain soaps, detergents, degreasers, chemicals, adjuvants, agricultural inputs, and so on, which may be used with a variety of foam deposition systems, including nozzles. A thickness or consistency of the foam may depend, in part, on the level of aeration of the solution. For example, a thinner level of foam may have less aeration (e.g., a foam having a consistency analogous to liquid soap) and a thicker level of foam may have greater aeration (e.g., a foam having a consistency analogous to shaving cream). The amount of aeration in the solution may be based on the quantity, type, flow path length, and/or other characteristics of agitation media or other obstructions through which the solution is advanced along to produce a foam. Directing solution through a fixed-length tortuous path or other obstructions may limit the adaptability to produce foams of different consistencies. In addition, merely changing the length of a tortuous path may impede the ability to implement foam generation in compact installations, such as nozzles used for deposition in compact spaces, for instance, car washes.

Figure 1:
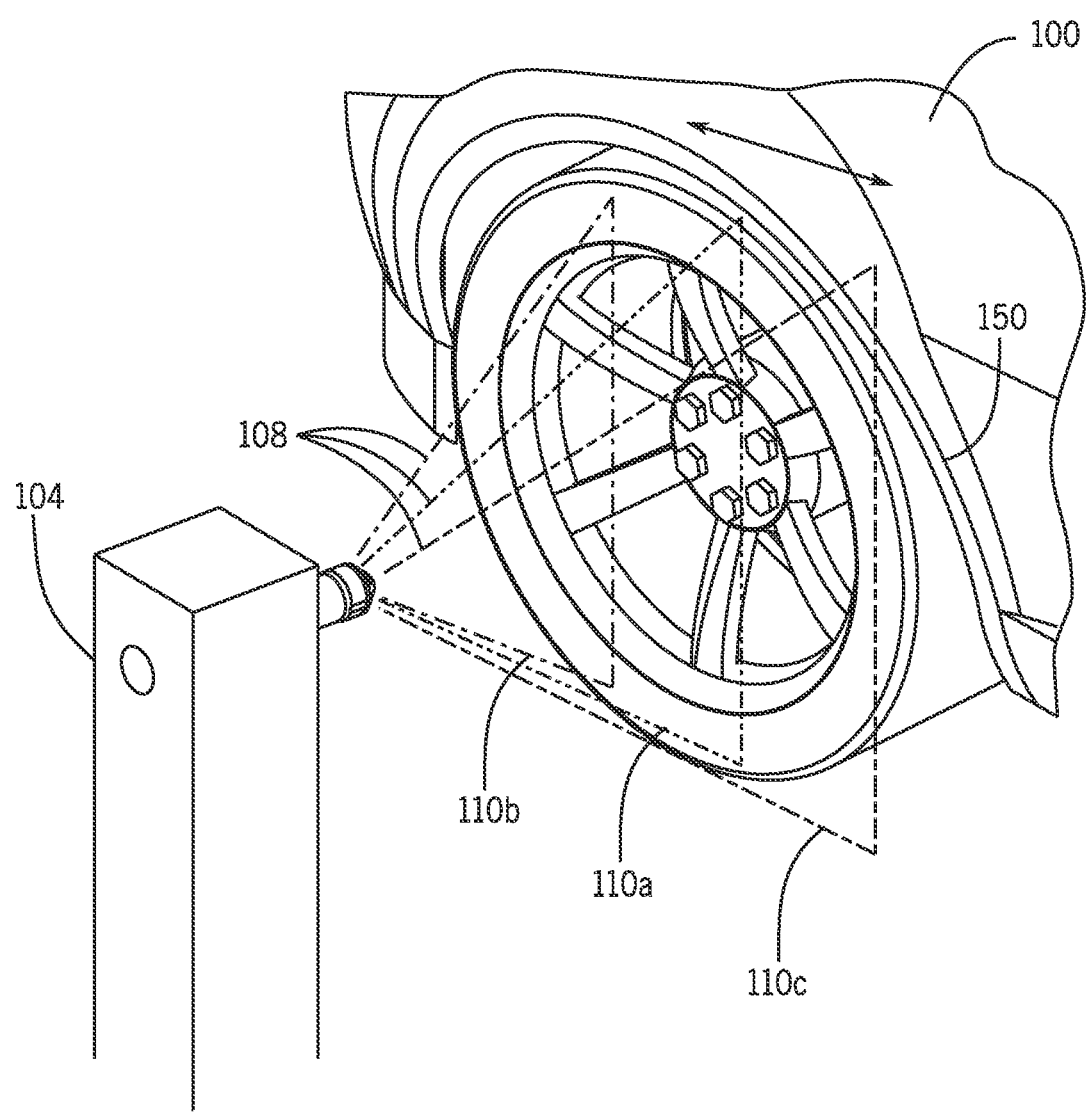
FIG. 1 depicts a deposition operation with a spray system according to implementations of the present disclosure.

Turning to the drawings, the foam generating device may be used in the context of a foam deposition operation, such as in a cleaning operation in a car wash. For example, FIG. 1 depicts a deposition operation 100 that implements the foam generating device according to the present disclosure. The deposition operation 100 involves a system 104 that is used to direct a spray 108 of foam toward an object, e.g., vehicle 150. The system 104 may include a foam generating device such that the spray 108 can be a spray of foam of varying consistency. The spray 108 can include a fan of foam that casts a vertical line of application on the target and/or may include a stream of foam that deposits the stream of foam on the target. The spray system 104 may therefore be used to deposit foam on the object, for instance, to clean or shine the vehicle 150 in a car wash environment, as shown in FIGS. 1A and 1B. In other cases, the deposition operation 100 may occur in other settings, including those for where application of foams is useful, such as chemical deposition applications where visual deposition of the foam and its chemical constituents is beneficial, such as surface coating operations, that may include coating active substances on an object. The system 104 may be a substantially permeant fixture of a deposition system, such as in a car wash or other wash station. Additionally or alternatively, the system 104 may be implemented as a removable attachment for other deposition operations, such as mobile operations. Additionally or alternatively, the system 104 including the foam generator may be connected to one or more remotely positioned nozzles or other applicators. In this regard, the system 104 can be used in other settings, such as industrial and agricultural settings.

In the example of FIG. 1, the system 104 is generally used to establish an oscillatory pattern of the spray 108. For example, in FIG. 1, the spray 108 oscillates or changes and travels between a variety of spray orientations, such as a first orientation 110a, a second orientation 110b, a third orientation 110c, and/or other orientation. For example, the spray system 104 may cause the spray 108 to move or otherwise be altered among the orientations 110a-110c. While the orientation is altered, the ends of the path may generally be a straight line. In other configurations, other orientations are possible and contemplated herein, including those in which the output or line of foam itself rotates, such as rotating the foam or other output about an axis. In yet other examples, the output or line of foam may be static. For purposes of illustration, the spray 108 is shown as a generally fan-shaped pattern. In other cases, the spray 108 may resemble other shapes, including substantially concentrated flow patterns, including flow patterns defined by a consistent, smooth laminar flow, as may be appropriate for a given application. Multiple sprays can also be provided, for example, using a bank of nozzle assemblies. The bank of nozzles can be mounted on a sprayer device, such as an arch of a vehicle wash tunnel or an industrial or agricultural sprayer.

Figure 2A:
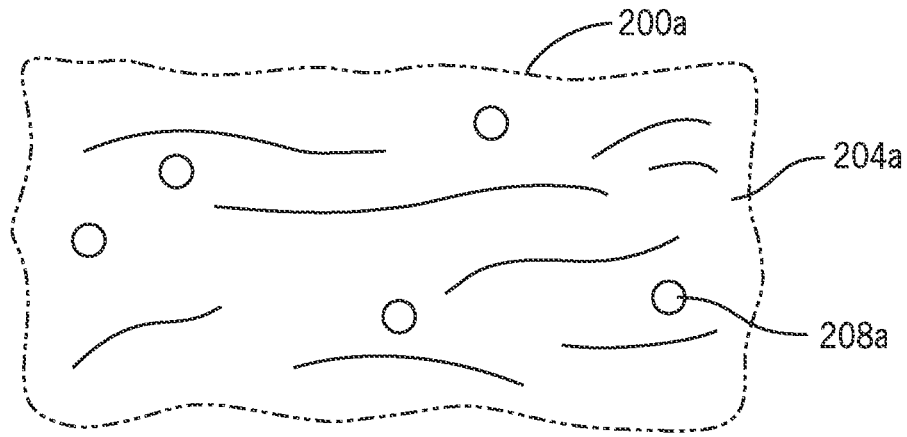
FIGS. 2A-2C depict example foams produced by the foam generating devices of the present disclosure.
Figure 2B:
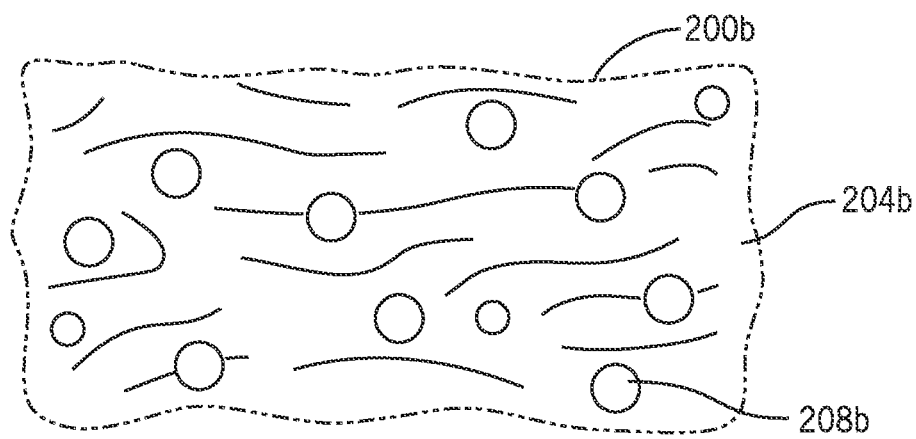
Figure 2C:
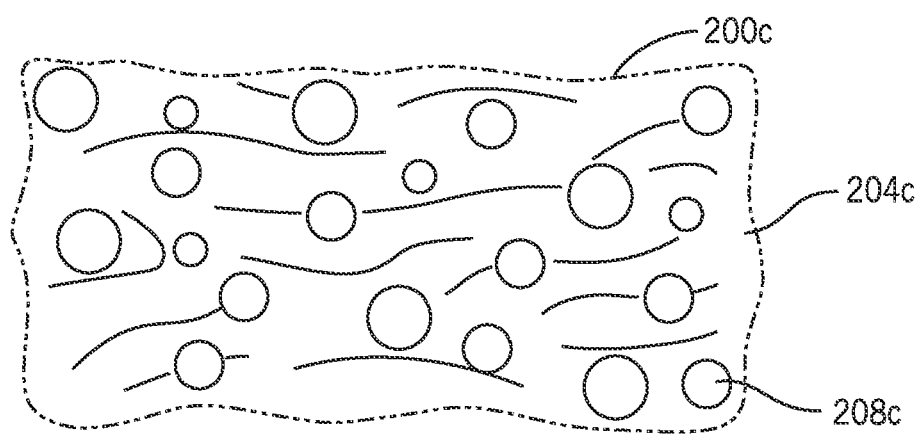

The spray 108 produced by the system 104 may be or include a foam having a selectively defined consistency or thickness. For example and with references to FIGS. 2A-2C, in a first configuration, the system 104 including the foam generating device may be configured to produce a first foam 200a having a first or relatively thin consistency. The first foam 200a is shown in FIG. 2A as having a solution 204a and a first amount of gas 208a. In a second configuration, the system 104 including the foam generating device may be configured to produce a second foam 200b having a second or thicker consistency, relative to the first foam. The second foam 200b is shown in FIG. 2B as having a solution 204b and a second amount of gas 208b. In a third configuration, the system 104 including the foam generating device may be configured to produce a third foam 200c having a third or thicker consistency, relative to the first and second foam 200a, 200b. The third foam 200c is shown in FIG. 2C as having a solution 204c and a second amount of gas 208c. In other cases, different foams having different consistencies or thickness may be produced, as selectively defined by the user.

Figure 3:
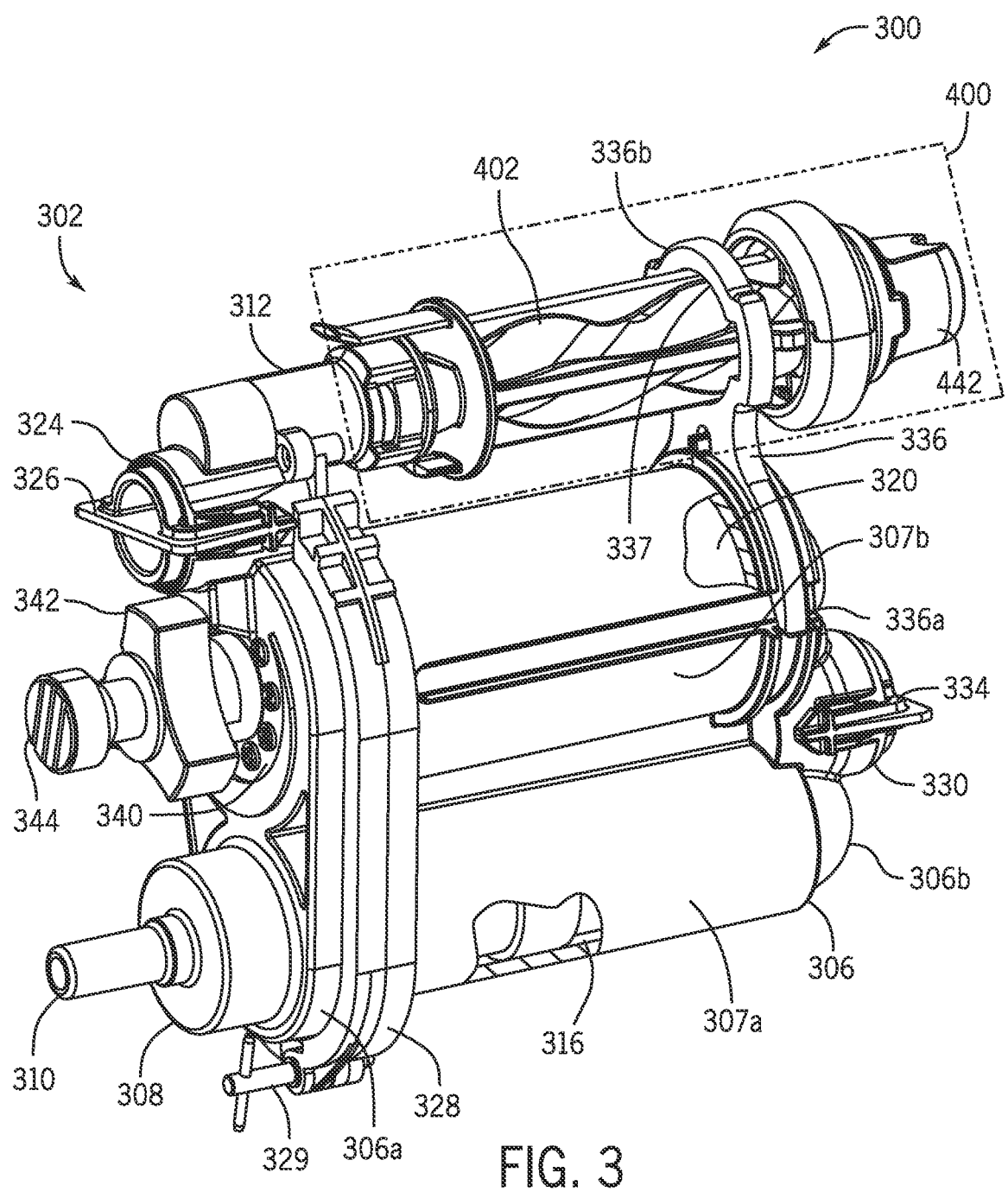
FIG. 3 depicts an example foam generating system.

With reference to FIG. 3, a foam generating system 300 is shown including a foam generating device 302 and a nozzle assembly 400. The foam generating system 300 may be configured to produce any of the foams 200a-200c of FIGS. 2A-2C. The foam generating system 300 may be implemented in the deposition operation 100 as the system 104 and/or other systems in order to produce and emit a foam of a selectively defined consistency for a selected deposition operation.

The foam generating device 302 may include a housing 306 with a first housing portion 306a and a second housing portion 306b that cooperate to define an agitation chamber 316 and a conditioning chamber 320 within the housing 306. The multi-portion construction of the housing 306, e.g., with two or more portions, may facilitate assembly of the foam generating device 302, as described herein. For example, the agitation chamber 316 and the conditioning chamber 320 may be formed partially or fully from a single, integrally formed structure, such as the second housing portion 306b shown in FIG. 3. In other examples, the agitation chamber 316 and the conditioning chamber 320 and/or a portion thereof may be formed from separate components that are attached to one another in order to form the foam generating device 302. The housing 306 may be formed from a plastic material, e.g., by injection molding certain resins or synthetic materials that are generally chemically and corrosion resistant. Additive manufacturing, casting, machining, and other manufacturing techniques may also be used to form the housing 306. A clamp feature 328 may be configured to attach the first housing portion 306a and the second housing portion 306b to one another, and for instance, form a sealed housing 306. In a specific implementation of FIGS. 3-5, the clamp feature 328 includes a first clamp piece 328a and a second clamp piece 328b. The first and second housing portions 306a, 306b may be arranged adjacent one another and the first and second clamp pieces 328a, 328b may be engaged with the first and second housing portions 306a, 306b along a periphery or interface. A securing feature 329 may secure the first and second clamp pieces 328a, 328b to one another, and for instance, may be selectively tightened in order to tension the first and second clamp pieces 328a, 328a relative to the first and second housing portions 306a, 306b and establish the agitation chamber 316 and the conditioning chamber 320 as substantially sealed volumes within the housing 306. The first and second housing portions 306a, 306b may therefore be separated from one another with adjustment (loosening) of the securing feature 329. Separation of the first and second housing portions 306a, 306b from one another may allow the cartridge assembly 350, the conditioning assembly 370 and/or other components to be removed and replaced as needed to facilitate maintenance of the system. Additionally or alternatively, the cartridge assembly 350 and/or the conditioning assembly 370 may be removed from the foam generating device 302 without necessarily separating the first and second housing portions 306a, 306b from one another. For example, the cartridge assembly 350 and/or the conditioning assembly 370 may be releasably and sealingly engaged with the housing 306 via a quarter-turn and/or other release mechanism. Accordingly, in some examples, a user may replace the cartridge assembly 350 or the conditioning assembly 370 by manipulating the release mechanism without necessarily needed to disassemble the foam generating device 302.

The second housing portion 306b may define a first tube portion 307a and a second tube portion 307b. The first and second tube portions 307a, 307b may be generally hollow portions of the second housing portion 306b. The first and second tube portions 307a, 307b may be successive hollow portions of an integrally formed structure or may be hollow portions of separate structures that are attached and fluidly connected to one another, based on the construction of the second housing portion 306b. The first and second tube portions 307a, 307b may be stacked within the second housing portion 306b such that the second tube portion 307b is above the first tube portion 307a. The first and second tube portions 307a, 307b may be fluidically connected to one another in series, with an end or outlet of the first tube portion 307a connected internally within the second housing portion 306b, to an end or inlet of the second tube portion 307b. A clean out or opening 330 may be defined in the second housing portion 306b fluidically between the first and second tube portions 307a, 307b. The opening 330 may be closed by a plug 334 or other device to normally seal the opening 330 closed during operation of the foam generating device 302. The opening 330 may allow the first and second tube portions 307a, 307b to be flushed and generally facilitate ease of maintenance and clean out.

The first housing portion 306a may be an elongated cover or plate that generally encloses the first tube portion 307a and the second tube portion 307b of the second housing portion 306b. The enclosed space or region of the first tube portion 307a by the first housing portion 306a may define the agitation chamber 316. The enclosed space or region of the second tube portion 307b by the first housing portion 306a may define the conditioning chamber 320. The first housing portion 306a and the second housing portion 306b may be removably coupled with one another in order to facilitate maintenance of the foam generating device 302 and replacement of components and assemblies used therein. For example, the first housing portion 306a may be removably coupled to the second housing portion 306b in order to expose the agitation chamber 316. A user may therefore remove, repair, and replace components of the agitation chamber 316 as needed (e.g., replacing one or more cartridges) to support the operation of the foam generating device 302. Further, the first housing portion 306a may be removably coupled to the second housing portion 306b in order to expose the conditioning chamber 320. A user may therefore remove, repair, and replace components of the conditioning chamber 320 as needed (e.g., replacing one or more discs, plates, or other feature) to support the operation of the foam generating device 302.

Figure 6:
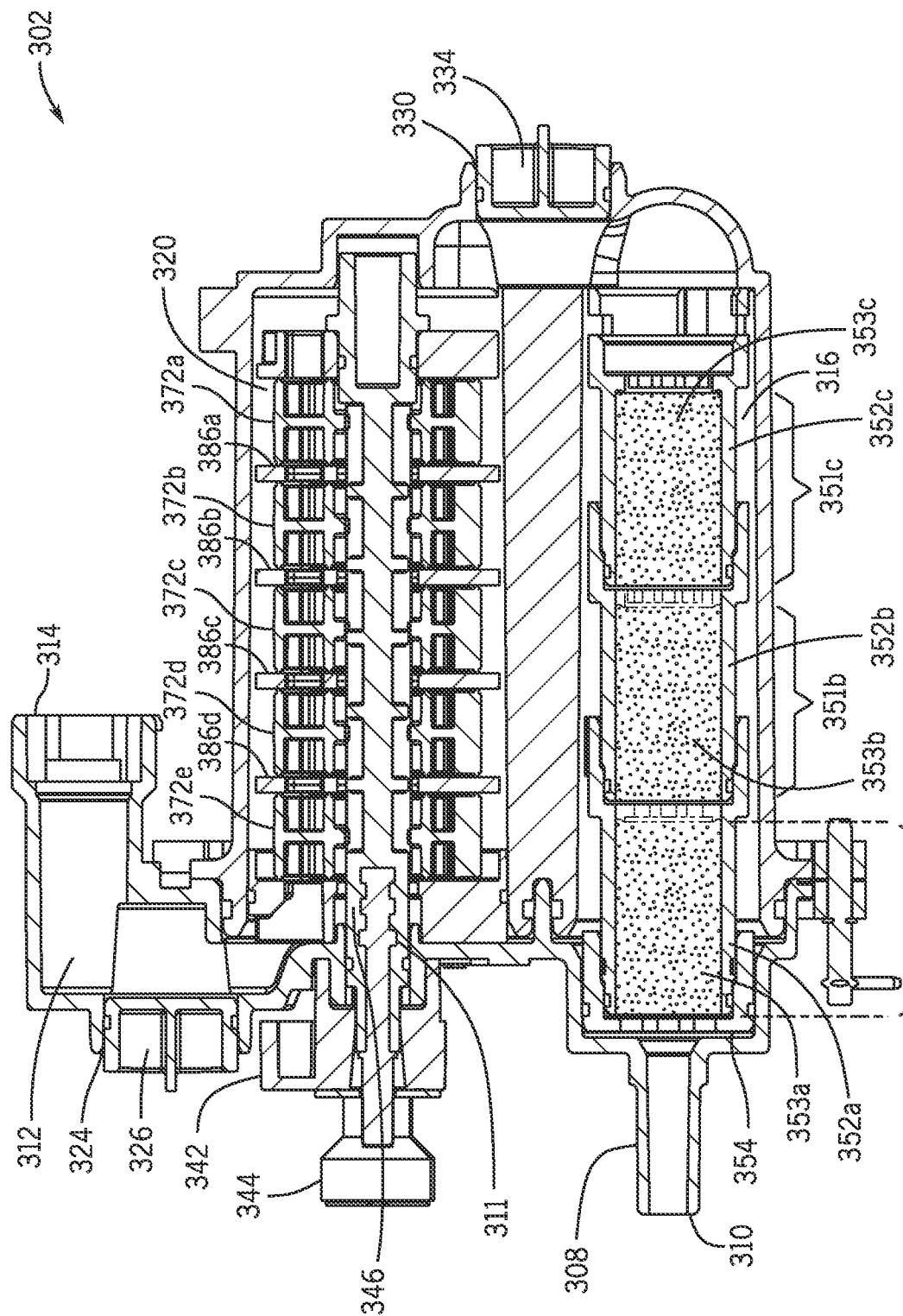
FIG. 6 depicts a cross-sectional view of the foam generating device of FIG. 4, taken along line 6-6 of FIG. 4 according to implementations of the present disclosure.

The first housing portion 306a may further define an inlet portion 308 having an inlet 310. The inlet 310 may be configured as a fluid ingress to receive a flow of solution, including water mixed with chemicals, detergents, and other fluids that may or may not have some initial level of aeration. The inlet portion 308 may fluidically couple a flow of solution received at the inlet 310 to the agitation chamber 316. The first housing portion 306a may further define a passage 311 (FIG. 6). The passage 311 may be generally elevationally aligned with the conditioning chamber 320 and configured to receive one or more rods or other structures therethrough for manipulation of the conditioning chamber 320, as described herein. The first housing portion 306a may further define a clean out or opening 324. The opening 324 may be defined by an injection molding manufacturing process in which a removable core is inserted into the housing portion 306a to maintain the shape of the housing portion 306a during a molding process. However, it will be appreciated that other manufacturing methods are possible and contemplated herein, including but not limited to additive manufacturing, casting, machining, and so on. In this regard, the opening 324 may extend into an internal volume of the housing 306 and be fluidically coupled to the conditioning chamber 320 downstream of an outlet of the conditioning chamber 320. The opening 324 may be closed by a plug 326 or other device to normally seal the opening 324 closed during operation of the foam generating device 302.

Figure 4:
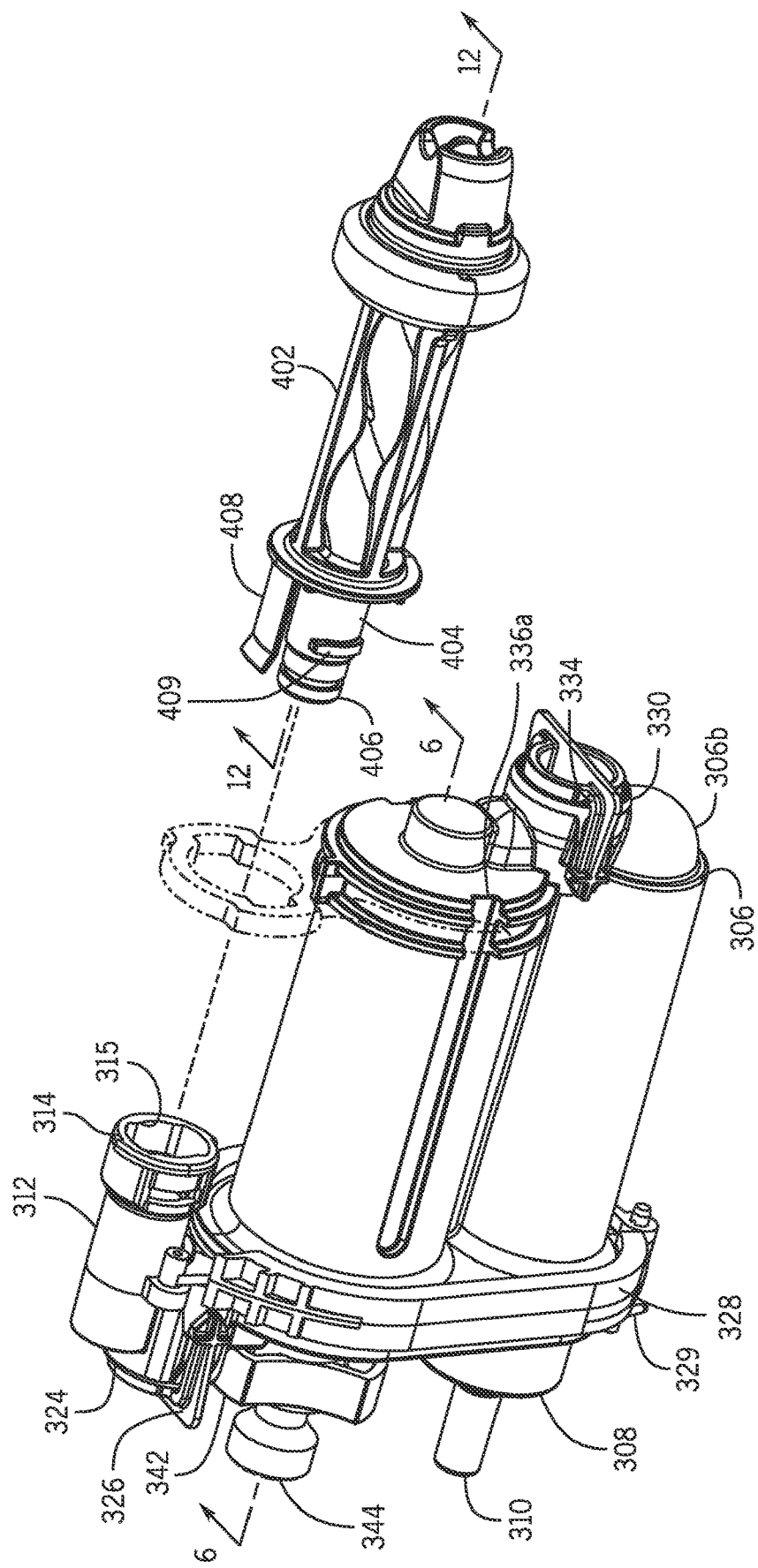
FIG. 4 depicts an exploded view of the foam generating device of FIG. 3, including a foam generating device and a nozzle assembly.

The first housing portion 306a may further define an outlet portion 312 having an outlet 314 configured as an egress for emitting foam produced according to the present disclosure, as shown in FIG. 4. The outlet portion 312 may be configured to distribute a solution or foam or other output received from the conditioning chamber 320 by routing the solution to the outlet 314 for emission from the foam generating device 302. An attachment feature 315 (FIG. 4) may be defined at the outlet 314, including clips, latches, threaded features, and the like that are adapted to releasably secure an optional nozzle assembly 400 to the foam generating device 302. Alternatively, the outlet 314 may be configured as a nozzle. In yet other cases, the outlet 314 may be used to connect the foam generating device 302 to one or more remotely positioned nozzles. For example, the outlet 314 may be configured to connect the foam generator device to a hose or tubing which extends from the foam generating device 302 to the one or more remotely positioned nozzles. In other examples, the nozzle assembly 400 may be omitted (e.g., as shown in FIG. 6). For example, the foam generator device 302 may generate and provide foam to substantially any applicator (remote or directly attached), including rain bars, and/or other device(s) that operate to emit and apply the foam to a target.

Figure 5:
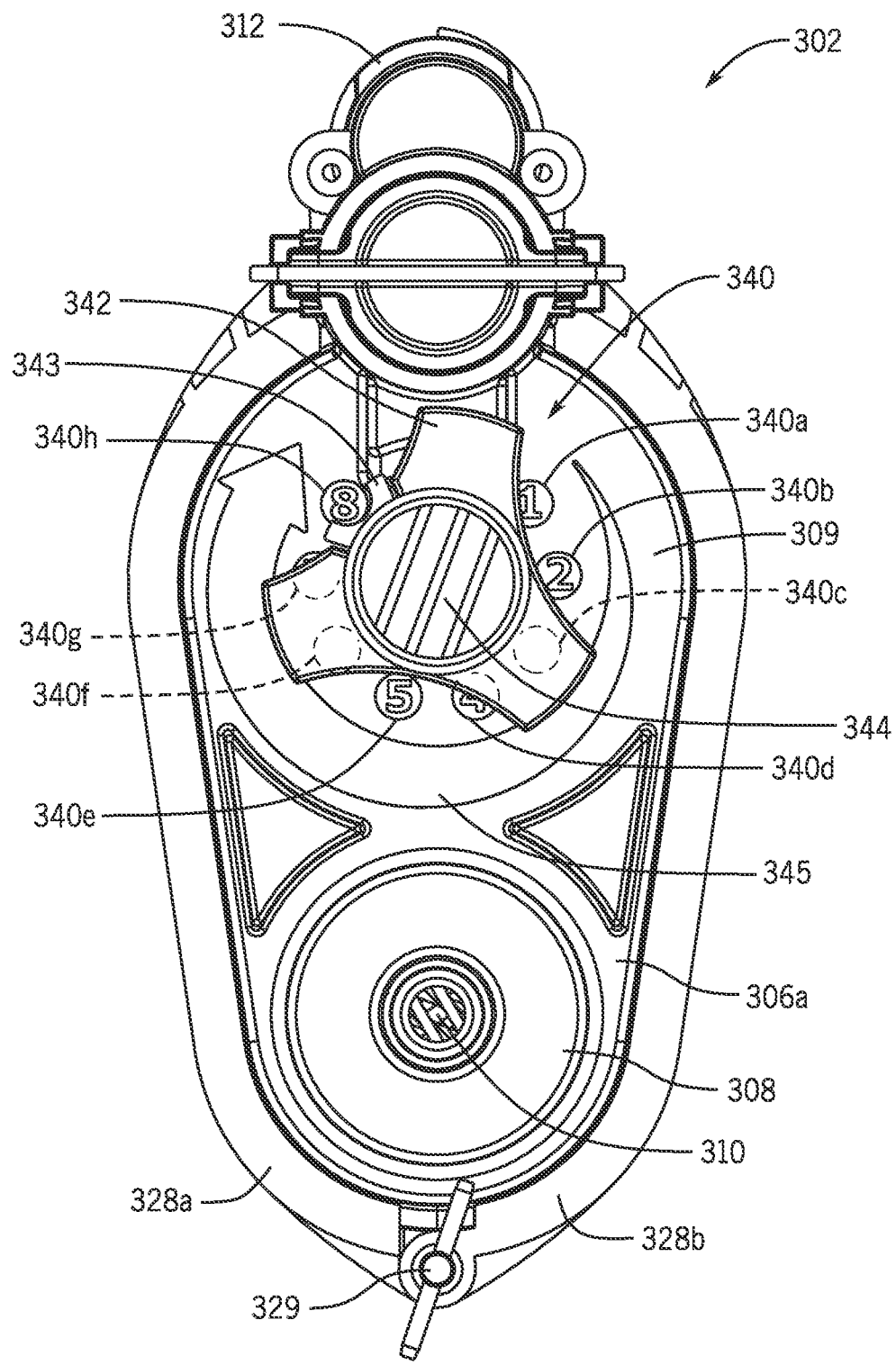
FIG. 5 depicts a front view of the foam generating device of FIG. 4.

With reference to FIG. 5, the first housing portion 306a may have an outer face 309 including settings 340. The settings 340 may include markings or other features that are adapted to indicate a selection of a level of foam. In the example of FIG. 5, a first setting 340a, a second setting 340b, a third setting 340c, a fourth setting 340d, a fifth setting 340e, a sixth setting 340f, a seventh setting 340g, and an eighth setting 340h are shown. In other cases, more or fewer settings may be provided. The settings 340a-340h may be circumferentially spaced about the outer face 309 in a manner that corresponds to a rotational position of various elements, such as obstructions, of the conditioning chamber 320. An indicator 345, e.g., an arrow extending around settings 1-8 with an increasing thickness as the arrow progresses towards the eighth setting, is defined on the outer face 309 to indicate a relative thickness or consistency of foam associated with the settings 340.

Figure 7A:
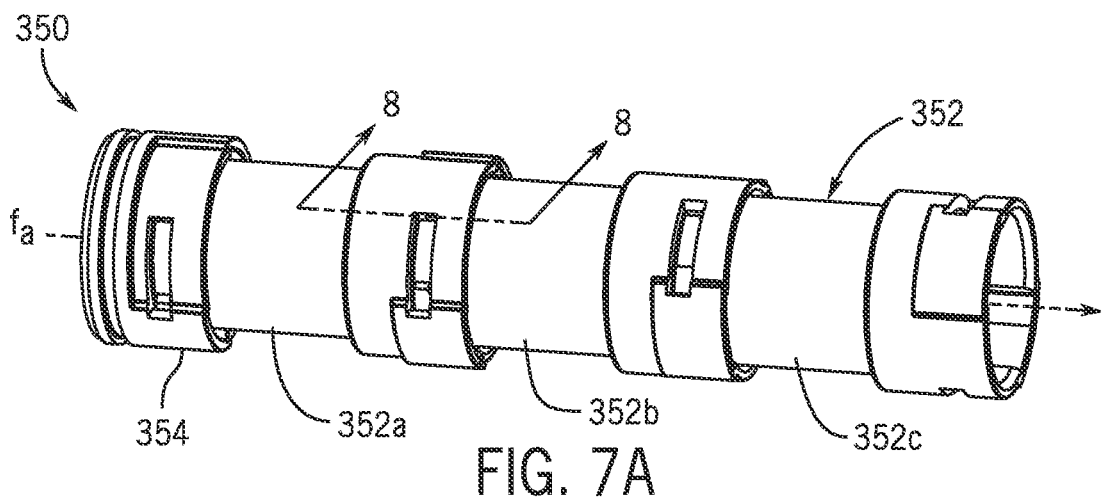
FIG. 7A depicts an example cartridge assembly according to implementations of the present disclosure.
Figure 7B:
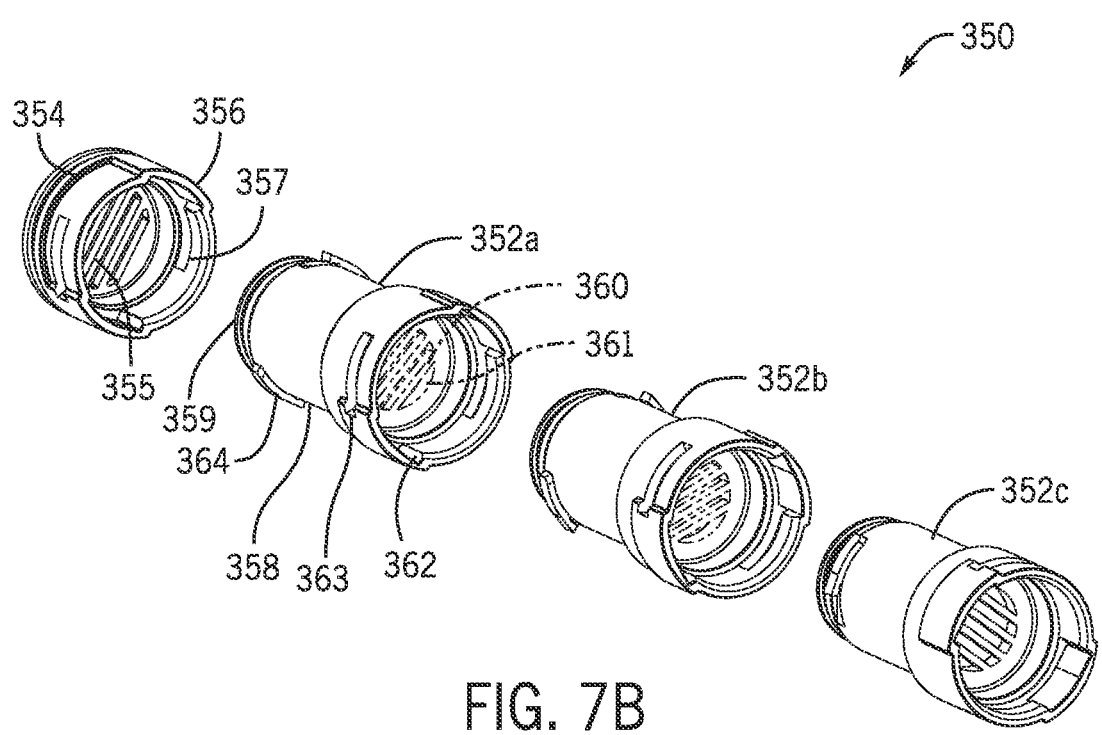
FIG. 7B depicts an exploded view of the cartridge assembly of FIG. 7A.

With reference to FIGS. 6-7B, the foam generating device 302 may include a cartridge assembly 350 arranged in the agitation chamber 316. The cartridge assembly 350 is configured to receive a solution and introduce a quantity of gas into the solution to produce a first foam. As shown in FIG. 7A, the cartridge assembly 350 includes a plurality of cartridges 352, such as a first cartridge 352a, a second cartridge 352b, and a third cartridge 352c. Each of the first cartridge 352a, second cartridge 352b, and third cartridge 352c may be sealingly engaged with one another such that the solution is directed through the cartridges, in series, and through each stage of agitation media held therein. The first cartridge 352a, the second cartridge 352b, and the third cartridge 352c may be sealed in any appropriated manner, including but not limited to using lip seals, O-rings, gaskets, interference fits, press fits, compression fittings, face seals, and so on. In some cases, the plurality of cartridges 352 may include more or fewer cartridges, including implementations in which a single cartridge is used. For purposes of illustration, the first cartridge 352a is described. It will be appreciated that the second and third cartridges 352b, 352c, or other cartridges may be substantially analogous to the first cartridge 352a.

The first cartridge 352a may include one or more cartridge bodies, such as cartridge body 358 (FIG. 7B). The cartridge body 358 may be a tubular structure that defines a first chamber 353a therein. The cartridge body 358 may define an opening 359 at a first end that extends into the chamber 353a. The body 358 may further define a cartridge first attachment feature 364 about the opening 359. The cartridge first attachment feature 364 may include groves, clips, fasteners, or the like in order to connect the cartridge 352a to another structure about the opening 359. The cartridge body 358 may optionally further define a grate 360 at a second end opposite the opening 359. Where the cartridge body 358 includes the grate 360, slotted openings 361 may be defined that extend into the chamber 353a and are configured to have one or more cross-dimensions that allow the flow of solution therethrough while generally restricting the passage of solids, such as agitation media of various sizes. For purposes of illustration, the grate 360 and the slotted openings 361 are shown in phantom line. In some cases, the grate 360 and the slotted openings 361 may be excluded, and thus generally allow the passage of solution and agitation media between adjacent cartridges. Extending from the body 358 and arranged about the optional grate 360, the cartridge 352a may include an attachment portion 362. The attachment portion 362 may include a substantially cylindrical sleeve that is configured to receive another structure for fluidic coupling to the first cartridge 352a, such as an adjacent cartridge of the plurality of cartridges 352. In this regard, the attachment portion 362 may include or otherwise define an attachment feature 363 including, groves, clips, fasteners, or the like in order to connect the cartridge 352a to another structure proximate the optional grate 360.

The cartridge assembly 350 may also include an end piece 354. The end piece 354 may include a grate 355 that is configured to allow a flow of fluid while restricting a flow of solids, such as agitation media, substantially analogous to the grate 360 described above. The end piece 354 also includes an attachment portion 356 such as a substantially cylindrical sleeve that is configured to receive another structure for fluidic coupling, such as any of the plurality of cartridges 352. In this regard, the attachment portion 356 may include or otherwise define an attachment feature 357 including, groves, clips, fasteners, or the like in order to connect the cartridge end piece 354 to another structure about the grate 355.

The cartridge assembly 350 may be coupled such that the end piece 354 and the plurality of cartridges 352 are fluidically connected with one another in series to define an agitation flow path fa (FIG. 7A). For example, the end piece 354 may be coupled to the first cartridge 352a at the opening 359. The body 358 of the cartridge 352a may be received by the attachment portion 356 of the end piece 354 such that the grate 355 generally covers the opening 359. The attachment feature 357 and the attachment feature 364 may engage one another in order to secure the end piece 354 to the cartridge 352a in any appropriate manner. In some cases, the attachment feature 357 and the attachment feature 364 may be complementary quarter-turn engagement features that cause a flexible member to be received in a corresponding detent or groove upon a quarter turn, locking the attachments features 357, 364 to one another. In other examples, a flexible tab may be used to define a snap-fit connection between adjacent ones of the cartridges. The second cartridge 352b may be fluidically coupled to the first cartridge 352a, e.g., at the grate 360, opposite the end piece 354. The second cartridge 352b may be received by the attachment portion 362 and coupled to the first cartridge 352a in manner substantially analogous to the coupling of the end piece 354 and the first cartridge 352a, redundant explanation of which is omitted here for clarity. Further, the third cartridge 352c may be coupled with the second cartridge 352b opposite the first cartridge 352a.

The end piece 354 and the cartridges 352a-352c may be coupled with one another and arranged in the agitation chamber 316, as shown in FIG. 6. For example, the end piece 354 may be arranged adjacent to the inlet 310. The cartridges 352a-352c may proceed in series from the end piece 354 with the third cartridge 352c fluidically adjacent the conditioning chamber 320. As shown in FIG. 6, the first cartridge 352a defines the first chamber 353a including agitation media of a first stage of agitation 351a, the second cartridge 352a defines a second chamber 353b including agitation media of a second stage of agitation 351b, and the third cartridge 352c defines a third chamber 353c including agitation media of a third stage of agitation 351c. The stages of agitation 351a-351c may separate agitation media within the agitation chamber 316 and operate to confine agitation media to a respective stage. This can promote the even distribution of agitation media throughout the cartridge assembly 350 within the agitation chamber 316. The separation of the agitation media into the stages 351a-351c may also help disrupt the flow of solution along an edge or periphery of given cartridges of the plurality of cartridges 352, thereby encouraging the solution to interact with more agitation media, such as the media held in a center of the cartridge assembly 350.

Figure 8:
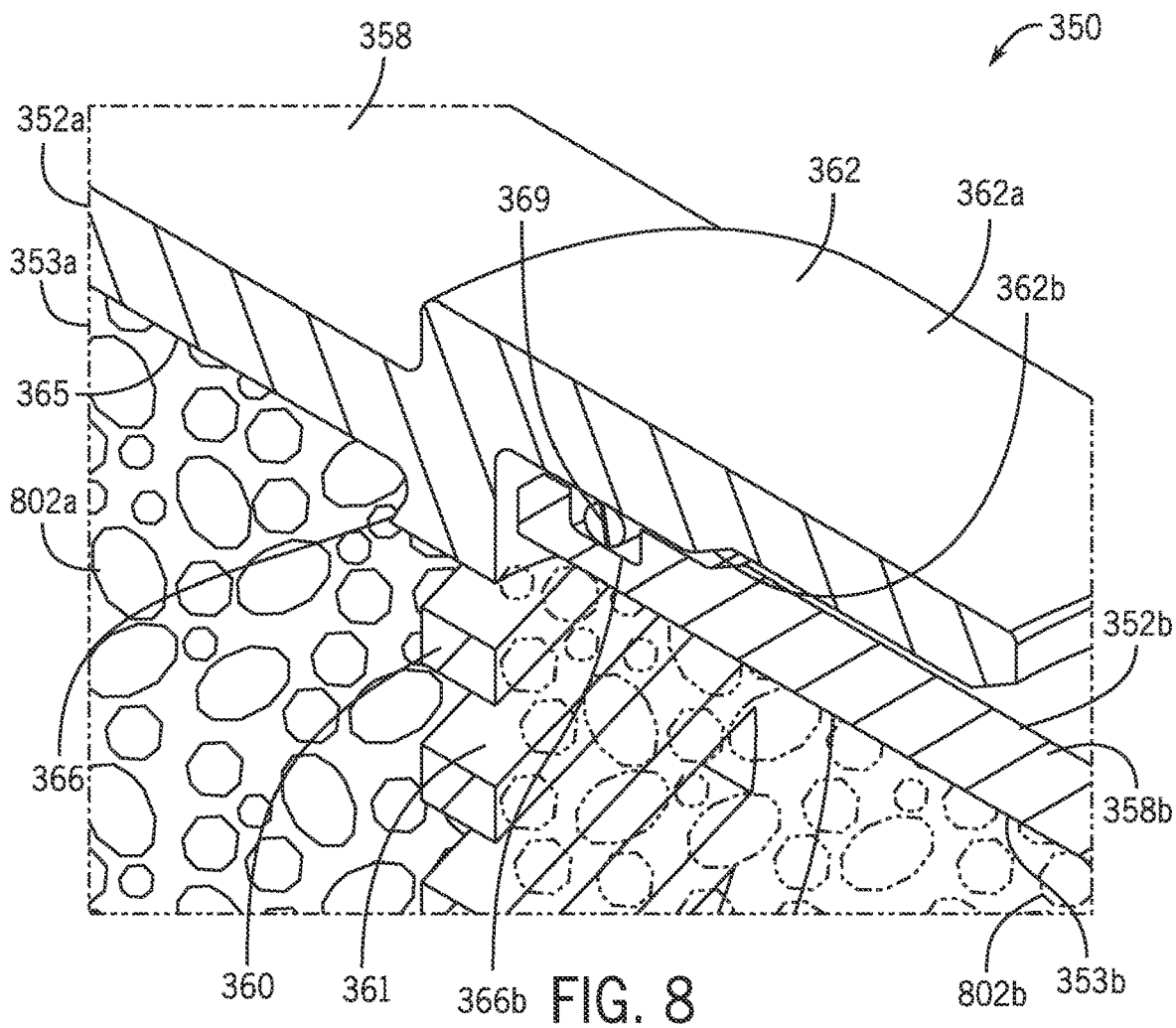
FIG. 8 depicts a cross-sectional view of the cartridge assembly of FIG. 7A, taken along line 8-8 of FIG. 7A, including agitation media held by a first cartridge and a second cartridge according to implementation of the present disclosure.

To facilitate the foregoing, in one example, the cartridge assembly 350 may include one or more annular lips that define a barrier or impediment to solution flow along the wall of the cartridges. As illustrated in FIG. 8, a detail cross-sectional view of the first cartridge 352a and the second cartridge 352b is shown in an embodiment that includes the optional grate 360. In FIG. 8, a first agitation media 802a is shown held in the first chamber 353a of the first cartridge 352a, and a second agitation media 802b is shown held in the second chamber 353b of the second cartridge 352b. The grate 360 operates to separate the first and second agitation media 802a, 802b in the respective chambers 353a, 353b while allowing solution to pass through the slotted openings 361. FIG. 8 further shows an annular lip 366 that is positioned about the grate 360. The annular lip 366 may proceed around an entire circumference of the chamber 353a and extend into a width of the chamber 353a to form a lip or ledge. Accordingly, the annular lip 366 may disrupt the flow of solution along the inner wall 365 of the first cartridge 352a, causing the solution to flow through the slotted openings 361, as opposed to continue along the wall whereby the solution could potentially avoid agitation media.

FIG. 8 further shows the coupling of the first cartridge 352a and the second cartridge 352b. A second cartridge body 358b of the second cartridge 352b is received by the attachment portion 362 of the first cartridge 352a. The attachment portion 362 may define an outer annular surface 362a and an inner annular surface 362b. The second cartridge body 358b may be slid into contacting engagement with the inner annular surface 362b. The second cartridge body 358b may define an annular groove 366b at which a sealing element 369 is arranged, such as an example O-ring. The sealing element 369 may mitigate fluid escape between the second cartridge body 358b and the attachment portion 362 such that the solution flows from the first chamber 353a to the second chamber 353b without release of the solution into the agitation chamber 316. In FIG. 8, the sealing element 369 and the annular groove 366b are shown disposed about an circumferential surface of the second cartridge body 358b. In other examples, the sealing element 369 and the annular groove 366b may be disposed about an end surface of the second cartridge body 358b such that a face seal may be defined between the second cartridge body 358b and the cartridge body of an adjacent cartridge. In this regard, the solution received at the inlet 310 of the foam generating device 302 is advanced through each of the stages of agitation 351a-351c and proceeds through the agitation chamber 316 without bypassing the cartridge assembly 350 held therein.

Figure 9A:
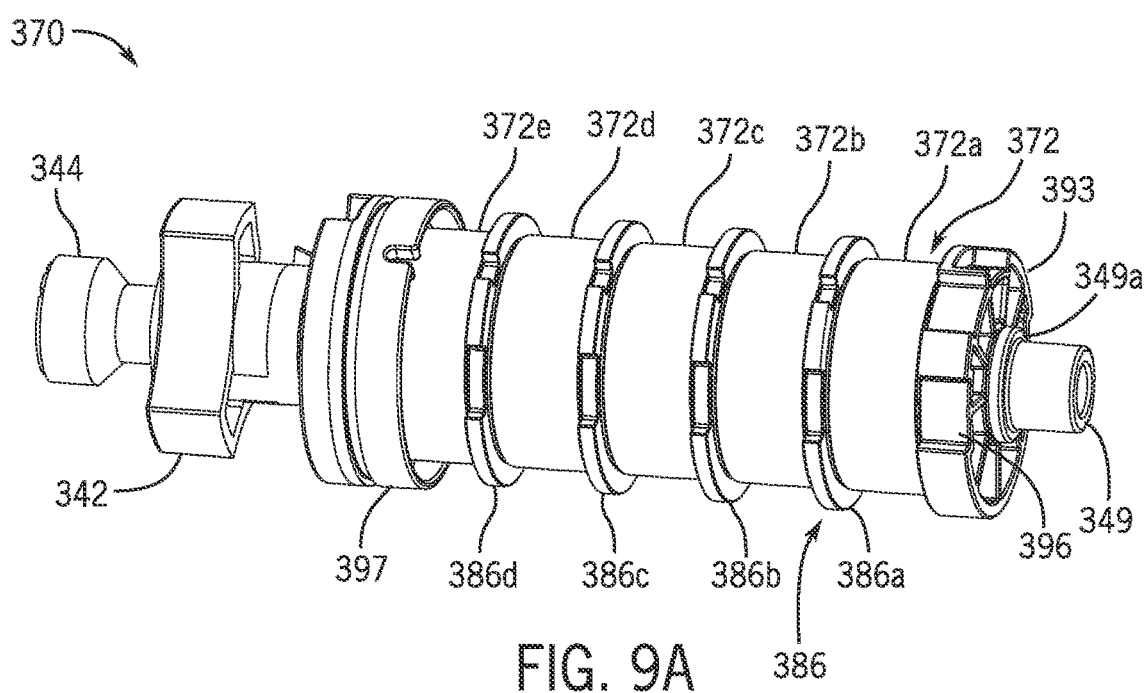
FIG. 9A depicts an example conditioning assembly according to implementations of the present disclosure.
Figure 9B:
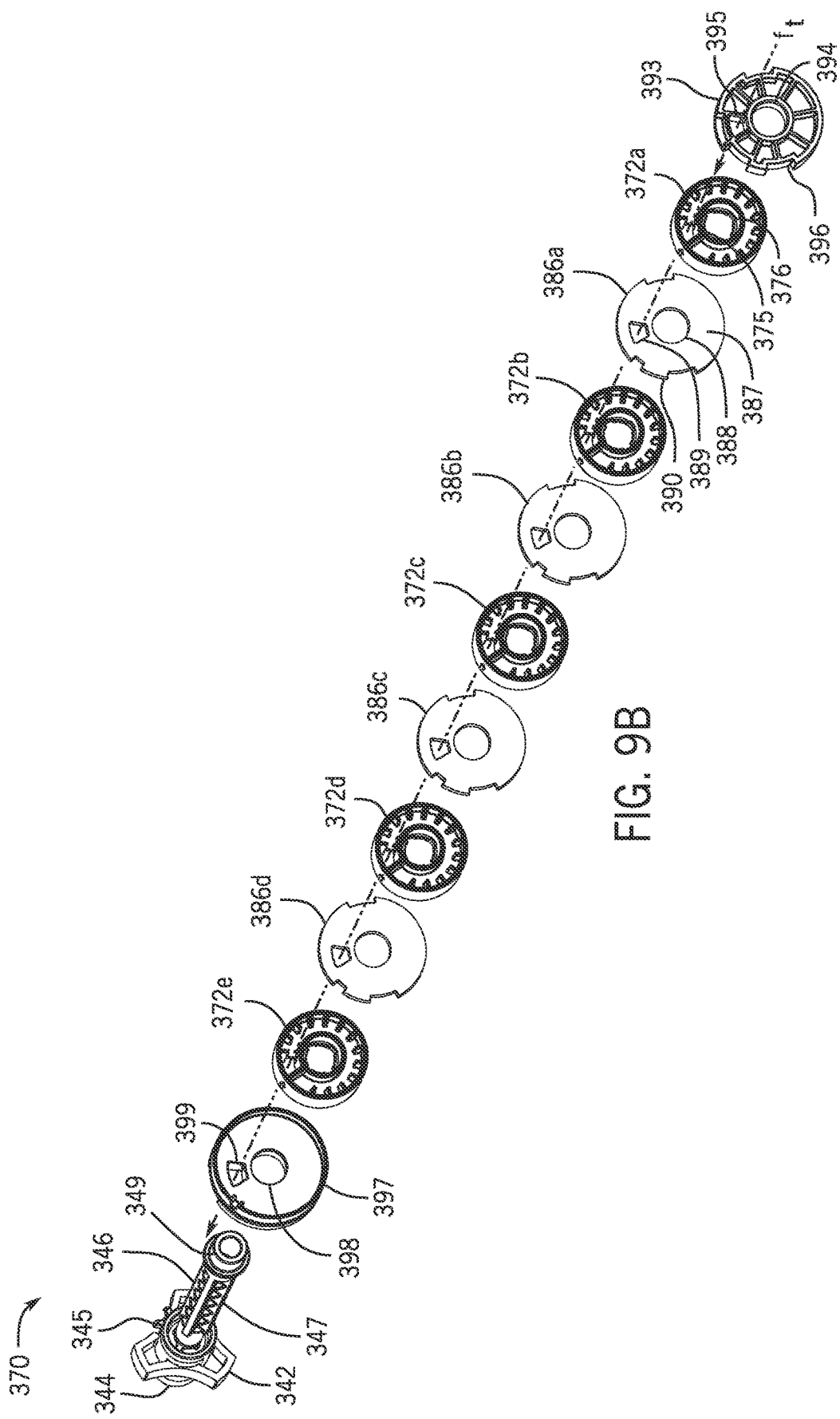
FIG. 9B depicts an exploded view of the conditioning assembly of FIG. 9A.

With reference to FIGS. 6 and 9A and 9B, the foam generating device 302 may include a conditioning assembly 370 arranged with the conditioning chamber 320. The conditioning assembly 370 is generally configured to receive a solution, including a foam, from the cartridge assembly 350, and further aerate the solution to produce another foam, such as a foam having a selectively defined consistency which may have an increased consistency relative to the foam received from the cartridge assembly 350. For example, the conditioning assembly 370 may be manipulatable and adaptable in order to create a foam having selectively defined consistency, such as any of the relatively thinner foams or relatively thicker foams, or any range of foams in between, as described herein; however, such foams are generally thicker than a foam received from the cartridge assembly 350. In contrast to the agitation media responsible for generating foam in the cartridge assembly 350, the conditioning assembly 370 may be configured to define a tortuous flow path of a selected length (e.g., via settings 1-8 illustrated in FIG. 5) for the solution having a variable length to facilitate foam generation. The length of the tortuous flow path may increase or decrease the amount of obstructions or other features experienced along the flow path in order to provide more or less aeration to the solution, thereby modifying the consistency of the foam produced by the conditioning assembly 370. The conditioning assembly 370 may be configured to increase or decrease the amount of obstructions and length of the tortuous flow path without modifying the overall length of the foam generating device 302. For example, the length of the tortuous flow path may be modified in response to a rotational input that increases the tortuous flow path without increasing a footprint of the foam generating device 302. Additionally or alternatively, the tortuous flow path may be modified in response to a push/pull input and/or other appropriate input that causes a change in length of the tortuous flow path without necessarily increasing a footprint of the foam generating device 302. For example, a selector, knob, or other feature may be temporarily pulled out and adjusted in a manner that causes the foam generating device 302 to define a different tortuous flow path length (e.g., with such as flow path length represented by settings 1-8 of FIG. 5). The selector may be subsequently pushed in order to cause the foam generating device 302 to maintain the newly selected tortuous flow path length during operation.

The conditioning assembly 370 may include a plurality of first members of cylindrical discs 372, such as a first cylindrical disc 372a, a second cylindrical disc 372b, a third cylindrical disc 372c, a fourth cylindrical disc 372d, and a fifth cylindrical disc 372e, as shown in FIGS. 9A and 9B. In other cases, more or fewer cylindrical discs may be provided. The plurality of cylindrical discs 372 operate to define the tortuous path having a selectively defined quantity of obstructions along the path. To illustrate, the first cylindrical disc 372a is described below. It will be appreciated that the cylindrical discs 372b-372e may be substantially analogous to the first cylindrical disc 372a and include like features and elements. Further, while the example depiction of FIGS. 9A and 9B shows the discs of the conditioning assembly 370 as being cylindrical, it will be appreciated that the discs may be substantially any shape and/or have substantially any peripheral contour as may be appropriate for a given application.

Figure 10A:
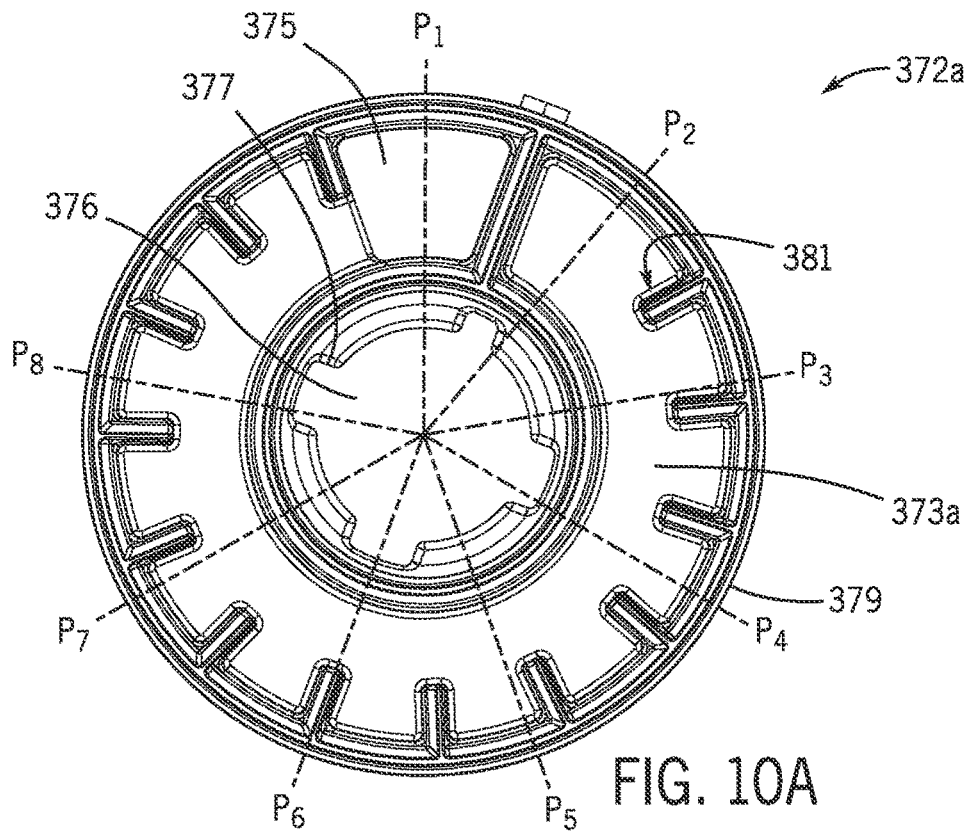
FIG. 10A depicts a first side of a cylindrical disc of the conditioning assembly of FIG. 9A.
Figure 10B:
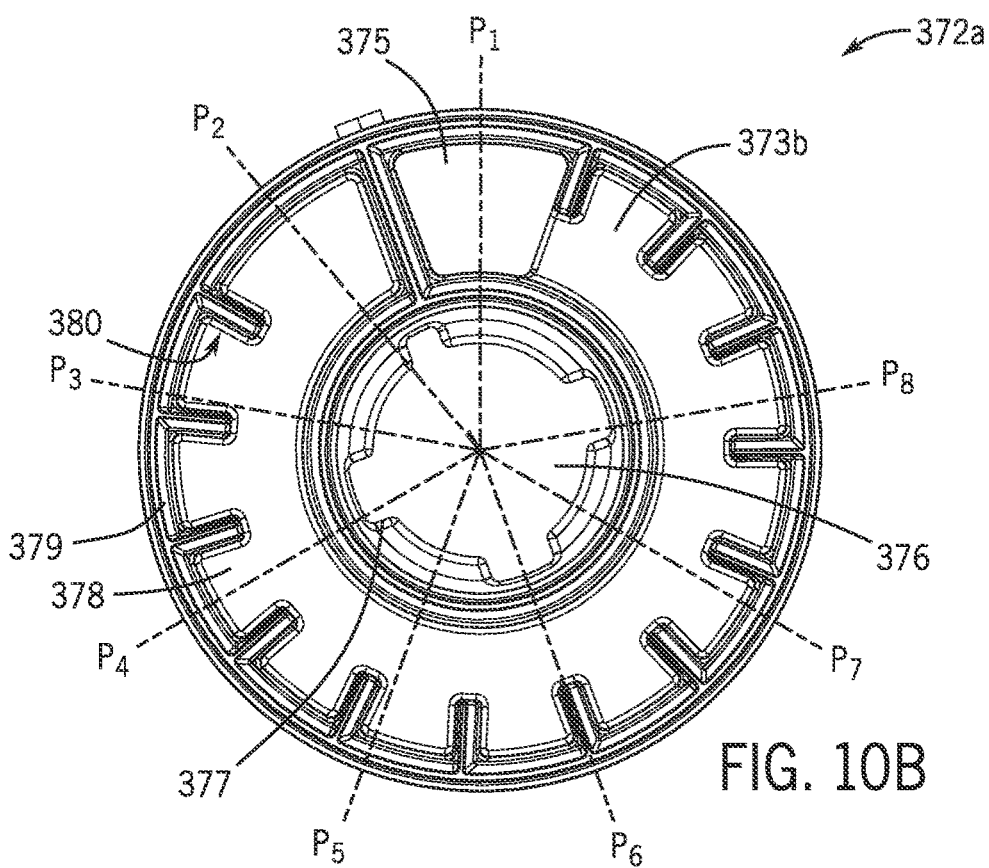
FIG. 10B depicts a second side of the cylindrical disc of FIG. 10A.

With reference to FIGS. 10A and 10B, the first cylindrical disc 372a includes a first side 373a and a second side 373b opposite the first side 373a. The first cylindrical disc 372a includes a disc-shaped portion 378 that extends circumferentially from an axial center of the first cylindrical disc 372a. The disc-shaped portion 378 may be a plate or other substantially planar structure that defines the first and second sides 373a, 373b of the first cylindrical disc 372a. The first cylindrical disc 372a further includes a rim portion 379. The rim portion 379 may be connected to a circumferential end of the disc-shaped portion and extend perpendicularly from opposing sides of the disc-shaped portion 378 to define an external circumferential wall of the cylindrical disc 372a. At the axial center of the first cylindrical disc 372a, the disc-shaped portion 378 may define an axial opening 376 including an internal circumferential wall. The axial opening 376 may extend through a complete thickness of the disc-shaped portion 378 and be configured to receive a shaft or rod or other feature for manipulating a position of the first cylindrical disc 372a. In this regard, the disc-shaped portion 378 may define a series of keyed features 377 about the axial opening 376. The keyed features 377 may include notches, grooves, cutouts, or the like that may be configured to engage a corresponding feature on a rod or other element received through the axial opening 376.

The first cylindrical disc 372a may define a portion of the tortuous path for the solution through the conditioning assembly 370. The disc-shaped portion 378 may define a floor of the disc 372a having a fluid opening 375. The fluid opening 375 may be configured to allow a solution to pass through the first cylindrical disc 372a, such as passing from the first side 373a to the second side 373b or vice versa. The first cylindrical disc 372a may also include a plurality of obstructions. For example, the first cylindrical disc 372a includes radial ribs 380 on the first side 373a (FIG. 10B). The first cylindrical disc 372a further includes radial ribs 381 on the second side 373b (FIG. 10A). The radial ribs 380 and the radial ribs 381 may be separated by the disc-shaped portion 378 or floor of the first cylindrical disc 372a.

The radial ribs 380, 381 may include ridges, protrusions, or other features that are positioned along and are raised from the disc-shaped portion 378. The radial ribs 380, 381 are positioned about the circumference of the first cylindrical disc 372a. For example, the radial ribs 380, 381 may be arranged generally at a regular circumferentially spaced interval. In other configurations, other intervals and arrangements are possible, including those in which the radial ribs 380, 381 are arranged at an irregular or other interval along the disc-shaped portion 378, and those configurations in which radial ribs 380, 381 include other shapes and features. With respect to the example of FIGS. 10A and 10B, the radial ribs 380, 381 are connected to and extend from the rim portion 379. The radial ribs 380, 381 may extend from the rim portion 379 and toward the axial center of the first cylindrical disc 372a. The ribs may terminate in the periphery of the internal circumference, and for instance may extend along half of the internal circumference of the disc-shaped portion 378 as illustrated in FIGS. 10A and 10B. In alternative embodiments, the length of radial ribs 380, 381 may for example, extend a distance of ⅛ radius, ¼ radius, ½ radius, ¾ radius of other dimension from the rim portion 379. The length of the radial ribs 380, 381 may be tuned based on a projected flow rate of solution through the conditioning assembly 370 in order to ensure an adequate passage of solution between the end of each respective rib and an internal radial wall of the assembly. In this regard, as the flow rate is increased (e.g., increased above 1 gallon per minute, above 2 gallon per minute, above 5 gallons per minute, and so on) the length of the radial ribs 380, 381, may be shorter than those assemblies configured for a lower flow rate. This may allow a flow of solution along the surfaces of the ribs, the floor, circumferential walls of the discs and a facing surface of a conditioning plate, described herein, to increase a surface area and disruptions where the fluid can flow and thereby increase aeration.

The conditioning assembly 370 may also include a plurality of second members or conditioning plates 386, such as a first conditioning plate 386a, a second conditioning plate 386b, a third conditioning plate 386c, and a fourth conditioning plate 386d, as shown in FIGS. 9A and 9B. In other cases, more or fewer conditioning plates may be provided. The plurality of conditioning plates 386 cooperate with the plurality of cylindrical discs 372 to define the tortuous flow path through the conditioning assembly 370. For example, the plurality of conditioning plates 386 may be interposed with the plurality of cylindrical discs 372 in an alternating fashion such that a given conditioning plate separates two adjacent discs of the plurality of cylindrical discs 372. In this regard, the given conditioning plate may cooperate to define a portion of the tortuous flow path with each of adjacent discs of the plurality of cylindrical discs 372. For purposes of illustration, the first conditioning plate 386a is described below. It will be appreciated that the conditioning plates 386b-386d may be substantially analogous to the first conditioning plate 386a and include like features and elements.

With reference to FIG. 9B, the first conditioning plate 386a may be a substantially planar plate or other structure that defines a barrier between the adjacent first cylindrical disc 372a and the second cylindrical disc 372b. The first conditioning plate 386a defines a body portion 387 that defines substantially planar opposing faces of the first conditioning plate 386a. The body portion 387 define an axial opening 388 at an axial center of the first conditioning plate 386a. The axial opening 388 may be configured to receive a rod, shaft, or other feature of the conditioning assembly 370 therethrough. The body portion 387 may also define a fluid opening 389. The fluid opening 389 may be configured to allow a solution, including a foam, to pass through the first conditioning plate 386a. The body portion 387 may further include attachment features 390 that are defined along a periphery of the first conditioning plate 386a. The attachment features 390 may include protrusions or other features that are configured to key or lock a rotational position of the conditioning plate 386a.

The conditioning assembly 370 is also shown as including an inlet plate 393 and an outlet plate 397. The plurality of cylindrical discs 372 and the plurality of conditioning plates 386 may be arranged interposed with one another with the inlet plate 393 and the outlet plate 397 arranged at opposing ends of the interposed arrangement of the discs 372 and plates 386. The inlet plate 393 may include an axial opening 394 that is configured to receive a rod or other feature of the conditioning assembly 370 along an axial center of the inlet plate 393. The inlet plate 393 may further include a fluid opening 395 that is configured to receive and allow for passage of a solution, including a foam, through the inlet plate 393. The inlet plate 393 may also include one or more attachment features 396 that are arranged along a periphery or circumference of the inlet plate 393. The attachment features 395 may be configured to restrain rotational movement of the inlet plate 393 with engagement of a corresponding structure disposed about the periphery of the inlet plate 393. The outlet plate 397 may be positioned opposite the inlet plate 393 and include an axial opening 398 and a fluid opening 399, which may be substantially analogous to the axial opening 394 and the fluid opening 395 of the inlet plate 393, respectively.

The conditioning assembly 370 may further include an adjustable member or rod 346, as shown in FIG. 9B. The rod 346 may be an elongated structure that is configured to extend along an axial length of the conditioning assembly 370. The rod 346 may have a series of longitudinal ridges 347. The longitudinal ridges 347 may be raised portions of the rod 346 that are configured to be received by complementary structures along the axial length of the conditioning assembly 370. The rod 346 may have a free end 349 having a lip or other feature that extends radially from an axial center of the rod 346. The rod 346 may further include an adjustment knob 342 opposite the free end 349. The adjustment knob 342 may be connected with the rod 346 in a manner that such that a rotation of the adjustment knob 342 causes a corresponding rotation of the rod 346. The adjustment knob 342 may include a selector 343 that is configured to provide an indication of a rotational position of the rod 346. The rod 346 may also include or be associated with a torque knob 344. The torque knob 344 may be associated with the rod 346 to cause an axial compression or tension of the rod 346. For example, rotation of the torque knob 344 may cause the adjustment knob 342 or other portion or other adjacent component to be biased toward the free end 349, compressing elements arranged therebetween. Additionally or alternatively, springs, foams, and/or other biasing features may be used to facilitate the compression and sealing of the discs and plates of the conditioning assembly 370.

The conditioning assembly 350 may be coupled such that plurality of cylindrical discs 372 and the plurality of conditioning plates 386 are interposed with one another and associated with the rod 346. For example and as shown in FIGS. 9A and 9B, the rod 346 may extend through an axial opening of each of the plurality of cylindrical discs (e.g., axial opening 376) and an axial opening of each of the plurality of conditioning plates (e.g., axial opening 388). In FIGS. 9A and 9B, the axial opening is arranged along a center of the discs. In other examples, the rod 436 may be coupled with the discs in other manners, including being coupled to the discs off-axis, at a periphery of the discs, and so on. The plurality of cylindrical discs 372 may be coupled with the rod 346 in a manner that allows the plurality of cylindrical discs 372 to be rotated together with the rotation of the rod 346. For example, the series of longitudinal ridges 347 may be received by keyed features of each of the plurality of cylindrical discs (e.g., keyed features 377). The series of longitudinal ridges 347 may engage the respective keyed features and restrict rotational movement of the corresponding cylindrical disc relative to the rod 346. This may allow the rod 346 to rotate and subsequently cause a corresponding rotation of the any or all of the cylindrical discs 372 engaged with the longitudinal ridges 347. As the rod 346 rotates to a higher foam setting, the solution passes along an increasingly longer portion of the discs 372 as shown in FIGS. 11A-11H. Further, the plurality of conditioning plates 386 may be coupled with the rod 346 in a manner that allows the rod 346 to rotate relative to the plurality of conditioning plates 386. In this regard, a rotational position of some or all of the conditioning plates 386 may remain fixed and non-rotational within the conditioning assembly 370 while the rod 346 rotates therein. Further, a rotational position of some or all of the conditioning plates 386 may remain fixed within the conditioning assembly 370 while the plurality of cylindrical discs 372 rotates with the rotation of the rod 346. In this manner, the plurality of conditioning plates 386 and the plurality of cylindrical discs 372 are configured for relative rotational movement with respect to one another.

The conditioning assembly 370 is further coupled such that the rod 346 extends axially fully through each and every one of the outlet plate 397, the plurality of conditioning plates 386, the plurality of cylindrical discs 372, and the inlet plate 393. In this manner and as shown in FIG. 9, inlet plate 393 may be seated at the free end 349 of the rod 346. The free end 349 may include a lip 349a that prevents the inlet plate 393 from sliding off the free end 349 and generally constrains axial movement of the inlet plate 393. With each of outlet plate 397, the plurality of conditioning plates 386, the plurality of cylindrical discs 372, and the inlet plate 393 received on the rod 346, and axially restrained by the lip 349a, the torque knob 344 may be manipulated to axially restrain the received components at the opposing end. The torque knob 344 may also be further manipulated and rotated in order to compress the outlet plate 397, the plurality of conditioning plates 386, the plurality of cylindrical discs 372, and the inlet plate 393 along the rod 346. The compression may form a seal between a given conditioning plate of the plurality of conditioning plates 386 and the adjacent two cylindrical discs of the plurality of cylindrical discs 372. The seal may be further supported or maintained by springs, foams, and/or other biasing features. For example, the body portion 387 of the first conditioning plate 386a may sealingly engage the rim portion 379 of the first cylindrical disc 372a, as well as a corresponding rim portion of the second cylindrical disc 372b, opposite the first cylindrical disc 372a. The remaining conditioning plates and cylindrical discs may be sealing engaged with one another in an analogous manner.

The sealing engagement of the first conditioning plate 386a and the first cylindrical disc 372a may operate to define a tortuous flow path between the first conditioning plate 386a and the first cylindrical disc 372a. For example, the sealing engagement of the first conditioning plate 386a and the first cylindrical disc 372a may form a cavity that is bounded by the first conditioning plate 386a and the first cylindrical disc 372a. The cavity may include a quantity of obstructions, such as a quantity of the radial ribs 380, 381 shown with respect to FIGS. 10A and 10B. In this regard, the solution may be directed through the cavity and encounter the radial ribs 380, 381 or other obstructions, which may aerate or otherwise introduce gas into the solution. The remaining cylindrical discs plurality of cylindrical discs 372b-372e and the remaining conditioning plates 386b-386d may be sealing engaged with one another in a manner substantially analogous to the sealing engagement of the first cylindrical disc 372a and the first conditioning plate 386a, redundant explanation of which is omitted here for clarity.

The plurality of cylindrical discs 372 may be configured to sequentially receive solution that is advanced through the conditioning assembly 370. The solution may generally proceed along a first side of a given cylindrical disc (e.g., the first side 373a or the second side 373b of the first cylindrical disc 372a), through an opening or passage of the given cylindrical disc (e.g., the opening 375), and along a second side of the given cylindrical disc (e.g., the second side 373b of the first cylindrical disc 372a). Along the first side, the solution may encounter radial ribs or obstructions (e.g., the radial ribs 380) and along the second side, the solution may encounter radial ribs or obstructions (e.g., the radial ribs 381) such that the cylindrical disc defines a tortuous flow path for the fluid that is configured to induce aeration of the solution by interaction and disruption of the solution by the radial ribs. The solution may proceed along each cylindrical discs, sequentially, flowing along the first side having the radial ribs, the opening, and the second side having the radial ribs, such that each cylindrical disc may define a portion of the tortuous path of the conditioning assembly 370.

For example and as shown in FIG. 9B, a solution may flow through the conditioning assembly 370 along a flow path f. As described herein, FIG. 9 shows the flow path f as a generally straight line through the conditioning assembly 370, which may result in little to substantially no conditioning. As the discs 372 are increasingly misaligned (e.g., due to a rotational input, a push/pull input, and other appropriate input) with the conditioning plates 386, the flow path length increases, becoming a tortuous flow path, as shown herein with respect to FIGS. 11B-11H. The flow path f shows a path for solution through the conditioning assembly 370, starting at the inlet plate 393, extending through the interposed plurality of cylindrical discs 372 and plurality conditioning plates 386, and ending at the outlet plate 397. For example, solution may be introduced to the conditioning assembly 370 at the opening 395. The solution may proceed on the flow path f to be received by the first cylindrical disc 372a. Where the cylindrical discs 372 are misaligned with the conditioning plates 386, the solution may pass along a portion of the first side 373a of the first cylindrical disc 372a having radial ribs 380 (e.g., as shown in FIGS. 11B-11H). The solution may continue through the first cylindrical disc 372a at the opening 375. Where the cylindrical discs 372 are misaligned with the conditioning plates 386, the solution may continue along the second side 373b of the first cylindrical disc 372a having the radial ribs 381. The solution may continue on the flow path f to be received through the first conditioning plate 386a and pass through the first conditioning plate 386a at the opening 389. The solution may proceed along the flow path f and be received by the second cylindrical disc 372b, the second conditioning plate 386b, the third cylindrical disc 372c, the third conditioning plate 386c, the fourth cylindrical disc 372f, the fourth conditioning plate 386d, and the fifth cylindrical disc 372e in a corresponding manner, in series, with each cylindrical disc of the plurality of cylindrical discs 372 and each conditioning plate of the plurality of conditioning plate 386 defining a portion of the flow path f, as shown in FIG. 9B.

The foam generating device 302 is coupled such that the conditioning assembly 370 is arranged with the conditioning chamber 320 of the housing 306. For example, the conditioning assembly 370 is arranged within the second tube portion 307b of the second housing portion 306b with the inlet plate 393 fluidically adjacent to the agitation chamber 316. In this regard, an output of the cartridge assembly 350 that is arranged with the agitation chamber 316 can flow to and be received by the conditioning assembly 370 at the inlet plate 373. The received solution may then flow along the flow path f though the conditioning assembly 370 and to the outlet plate 397, as described above. The outlet plate 397 may be arranged within the conditioning chamber 320 fluidically adjacent to the outlet portion 312 so that solution, including foams of various consistencies can proceed from the outlet plate 397 to the outlet 314 for emission by the conditioning assembly 370 as spray.

The conditioning assembly 370 is further arranged in the conditioning chamber 320 such that selective components of the conditioning assembly 370 remain fixed or capable of relative rotational movement to facilitate one or more operations of the foam generating device 302. For example and as shown with reference to FIGS. 6 and 9, the conditioning assembly 370 may generally be secured to an inner wall of the second housing portion 306b that is defined by the second tube portion 307b. In a specific implementation, the plurality of conditioning plates 386 may each be configured to engage the inner wall of the second tube portion 307b in order to retain or prevent rotational movement of the conditioning plates 386 relative to the second housing portion 306b. The attachment portion 390 of the first conditioning plate 386a may engage the surface or complementary feature of the second housing portion 306b. The remaining plurality of conditioning plates may be engaged with the second housing portion 306b in a substantially analogous manner. In other examples, other configurations are contemplated to permit relative movement between the discs and plates of the conditioning assembly 370. For example, a sleeve may be used to press into the housing 306. The sleeve may house the plates within an inner channel of the sleeve. The sleeve may press into the housing 306 and locate the discs, collectively, at an appropriate positioning with the housing 306. The sleeve may then also prevent movement of the plates once inside the housing 306, which in turn permits movement of the discs relative to the plates according to one or more of the techniques described herein.

The plurality of cylindrical discs 372 may be arranged in the conditioning chamber 320 in a manner that allows each of the cylindrical discs 372 to rotate within the conditioning chamber 320. For example, the plurality of cylindrical discs 372 may be separated from a wall of the conditioning chamber 320 allowed to rotate with the rotation of the rod 346. As described above, the rod 346 may be attached to each of the plurality of cylindrical discs 372 for common rotational movement and extend through the plurality of conditioning plates 386. The rod 346 may therefore be positioned at least partially within the conditioning chamber 320. The rod 346 may be at least partially positioned within the conditioning chamber 320 and extend therefrom and through the first housing portion 306a to an exterior of the foam generating device. The adjustment knob 342 and the torque knob 344 may therefore be arranged along the exterior of the foam generating device 302.

In operation, the adjustment knob 342 may be used to rotate the rod 346 to a specified rotational position. For example, the adjustment knob 342 may be rotated (e.g., via rotation input received from a user), and cause a corresponding rotation of the rod 346. In other examples, the adjustment knob 342 may be manipulated in another manner, which causes the rotation of rod 346, including being pushed, pulled, toggled, and so on. The rotation of the rod 346 may cause the plurality of cylindrical discs 372 to rotate correspondingly. The rotation of the plurality of cylindrical discs 372 may change a length of the flow path f. The quantity of fluid obstructions or radial ribs encountered by the solution of the flow path f may increase or decrease with the change in length of the flow path f and therefore define the flow path f as a tortuous flow path. The level of aeration of the solution on the flow path f may be based, in part, on the quantity of obstructions or radial ribs encountered by the solution, with a greater quantity of obstructions providing more aeration of the solution and a lesser quantity of obstructions providing less aeration of the solution. The consistency or thickness of the foam is dependent, in part, on the level of aeration in the solution. Accordingly, the adjustment knob 342 may be used to rotate the rod 346 and cause the foam generating device 302 to produce foams of various different consistencies.

By way of example, the adjustment knob 342 may be rotated to a range of angular positions. The selector 343 may indicate a rotational position of the adjustment knob 342. In this regard, the adjustment knob 342 may be rotated such that the selector 343 is substantially aligned with one of the settings 340, such as being aligned with the first setting 340a, the second setting 340b, the third setting 340c, the fourth setting 340d, the fifth setting 340e, the sixth setting 340f, the seventh setting 340g, or the eight setting 340h, as shown in FIG. 5. The adjustment knob 342 may be rotated to one of the rotational positions of the settings 340 and cause the rod 346 to rotate into a corresponding rotational position. As described herein, the plurality of cylindrical discs 372 are keyed or otherwise coupled to the rod 346 so that the rotation of the rod 346 cause the rotation of the plurality of cylindrical discs 372. The rod 346 and the plurality of cylindrical discs 372 may rotate together, e.g., the rod 346 may slave the cylindrical discs in rotation. Accordingly, the adjustment knob 342 may be rotated to one of the rotational positions of the settings 340 and cause, via operation of the rod 346, the plurality of cylindrical discs 372 to rotate into a corresponding rotational position.

For example and with reference the first cylindrical disc 372a of FIGS. 10A and 10B, the first cylindrical disc is shown in a rotational position $P_1$. In the rotational position $P_1$, the fluid opening 375 may be arranged a substantially 12 o'clock radial position. The first rotational position $P_1$ may correspond to a rotational position of the adjustment knob 342 in which the selector 343 is substantially aligned with the first setting 340a. In the first rotational position $P_1$, the opening 375 may be substantially aligned with the opening 389 of the first conditioning plate 386a. The remaining plurality of cylindrical discs 372b-372e and remaining plurality of conditioning plates 386b-386d may be similarly aligned in order to establish a first tortuous flow path $f_{11A}$, as shown in FIG. 11A. The first tortuous flow path $f_{11A}$ may represent a tortuous flow path in which the least amount of aeration is provided to the solution by the conditioning assembly 370. In some cases, the first tortuous flow path $f_{11A}$ may allow the solution to pass through the conditioning assembly 370 with no or minimal fluidic interaction from the obstructions and radial ribs described herein.

The conditioning assembly 370 may be further operated to cause the plurality of cylindrical discs 372 to rotate. With reference to the example of the first cylindrical disc 372a, the first cylindrical disc 372a may be subsequently rotated to a second rotational position $P_2$, which may correspond to a rotational position of the adjustment knob 342 in which the selector 343 is substantially aligned with the second setting 340b. In the second rotational position $P_2$, the opening 375 may be misaligned with the opening 389 of the first conditioning plate 386a. The misalignment of the opening 375 and the opening 389 may cause the solution received by the conditioning assembly 370 to advance along the first side 373a having the radial ribs 380, through the opening 375, and along the second side 373b having the radial ribs 381 before advancing through the opening 389. The solution may travel along the first and second sides 373a, 373b for a length that corresponds to a value of the misalignment of the opening 375 and the opening 389. In this regard, the solution will travel along a quantity or subset of the radial ribs 380, 381 that corresponds to the length of travel of the solution along the first side 373a and the second side 373b. The quantity or subset of radial ribs may operate to aerate the solution, as described herein, to produce a foam having a certain consistency or aeration, which may be indicated by the rotational position of the selector 343. The remaining plurality of cylindrical discs 372b-372e and remaining plurality of conditioning plates 386b-386d may be similarly misaligned in order to establish a second tortuous flow path $f_{11B}$, as shown in FIG. 11B. The second tortuous flow path $f_{11B}$ may represent a tortuous flow path in which more aeration is provided to the solution by the conditioning assembly 370, as compared with the first tortuous flow path $f_{11A}$, and thereby is adapted to produce a thicker foam.

The conditioning assembly 370 may be further operated to cause the plurality of cylindrical discs 372 to further rotate into another position, such as any of the rotational positions $P_3$, $P_4$, $P_5$, $P_6$, $P_7$, or $P_8$, shown with respect to first cylindrical disc 372a of FIGS. 10A and 10B. The first cylindrical disc 372a may be in one of the rotational positions $P_3$-$P_8$ based on the adjustment knob 342 being substantially aligned with a corresponding one of the third through eighth settings 340c-340h. In each subsequent rotational position $P_3$-$P_8$ of the first cylindrical disc 372a, the opening 375 may be further misaligned with the opening 389 to further aerate the solution. The remaining plurality of cylindrical discs 372b-372e and remaining plurality of conditioning plates 386b-386d may be similarly further misaligned in order to establish: a third tortuous flow path $f_{11C}$, as shown in FIG. 11C, when the plurality of discs 372 are in the third rotational position $P_3$; a fourth tortuous flow path $f_{11D}$, as shown in FIG. 11D, when the plurality of discs 372 are in the fourth rotational position $P_4$; a fifth tortuous flow path $f_{11E}$, as shown in FIG. 11E, when the plurality of discs 372 are in the fifth rotational position $P_5$; a sixth tortuous flow path $f_{11F}$, as shown in FIG. 11F, when the plurality of discs 372 are in the sixth rotational position $P_6$; a seventh tortuous flow path $f_{11G}$, as shown in FIG. 11G, when the plurality of discs 372 are in the seventh rotational position $P_7$; and an eighth tortuous flow path $f_{11H}$, as shown in FIG. 11H, when the plurality of discs 372 are in the eighth rotational position $P_8$.

It will be appreciated that the position of the plurality of discs 372 is shown in FIGS. 11A-11H for purposes of illustration and are not intended to limit the inventive aspects to the conditioning assembly 370 operations disclosed herein. For example, the opening 375 of a given disc may generally be arranged at a 12 O'clock position in the first rotational position $P_1$, represented by the configuration shown in FIG. 11A. The opening 375 of a given disc may further generally be arranged at a 10 O'clock position in the eighth rotational position $P_8$, represented by the configuration shown in FIG. 11H. The rotational positions $P_2$, $P_3$, $P_4$, $P_5$, $P_6$, $P_7$ proceed substantially evenly spaced about the axis of rotation of the conditioning assembly 370. In other examples, different spacing of the rotational positions $P_1$-$P_8$ are possible and contemplated herein, including positions that are not evenly spaced and/or configurations in which more or fewer positions are defined by the conditioning assembly 370.

In operation, the foam may be output from the conditioning assembly 370 at the outlet plate 397 and advanced through the housing 306 to the outlet portion 312. The foam may be emitted from the outlet portion 312 at the outlet 314. The foam generating device 302 of the present disclosure is configured to releasably couple with a variety of different nozzle assemblies, hoses, tubes, couplings, and so on that may receive the foam and transport and/or emit the foam as a spray or other targeted flow. The releasably coupled nozzle assembly and the foam generating device 302 may define a foam generating system, such as the foam generating system 300 shown in FIGS. 3 and 4, including the foam generating device 302 and the nozzle assembly 400. The nozzle assembly 400 may be configured to deliver an oscillatory spray of the foam that is generated by the foam generating device 302 in a variety of spray configurations, e.g., fan or cylindrical foams, as shown in the example of FIG. 1. The components of the nozzle assembly 400 are described below for purposes of illustration. It will be appreciated that in other examples, different nozzles may be associated with the foam generating device 302, for example, includes nozzle that may deliver the foam as a fixed stream, and/or nozzle that emit the foam in various shapes, such as different fan or jet-type shapes.

Figure 12:
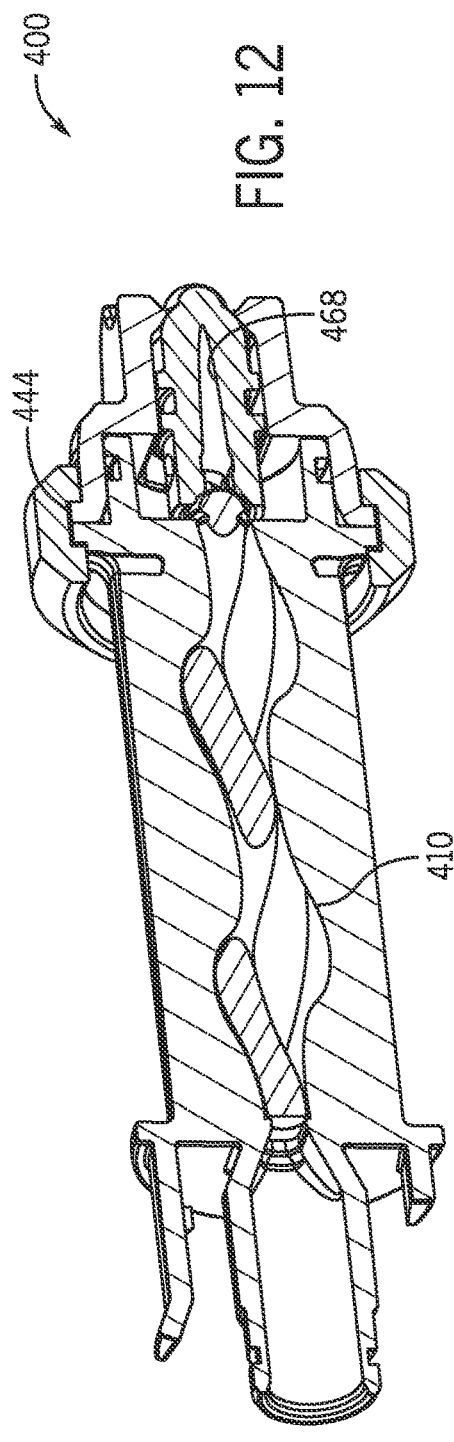
FIG. 12 depicts a cross-sectional view of the nozzle assembly of FIG. 4, taken along line 12-12 of FIG. 4 according to implementations of the present disclosure.
Figure 13:
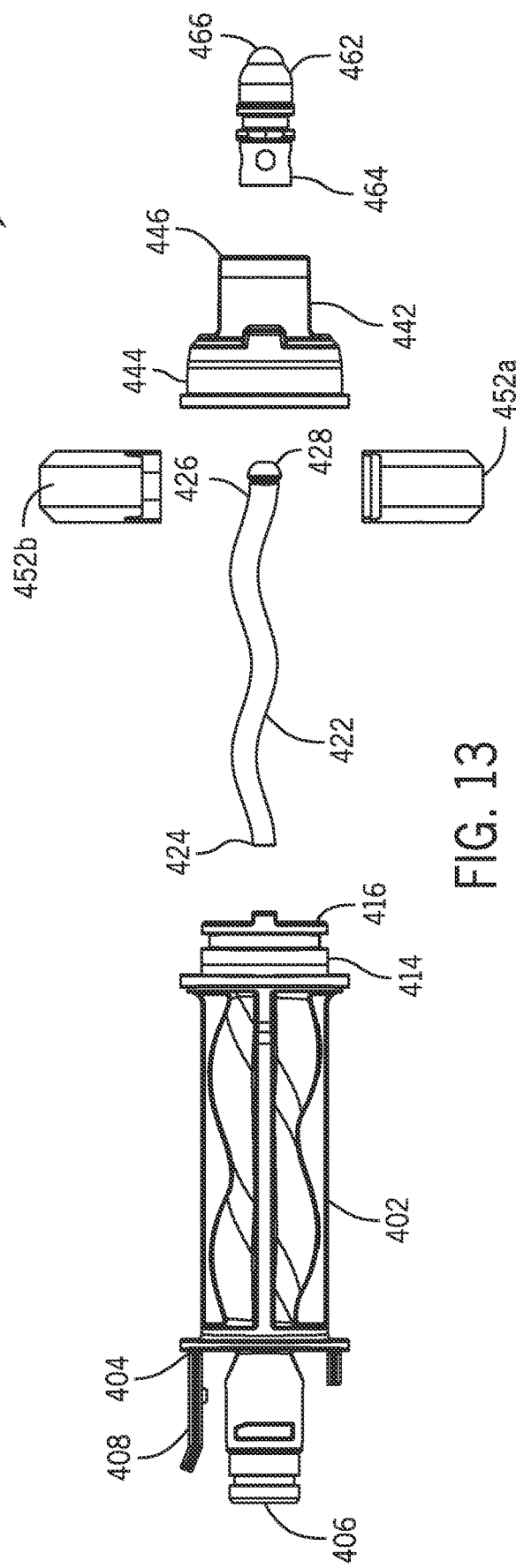
FIG. 13 depicts an exploded view of the nozzle assembly of FIG. 4.

With reference to FIGS. 12 and 13, the nozzle assembly 400 may include a nozzle body 402. The nozzle body 402 may be an integrally formed or one-piece structure that defines a cavity 410. The cavity 410 extends between a nozzle body inlet 406 and a nozzle body outlet 416. The nozzle body 402 may further define a coupling portion 404 adjacent the nozzle body 406. The coupling portion 404 may include an attachment feature 408, such as a rotational lock. The attachment feature 408 may extend elongated from the body 402 alongside the nozzle body inlet 406. The rotational lock may help prevent the nozzle assembly 400 from inadvertently being rotated to an unlocked position. The attachment feature 408 may optionally include clips, latches, and/or other securement structures. In some cases, radial lugs 409 (FIG. 4) may also be included. The radial lugs 409 may include resilient features that are receivable by one or more features of the foam generator device 400 to secure the nozzle assembly 400. For example, the radial lugs 409 may be resilient and partially deformable relative to a main portion of the body 402 without cracking or failing. This may also allow the nozzle assembly 400 to be removably attachable to the foam generator device, for example, as may be desirable when changing or replacing the nozzle assembly 400 for servicing. The nozzle body 402 may further include a nozzle housing engagement portion 414. The nozzle housing engagement portion 414 may include a ring or other annular feature about the nozzle body outlet 416.

The nozzle assembly 400 further includes a rotor 422. The rotor 422 may be a helical-type component having a first end 424 and a second end 426. The rotor 422 may further include a nozzle coupling 428 at the second end 428. The nozzle assembly 400 may further include a nozzle housing 442. The nozzle housing 442 may include a nozzle body coupling portion 444 and a nozzle seat 446. The nozzle body coupling portion 444 may be configured to receive the nozzle body 402, such as being configured to receive the nozzle housing engagement portion 414. The nozzle seat 446 may be a hollow chamber or portion of the nozzle housing 442 that is configured to receive a nozzle component or other element that is configured to direct a flow of fluid for emission by the nozzle assembly 400. In this regard, the nozzle assembly 400 may further include a nozzle component 462. The nozzle component 462 may include a coupling 464 and a tip 466. The coupling 464 may be configured to secure the nozzle component 462 to the nozzle assembly 400. The tip 466 may include an internal channel 468 that is configured to receive and direct the flow of fluid from the nozzle assembly 400. The nozzle assembly 400 may further include a first clamp 452a and a second clamp 452b. The first and second clamps 452a, 452b may be substantially semi-circular features that are configured to receive one or more components of the nozzle assembly 400 for coupling of the various components of the nozzle assembly 400 to one another.

One or more components of the nozzle assembly 400 may include a tapered surface or contour. For example, the exterior and/or interior surfaces of the nozzle body 402 may define a taper. In some cases, the cavity 410 can be tapered such that the nozzle body 402 defines a first width of the cavity 410 at a first end and a second, different width of the cavity 410 at the opposing end. In this regard, the rotor 422 may also have a taper, such as having a taper between the first and second ends 424, 426. The taper of the rotor 422 may be configured to match the taper of the cavity 410. Additionally or alternatively, the nozzle housing 442 and/or the nozzle component 462 may also have one or more tapered surfaces, including have a tapered internal and/or exterior surface.

The nozzle assembly 400 may be coupled such that the rotor 422 is arranged within the cavity 410 of the nozzle body 402. The nozzle component 462 may be coupled with the nozzle coupling 428 at the second end 426. The nozzle component 462 may be coupled with the nozzle coupling 428 at a ball joint or other joint to permit multi-axis movement of the rotor 422 and the nozzle component 462 relative to one another. The nozzle assembly 400 may be further coupled such that the nozzle housing 442 is fitted over the nozzle component 462 and arranged adjacent the nozzle outlet 416. The nozzle housing 442 may define a seat for the nozzle component 462, as shown in the cross-sectional view of FIG. 12. The nozzle assembly 400 may be further coupled such that the first and second clamps 452a, 452b are fitted over the nozzle body 402 at the attachment portion 414 and the nozzle housing 442 at the nozzle body coupling portion 444. The first and second clamps 452a, 452b may define a sealed fitting between the nozzle body 402 and the nozzle body coupling portion 444. In some cases, a pin, fastener, screw, or other feature may secure the first and second clamps 452a, 452b to one another to maintain the sealed engagement of the nozzle body 402 and the nozzle body coupling portion 444.

In operation, the nozzle assembly 400 may be releasably coupled to the foam generating device 302, and the nozzle assembly 400 may be an optional component of the foam generating system 300. When the nozzle assembly 400 is present, the nozzle body inlet 406 may be advanced into the outlet portion 312 of the housing 306. The coupling portion 404 of the nozzle body 402 may be slid over the outlet portion 312 and the attachment feature 408 used to engage a complimentary attachment portion of the foam generating device 302. This attachment may cause the nozzle assembly 400 to be releasably secured to the foam generating device 302 and establish a fluid path between the foam generating device 302 and the nozzle assembly 400. In some cases, the coupling portion 404 of the nozzle body 402 may be manipulated to remove the nozzle assembly 400 from the foam generating device 302 as needed. Further, a bridge 336 may be provided to secure and stabilize the nozzle assembly 400 relative to the foam generating device 302. As shown in FIG. 3, the bridge 336 may include a device portion 336a and a nozzle portion 336b. The device portion 336a may define a saddle or mount that is fitted over the housing 306. The nozzle portion 336b may define an opening that is configured to receive the nozzle body 402 therethrough. It will be appreciated that other shapes and configurations of the bridge 336 are possible based on the type and configuration of the nozzle assembly 400.

Foam or other solution may be emitted from the foam generating device 302 at the outlet 314, as described herein. When the nozzle assembly 400 is present, the nozzle assembly 400 may receive the foam at the nozzle body inlet 406. The foam may proceed from the nozzle body inlet 406 and into the cavity 410. The flow of the foam may cause a rotation of the rotor 422 within the cavity 410. The foam may proceed through the cavity 410 to the nozzle body outlet 416. The foam may continue to the nozzle component 462. For example, the foam may be receive by the interior channel 468 of the nozzle component 462 and emitted from the nozzle component 462 at the tip 466. The tip 466 may be fan-shaped in order to emit the foam in the shape of a fan. In other cases, the tip 466 may be shaped as a jet or other configuration in order to further define the shape of the foam. In some cases, the nozzle component 466 may rotate based on the rotation of the rotor 422. In this regard, the foam or other solution may be emitted from the nozzle assembly in a fan-shaped configuration. It will be appreciated that while the rotor 422 is rotating due to the helical shape, the path of the emitted spray may have ends that are generally in a straight line, as shown in FIG. 1.

Figure 14:
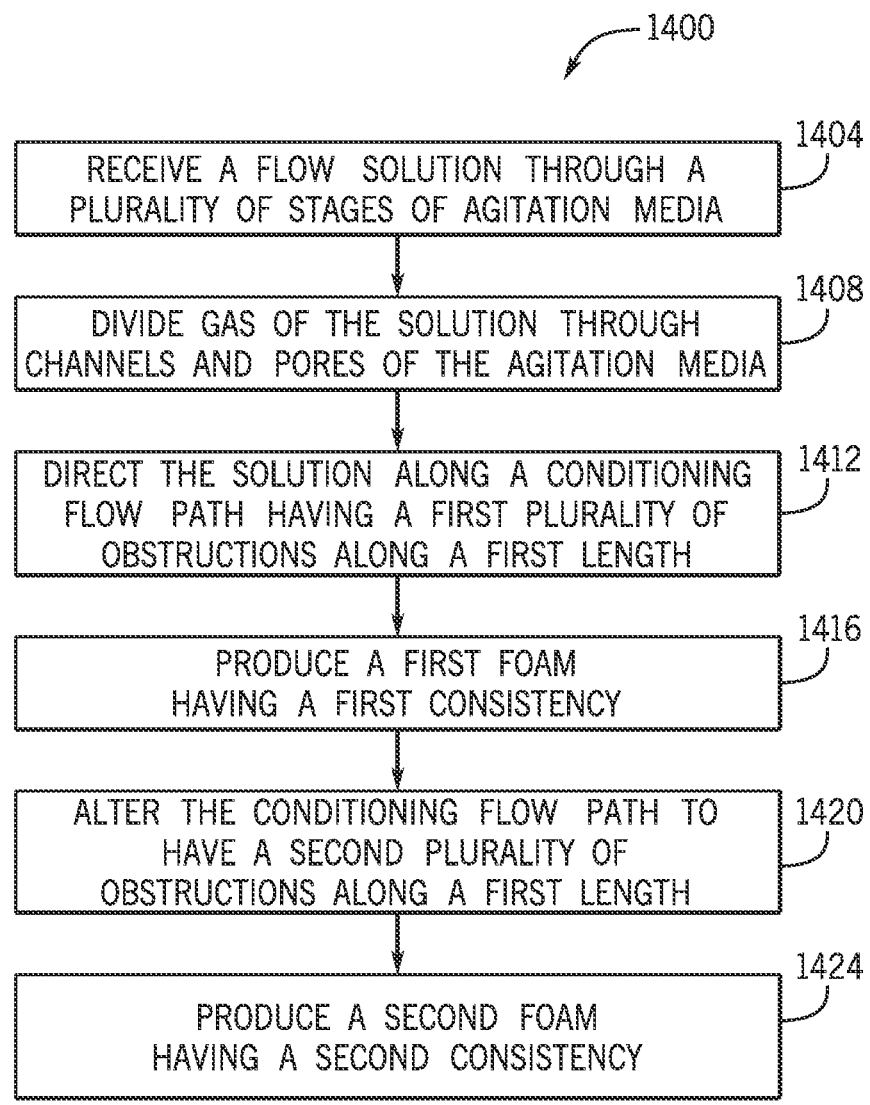
FIG. 14 depicts a flow diagram for a method of producing foam with a foam generating device

FIG. 14, illustrates process 1400 identifying the various functionalities of the embodiments discussed herein. At operation 1404, a flow of solution is received through a plurality of stages of agitation media. For example and with reference to FIGS. 6-7B, a flow of solution may be received at the inlet 310 of the foam generating device 302. The solution may be advanced through the foam generating device 302 to the agitation chamber 316 and into the cartridge assembly 350 held therein. The solution may travel through the first stage of agitation 351a, as defined by the first cartridge 352a. The solution may subsequently travel through the second stage of agitation 351b, as defined by the second cartridge 352b. The solution may subsequently travel through the third stage of agitation 351c, as defined by the third cartridge 352c. Each of the stages 351a-351c may include agitation media held therein.

At operation 1408, a quantity of gas in the solution is divided through channels and pores of the agitation media. With reference to FIGS. 6-7B, the flow of solution may be at least partially obstructed, blocked or interrupted by the agitation media held in the cartridge assembly 350. The agitation media may generally form various channel or pores throughout the cartridge assembly 350. In this regard, the cartridge assembly 350 with the agitation media may induce coalescing, in part, by providing a labyrinth of channels and pores that divide the air through the chamber. This can also cause back pressure to build and therefore allow for the introduction of more gas in to the solution. In the present example, agitation media may be held in each of the first chamber 353a of the first cartridge 352a, the second chamber 353b of the second cartridge 352b, and the third chamber 353c of the third cartridge 353c. In this regard, the agitation media of each chamber may divide the gas in various channel and pores contribute to coalescing of gas as the solution progressively passes through the cartridge assembly 350.

At operation 1412, the agitated solution with an initial amount of gas introduced therein, is directed along a conditioning flow path having a first plurality of obstructions along a first length. For example and with reference to FIGS. 10A-11A, the foam generating device 302 may advance the solution from the cartridge assembly 350 to the conditioning assembly 370. In a first configuration, the conditioning assembly 370 may define a tortuous flow path $f_{11A}$ having a first length and first quantity of obstructions. For example, the conditioning assembly 370 may be configured such that the adjustment knob 342 causes the plurality of cylindrical discs 372 to define the rotational position $P_1$. At the rotational position $P_1$, the plurality of cylindrical discs 372 may be rotationally positioned with the conditioning assembly 370 may define the tortuous flow path $f_{11A}$. The tortuous flow path $f_{11A}$ may include a first quantity of radial ribs or other obstructions that conditions the agitated solution to cause a further amount of gas to be introduced therein. Consequently, at operation 1416, the tortuous flow path $f_{11A}$ may be operable to produce a first foam having a first consistency, based on the quantity of the radial ribs disposed along the path.

At operation 1420, the solution is directed along a conditioning flow path having a second plurality of obstructions along a second length. For example and with reference to FIGS. 10A-11B, the foam generating device 302 may advance the solution from the cartridge assembly 350 to the conditioning assembly 370. In a second configuration, the conditioning assembly 370 may define a tortuous flow path $f_{11B}$ having a second length and second quantity of obstructions that conditions the agitated solution to cause a further amount of gas to be introduced therein, and the increased number of obstruction increases the amount of gas introduced therein relative to the first quantity of radial ribs of the first tortuous flow path $f_{11A}$. For example, the conditioning assembly 370 may be configured such that the adjustment knob 342 causes the plurality of cylindrical discs 372 to define the rotational position $P_2$. At the rotational position $P_2$, the plurality of cylindrical discs 372 may be rotationally positioned with the conditioning assembly 370 may define the tortuous flow path $f_{11B}$. The tortuous flow path $f_{11B}$ may include a second quantity of radial ribs or other obstructions. At operation 1416, the tortuous flow path $f_{11b}$ may be operable to produce a second foam having a second consistency, based on the quantity of the radial ribs disposed along the path.

Figure 15A:
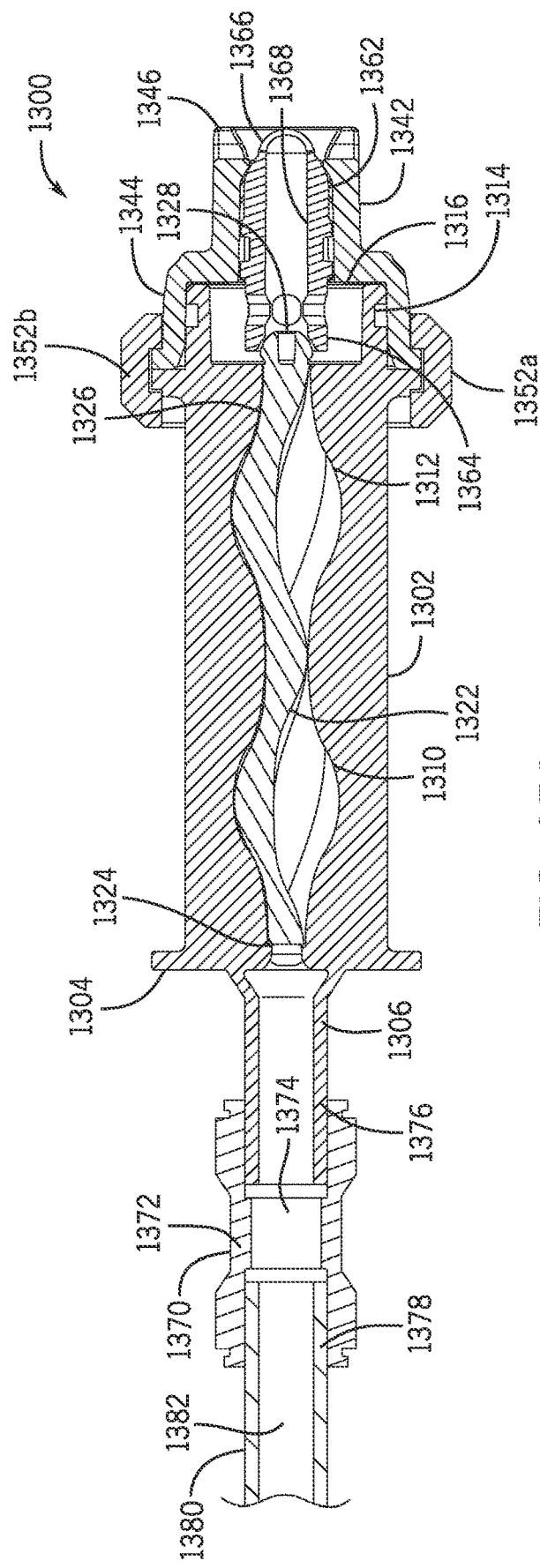
FIG. 15A depicts a cross-sectional view of a nozzle assembly according to implementations of the present disclosure.
Figure 15B:
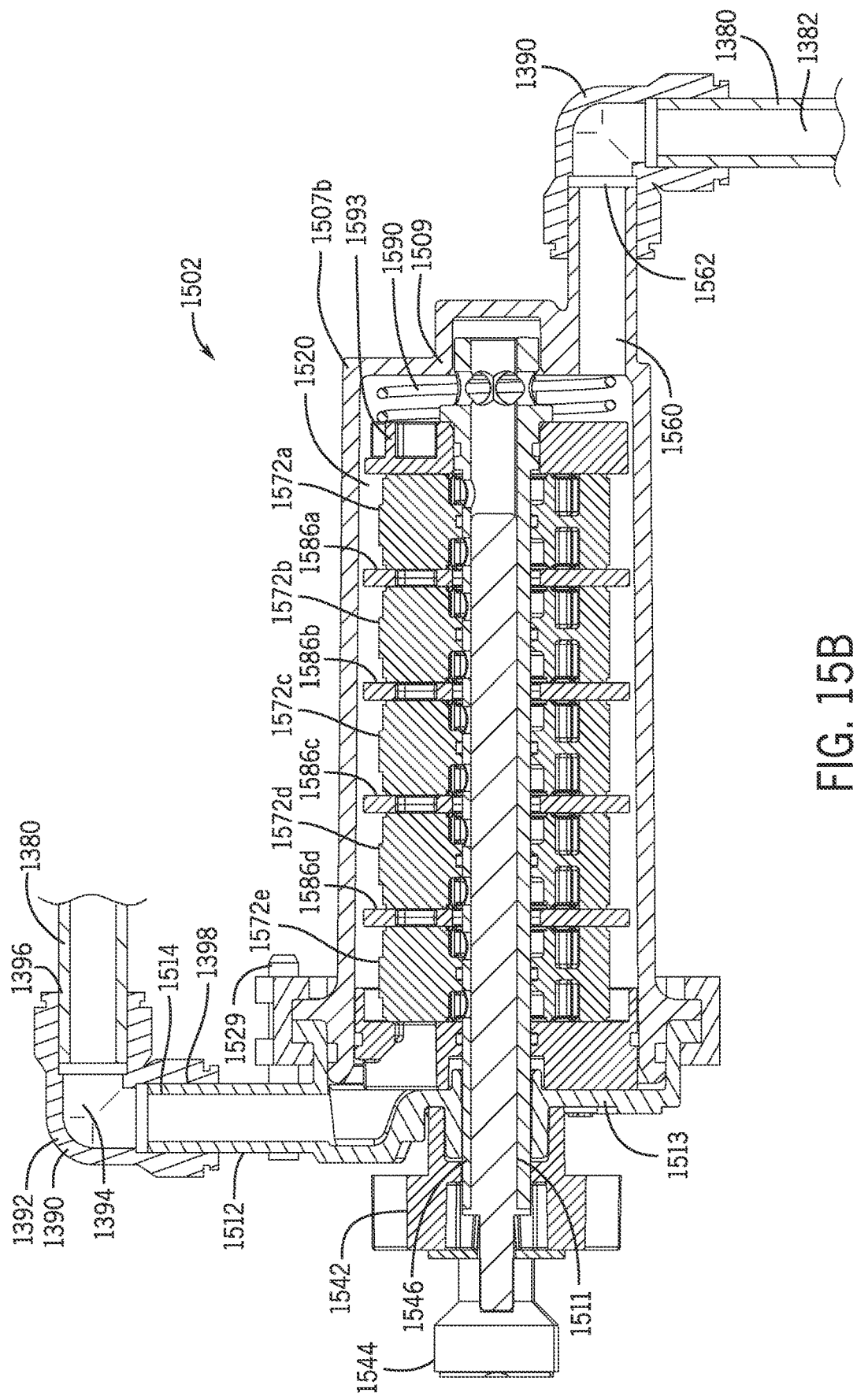
FIG. 15B depicts a cross-sectional view of a foam generating device and conditioning assembly according to implementations of the present disclosure.
Figure 15C:
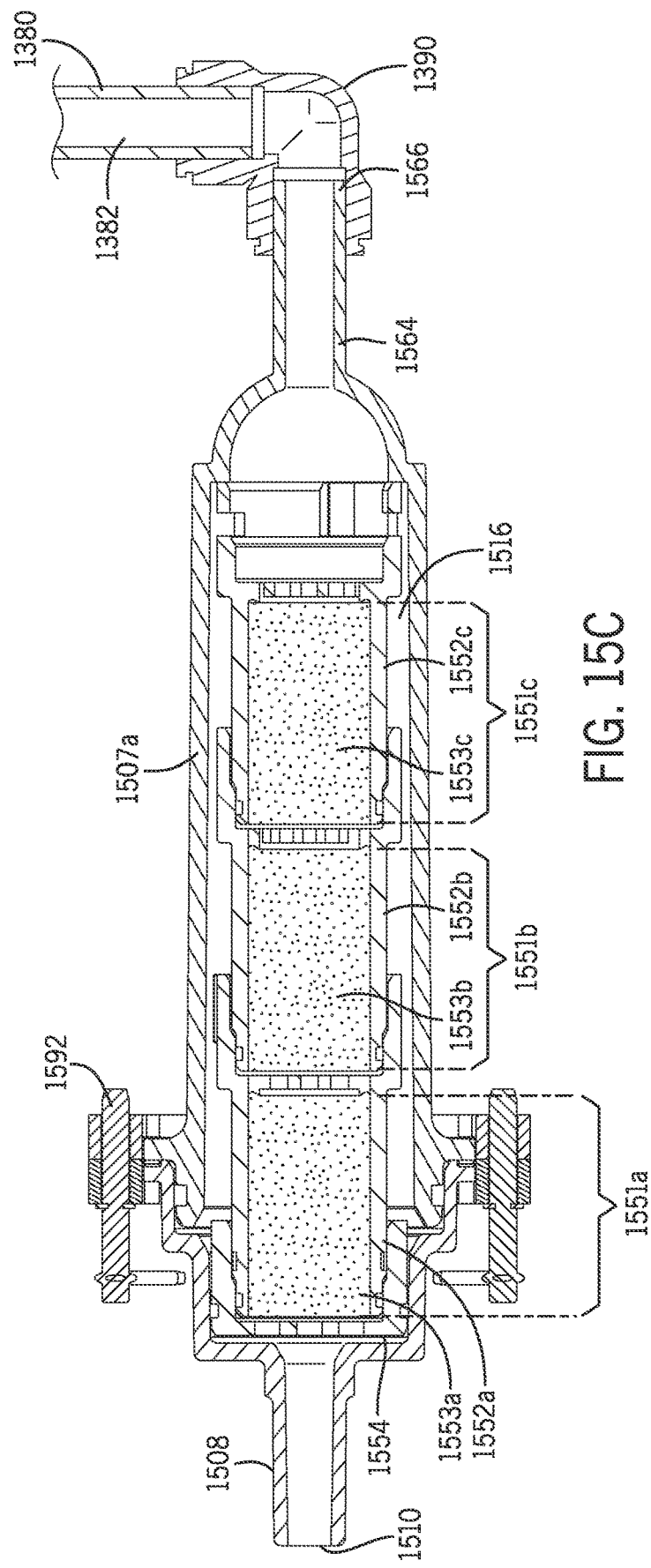
FIG. 15C depicts a cross-sectional view of a foam generating device and agitation chamber according to implementations of the present disclosure.

With reference to FIGS. 15A-15C, an example nozzle assembly 1300 and foam generating device 1502 is depicted. The nozzle assembly 1300 may be substantially analogous to the nozzle assembly 400 described in relation to FIGS. 4, 12, and 13, and include: a nozzle body 1302, a coupling portion 1304, a nozzle body inlet 1306, a cavity 1310, an attachment portion 1314, a nozzle body outlet 1316, a rotor 1322, a first end 1324, a second end 1326, a nozzle coupling 1328, a nozzle body coupling portion 1344, a nozzle seat 1346, a first clamp 1352a, a second clamp 1352b, a nozzle component 1362, a coupling 1364, a tip 1366, and an internal channel 1368; redundant explanation of which is omitted here for clarity.

Notwithstanding the foregoing similarities, the nozzle assembly 1300 may be configured for remote placement relative to a foam generating device, such as the foam generating device 1502. For example, rather than engage and/or couple with a foam generating device directly, the nozzle assembly 1300 may be coupleable to a respective foam generating device using a series of tubes, conduits, pipes, or the like, which, in turn, are engaged and/or coupled with the foam generating device. As such, the nozzle assembly 1300 may be positioned in a variety of locations (such as at a desired location within a carwash facility), while remaining fluidly coupled to the foam generating device. This may allow the foam generating device to be positioned away from the nozzle assembly 1300 at substantially any appropriate location. Further, physically separating the nozzle assembly 1300 and the foam generating device 1502 (and elements thereof) may facilitate maintenance, for example, by allowing for components to be more readily removed and replaced as needed, including placement at a convenient location within a facility.

In the example of FIG. 15A, to facilitate the foregoing, the nozzle assembly 1300 is shown coupled with a fluid connector 1370. The fluid connector 1370 may be configured to fluidly couple the nozzle assembly 1300 to tubing 1380. For example, the fluid connector 1370 may include a connector body 1372 that defines a connector passageway 1374 therethrough. At a first end of the fluid connector 1370, the connector body 1372 may define a first opening 1376, and at a second end, the connector body 1372 may define a second opening 1378. In operation, the nozzle body inlet 1306 may be fluidly coupled with the first opening 1376. Further, the second opening 1378 may be fluidly coupled with the tubing 1380. The tubing 1380 may define a fluid passage 1382 therethrough that is configured to carry foam and/or other substance through the tubing 1380. In this regard, upon connection of the tubing 1380, the fluid connector 1370, and the nozzle assembly 1300, foam may flow from the tubing 1380 and into the nozzle assembly 1300 for application therefrom.

The nozzle assembly 1300 may be fluidly coupled to a remotely positioned foam generating device, such as the foam generating 1502, via the tubing 1380. With reference to FIGS. 15B and 15C, the foam generating device 1502 may be substantially analogous to the foam generating device described in relation to FIGS. 3-6 and include: an inlet portion 1508, an inlet 1510, a passage 1511, an outlet portion 1512, an outlet 1514, an agitation chamber 1516, a conditioning chamber 1520, securing features 1529, an adjustment knob 1542, a torque knob 1544, a rod 1546, stages of agitation 1551a-1551c, cartridges 1552a-1552c, chambers 1553a-1553c, an end piece 1554, conditioning plates 1586a-1586d, discs 1572a-1572e, and an inlet plate 1593, among other components; redundant explanation of which is omitted here for clarity.

Notwithstanding the foregoing similarities, the foam generating device 1502 may be configured for remote placement from the nozzle assembly 1300, as described above. Additionally, the foam generating device 1502 may have a multi-housing structure in which the agitation chamber 1516 and the conditioning chamber 1520 are defined by separate, fluidly connected housing structures. For example, and as shown in FIG. 15B, the foam generating device 1502 may include a tube portion 1507b that defines a housing for the conditioning assembly 1520. Further, and as shown in FIG. 15C, the foam generating device 1502 may include a tube portion 1507a that defines a housing for the agitation chamber 1516. In this regard, the conditioning chamber 1520 and the agitation chamber 1516 may be arranged remote from one another, as needed based on a particular application.

The conditioning chamber 1520 and the agitation chamber 1516 may be fluidly coupled with one another. To facilitate the foregoing, the tube portion 1507b may define a conditioning assembly inlet portion 1560 and a conditioning assembly inlet 1562. The conditioning assembly inlet 1562 may be configured to receive a flow of fluid or foam for processing by the discs 1572a-1572e of the conditioning assembly 1520 and exit from the foam generating device 1502 at the outlet 1514. Additionally, the tube portion 1507a may define an agitation chamber outlet portion 1564 and an agitation chamber outlet 1566. The agitation chamber outlet 1566 may be configured to expel foam or other fluid therefrom for further processing by the conditioning assembly 1520, which is downstream of the agitation chamber 1516.

It will be appreciated that the tube portion 1507a/agitation chamber 1516, the tube portion 1507b/conditioning assembly 1520, and the nozzle assembly 1300 may be fluidly coupled with one another in any appropriate manner, using any variety of tubes, conduits, seals, mating features, fittings, and so on. For purposes of non-limiting illustration, FIGS. 15B and 15C and show an elbow 1390. The elbow 1390 may be configured to facilitate a coupling with the tube portion 1507a/agitation chamber 1516, the tube portion 1507b/conditioning assembly 1520, and the nozzle assembly 1300 with one another and/or with tubing 13870, as required. The elbow 1390 is shown as being a generally 90° elbow having an elbow body 1392. The elbow body 1392 may define a fluid passage therethrough. At a first end, the elbow body 1392 may define a first opening 1396, and at a second end, the elbow body 1392 may define a second opening 1398.

In operation, and as one illustrative example, the tubing 1380 may be fluidly coupled with the first opening 1396. Further, the outlet portion 1512 may be fluidly coupled with the second opening 1398. In this regard, the conditioning assembly 1520 may generate foam, according to any of the techniques described herein, and cause the generated foam to reach the nozzle assembly 1300. For example, the conditioning assembly 1520 may emit foam from the outlet 1514 and the foam may reach the nozzle assembly 1300 via the elbow 1392. In a similar manner, the tube portion 1507a and the tube portion 1507b may be fluidly coupled with one another by one more of the elbows 1390 and tubings 1380 described herein, and shown in FIGS. 15A and 15B.

The conditioning assembly 1520 further shows a biasing element 1590. The biasing element 1590 may be a helical spring, although substantially any type of mechanical biasing element may be used. The biasing element 1590 is disposed with the tube portion 1507b between the inlet plate 1593 and a rear wall 1509 of the tube portion 1507b. The biasing element 1590 is shown in FIG. 15B in a compressed or partially-compressed state. In this regard, the biasing element 1590 may be configured or arranged to be biased toward expansion and thus exert a force on both the inlet plate 1593 and the rear wall 1509. As such, the biasing element 1590 may exert a force generally on the conditioning plates 1586a-1586d and the discs 1572a-1572e, and encourage the conditioning plates 1586a-1586d and the discs 1572a-1572e toward a forward wall 1513 of the tube portion 1507b. Encouraging the conditioning plates 1586a-1586d and the discs 1572a-1572e toward the forward wall 1513 may compress the conditioning plates 1586a-1586d and the discs 1572a-1572e relative to one another, which may generally cause the foam to travel along the intended tortuous path defined therebetween (e.g., and generally prevent the foam from seeping out from the tortuous path). In some cases, the conditioning plates 1586a-1586d and the discs 1572a-1572e may be unseated from on another (e.g., to facilitate adjusting the tortuous path length) by pressing the rod 1546 inward and further compressing the biasing element 1590 with the inlet plate 1593.

Figure 17:
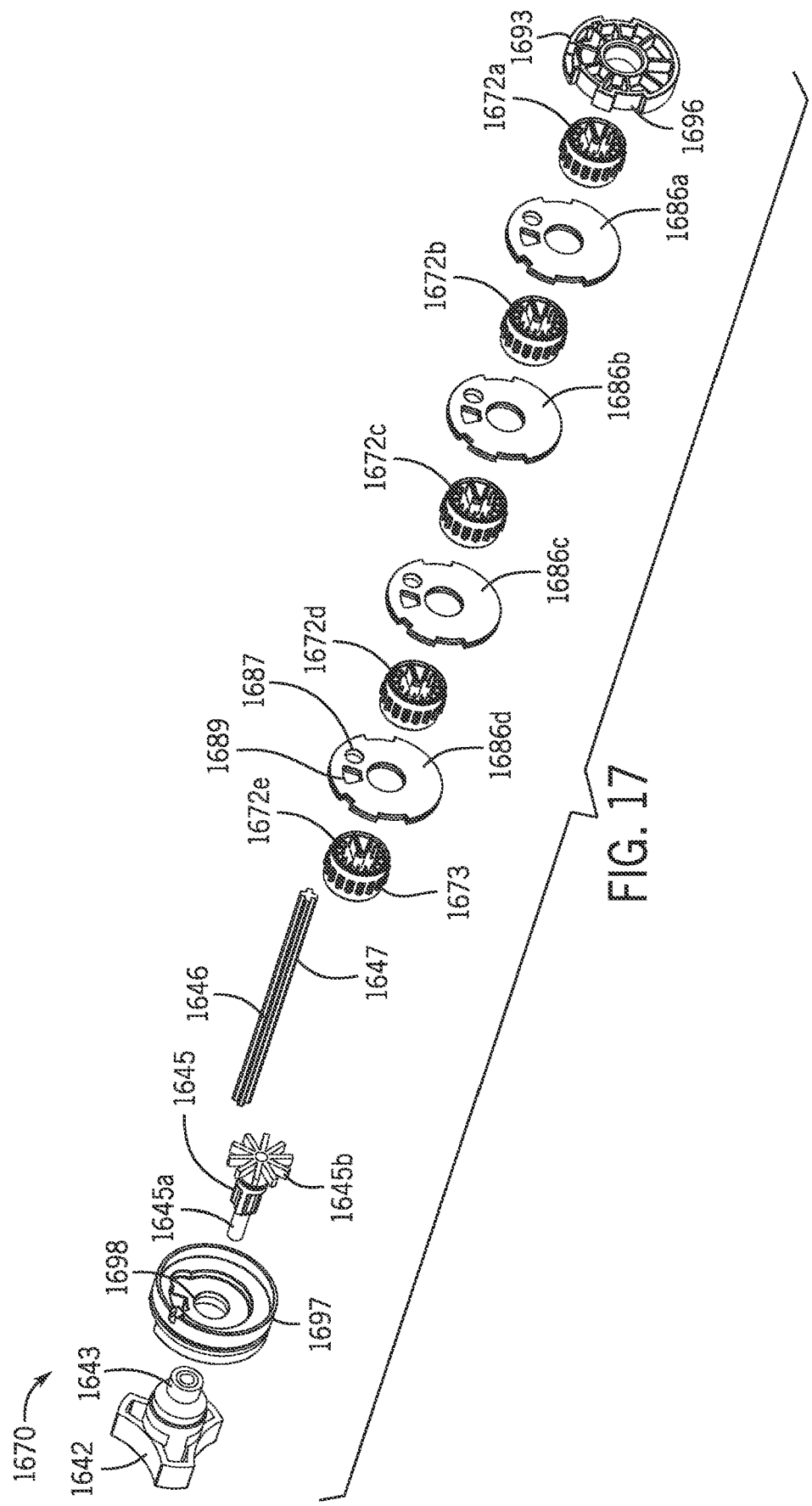
FIG. 17 depicts an exploded view of the conditioning assembly of FIG. 16.

With reference to FIGS. 16 and 17, a conditioning assembly 1670 is depicted according to implementations of the present disclosure. The conditioning assembly 1670 may be substantially analogous to the conditioning assembly 370 described in relation to FIGS. 9A-10B, and include: an adjustment knob 1642, an opening 1643, a rod 1646, ridges 1647, discs 1672a-1672e, plates 1686a-1686d, a fluid opening 1689, an inlet plate 1693, attachment features 1696, an outlet plate 1697, and an axial opening 1698, among other features; redundant explanation of which is omitted here for clarity.

Notwithstanding the foregoing similarities, the rod 1646 of the conditioning assembly 1670 may be arranged off-axis. For example, the rod 1646 may be arranged offset from a longitudinal axis of the conditioning assembly 1670. The adjustment knob 1642 may be configured to rotate the rod 1646 and cause a corresponding rotation of the discs 1672a-1672e relative to the plates 1686a-1686d using a series of gear-type features, and thereby correspondingly change a length of the tortuous path. To facilitate the foregoing, the conditioning assembly 1670 may include a gear shaft 1645. The gear shaft 1645, as shown in FIG. 17, may generally be arranged along the longitudinal axis of the conditioning assembly 1670. The gear shaft 1670 may include a knob engagement end 1645a that extends along the longitudinal axis. The knob engagement end 1645a may be received by the opening 1643 of the adjustment knob 1642, and engaged therewith such that rotation of the adjustment knob 1642 causes a corresponding rotation of the gear shaft 1645. The gear shaft 1645 may further include a rod engagement end 1645b opposite the knob engagement end 1645a. The rod engagement end 1645b may be a fan-type structure that is configured to mate with the rod 1646. For example, the rod engagement end 1645b may be configured such that the rod 1645 may be engaged with adjacent fan structures or blades of the rod engagement end 1645 and positioned off-axis from the longitudinal axis of the conditioning assembly 1670. Upon rotation of the gear shaft 1645, the fan structures of the rod engagement end 1645b may mesh with the ridges 1647 of the rod 1646 and cause a corresponding rotation of the rod 1646. The rod 1646, in the example of FIG. 17, may therefore rotate about a longitudinal axis of the rod 1646 which is maintained off-axis from the longitudinal axis of the conditioning assembly 1670.

As shown in FIGS. 16 and 17, each of the discs 1686a-1686d may include a rod engagement slot 1687. The rod engagement slot 1687 may be off-axis or offset from the longitudinal axis of the conditioning assembly 1670. The conditioning assembly 1670 may be coupled such that the rod 1646 extends through each of the rod engagement slots 1687 of the discs 1686a-1686d. Additionally, each of the interposed discs 1672a-1672e may include circumferentially spaced ridges 1673 about an outer periphery of the respective disc. In operation, the rod 1646 may rotate about a longitudinal axis of the rod 1646 as described above. The rod 1646 may be prevented from rotating about a longitudinal axis of the conditioning assembly 1670 due to the engagement of the rod 1646 with the rod engagement slots 1687, which are positionally fixed. Upon rotation of the rod 1646, the ridges 1647 of the rod 1646 may mesh with the circumferentially spaced ridges 1673 of the discs 1672a-1672e, and cause the discs 1672a-1672e to rotate relative to the interposed plates 1686a-1686d. In this regard, the length of the tortuous path of the conditioning assembly 1670 may be adjusted using the rod 1646 that is arranged off-axis.

Figure 18:
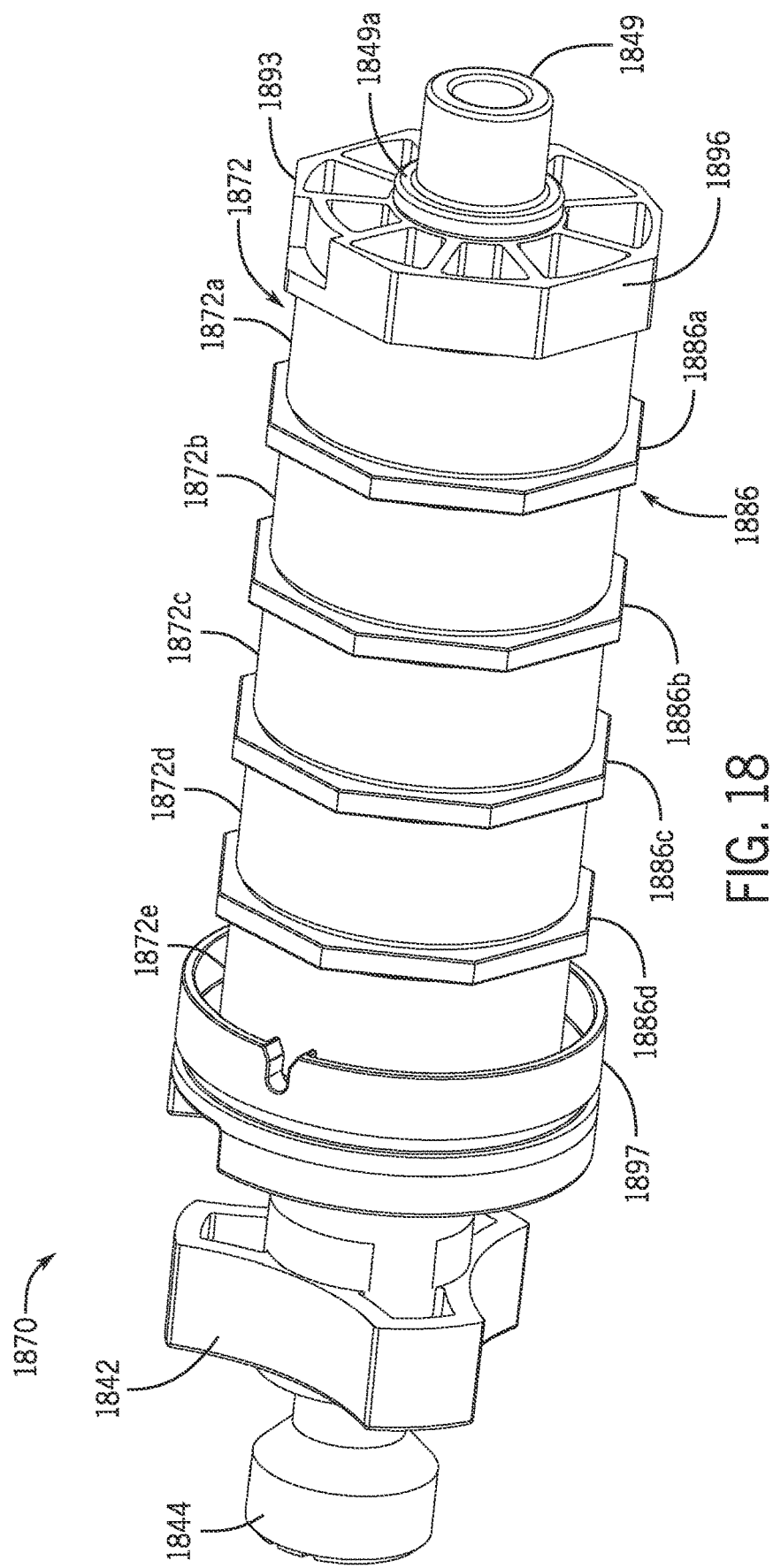
FIG. 18 depicts a conditioning assembly according to implementations of the present disclosure.
Figure 19:
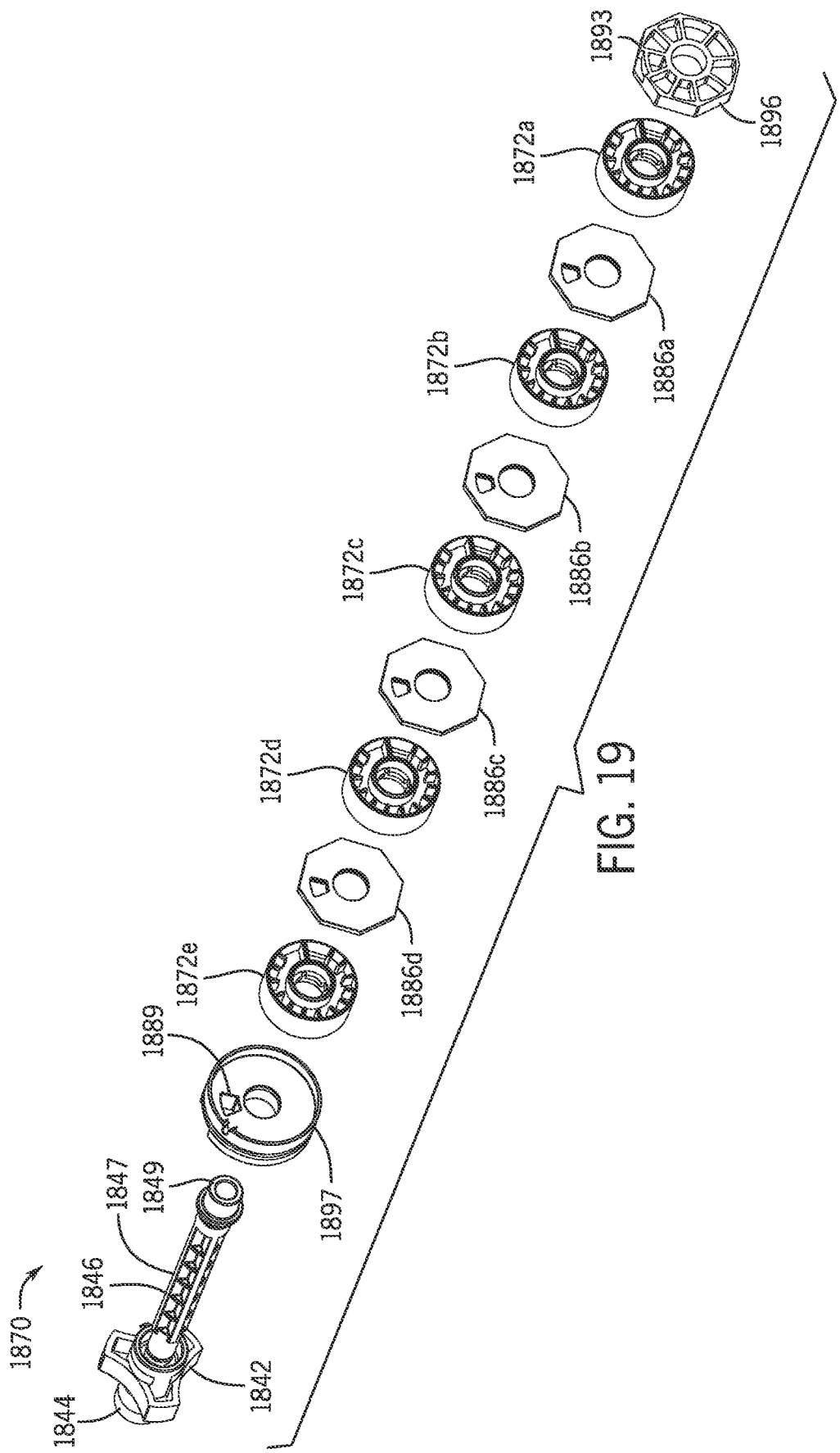
FIG. 19 depicts an exploded view of the conditioning assembly of FIG. 18.

With reference to FIGS. 18 and 19, a conditioning assembly 1870 is depicted according to implementations of the present disclosure. The conditioning assembly 1870 may be substantially analogous to the conditioning assembly 370 described in relation to FIGS. 9A-10B, and include: an adjustment knob 1842, a torque knob 1844, a rod 1846, ridges 1847, a free end 1849, discs 1872a-1872e, plates 1886a-1886d, a fluid opening 1889, an inlet plate 1893, attachment features 1896, and an outlet plate 1897, among other components; redundant explanation of which is omitted here for clarity.

Notwithstanding the foregoing similarities, the plates 1886a-1886d are shown as having six sides. As described herein, the various plates of the conditioning assembly 1870 may be formed with substantially any shape, as appropriate for a given application. In the example of FIGS. 18 and 19, the plates 1886a-1886d are shown as being a generally hexagonal shape. For example, the each of the plates 1886a-1886d may have six discrete sides or edges that meet with an adjacent side or edge or at a point or corner. While six such sides are shown in the example of FIG. 19, other numbers of sides may be appropriate such as, without limitation, a polygon (e.g., 3, 4, 5, 6, 7, 8, 9, 10, 12, 14, 16, 18, 20, 22, 24, 26, 28-sided polygon), among other shapes.

Figure 20:
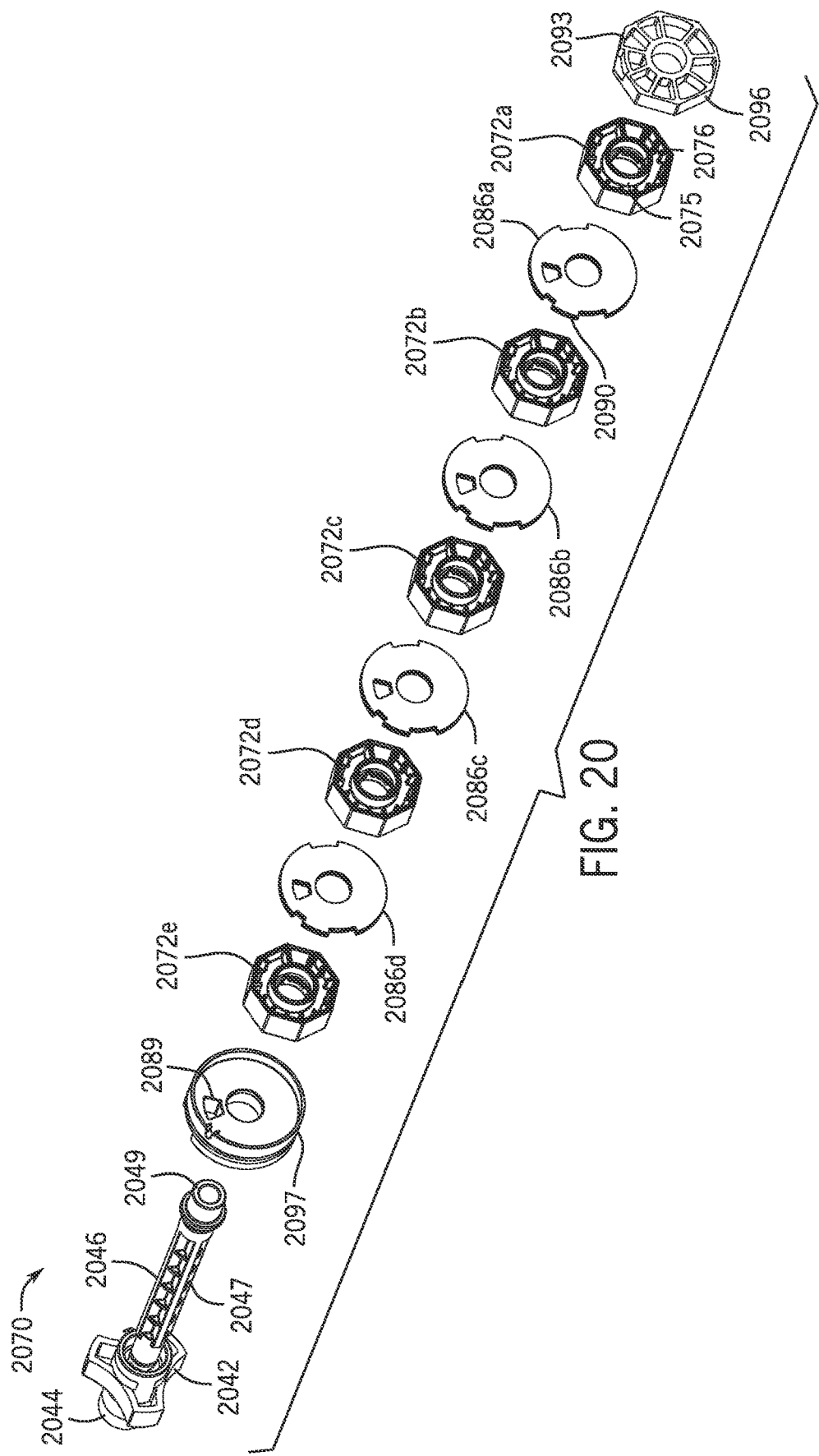
FIG. 20 depicts an exploded view of a conditioning assembly according to implementations of the present disclosure.

With reference to FIG. 20, a conditioning assembly 2070 is depicted according to implementations of the present disclosure. The conditioning assembly 2070 may be substantially analogous to the conditioning assembly 370 described in relation to FIGS. 9A-10B, and include: an adjustment knob 2042, a torque knob 2044, a rod 2046, ridges 2047, a free end 2049, discs 2072a-2072e, plates 2086a-2086d, a fluid opening 2089, an inlet plate 2093, attachment features 2096, and an outlet plate 2097, among other component; redundant explanation of which is omitted here for clarity.

Notwithstanding the foregoing similarities, the discs 2072a-2072e are shown as having eight sides. As described herein, the various discs of the conditioning assembly 1870 may be formed with substantially any shape, as appropriate for a given application. In the example of FIG. 20, the discs 2072a-2072e are shown as being a generally octagonal shape. For example, the each of the discs 2072a-2072e may have eight discrete sides or edges that meet with an adjacent side or edge or at a point or corner. While eight such sides are shown in the example of FIG. 20, other numbers of sides may be appropriate such as, without limitation, a polygon (e.g., 3, 4, 5, 6, 7, 8, 9, 10, 12, 14, 16, 18, 20, 22, 24, 26, 28-sided polygon), among other shapes.

Figure 21:
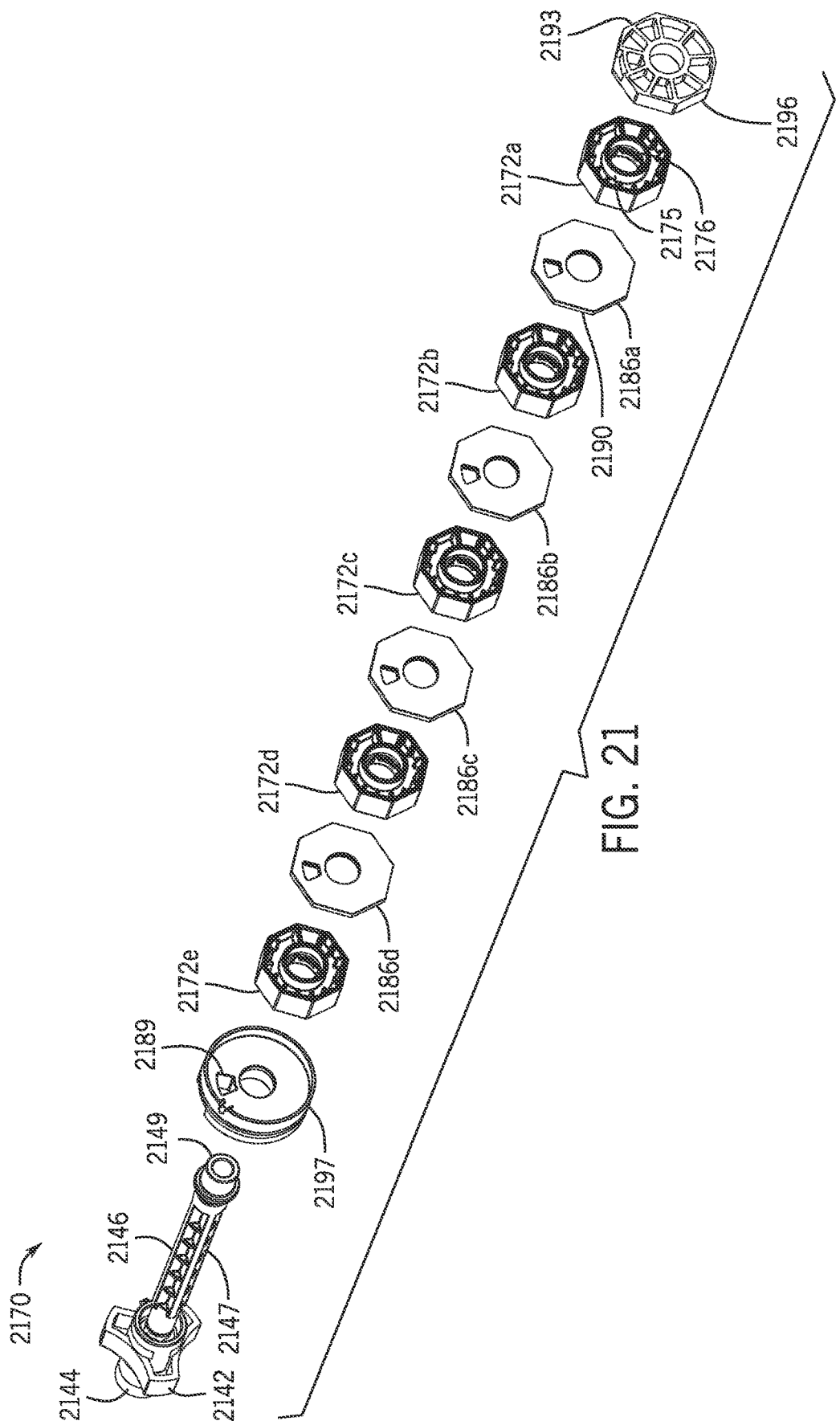
FIG. 21 depicts an exploded view of a conditioning assembly according to implementations of the present disclosure.

With reference to FIG. 21, a conditioning assembly 2170 is depicted according to implementations of the present disclosure. The conditioning assembly 2170 may be substantially analogous to the conditioning assembly 370 described in relation to FIGS. 9A-10B, and include: an adjustment knob 2142, a torque knob 2144, a rod 2146, ridges 2147, a free end 2149, discs 2172a-2172e, plates 2186a-2186d, a fluid opening 2189, an inlet plate 2193, attachment features 2196, and an outlet plate 2197, among other components; redundant explanation of which is omitted here for clarity.

Notwithstanding the foregoing similarities, the plates 2186a-2186d are shown as having six sides, for example, as described above in relation to FIG. 19. Further, the discs 2172a-2172e are shown as having eight sides, for example, as described above in relation to FIG. 20. In this regard, both the plates 2186a-2186d and the discs 2172a-2172e may be formed with substantially any shape, including shapes that differ from one another, as illustrated in FIG. 21.

Figure 22:
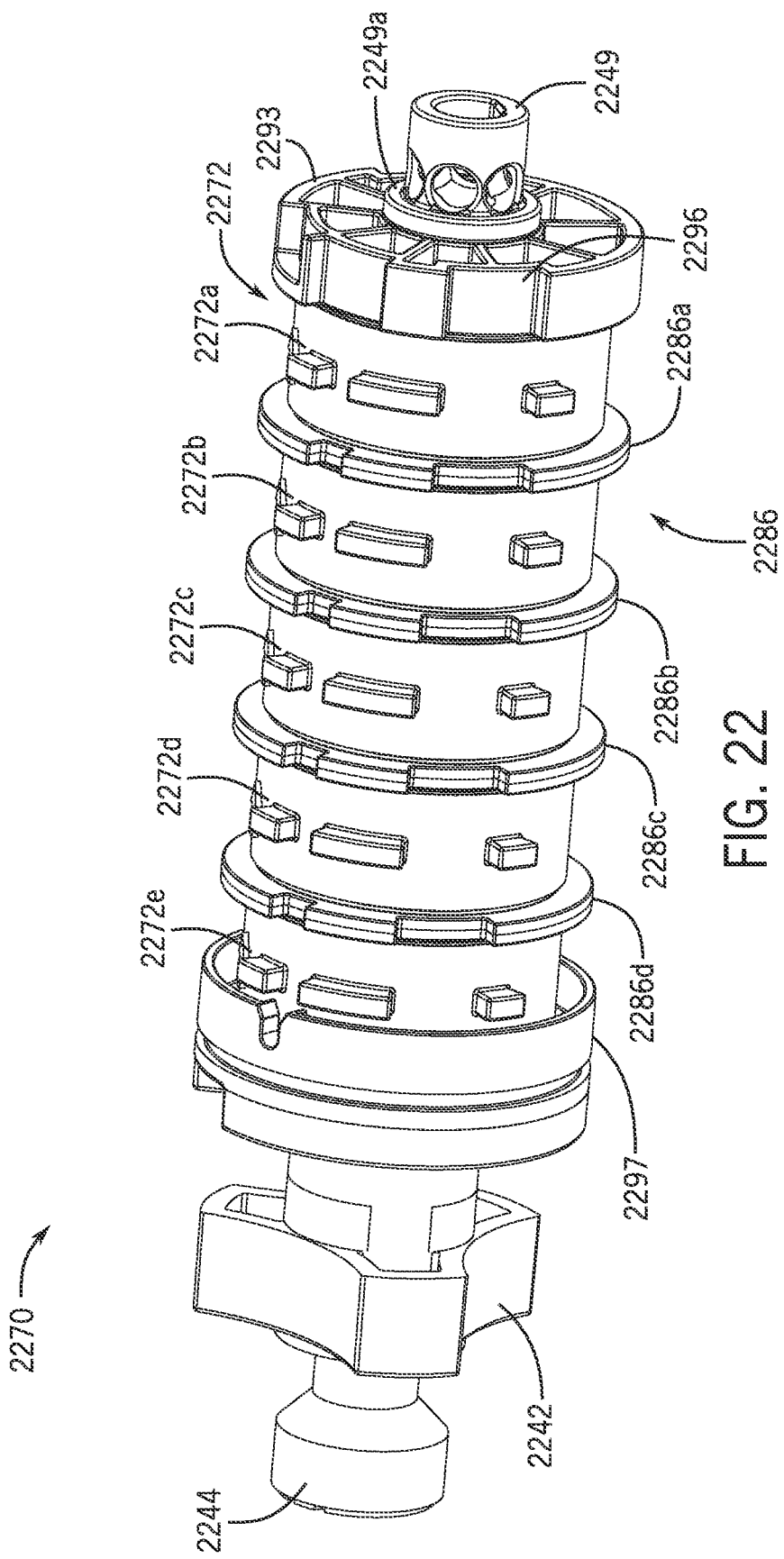
FIG. 22 depicts a conditioning assembly of according to implementations of the present disclosure.
Figure 23:
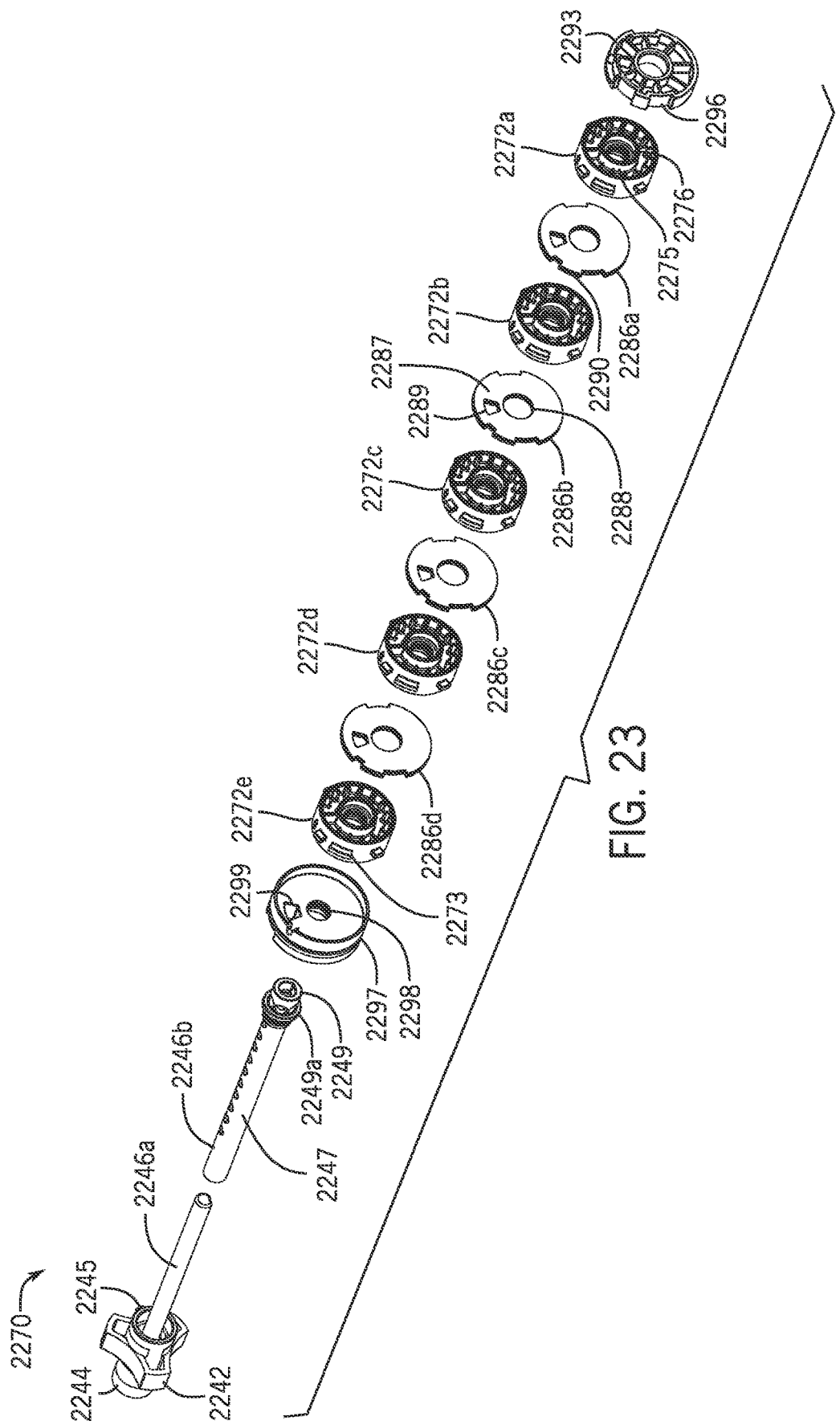
FIG. 23 depicts an exploded view of the conditioning assembly of FIG. 22.

With reference to FIGS. 22 and 23, a conditioning assembly 2270 is depicted according to implementations of the present disclosure. The conditioning assembly 2270 may be substantially analogous to the conditioning assembly 370 described in relation to FIGS. 9A-10B, and include: an adjustment knob 2242, a torque knob 2244, discs 2272a-2272e, an axial opening 2275, plates 2286a-2286d, an axial opening 2288, a body portion 2287, a fluid opening 2289, attachment features 2290, an inlet plate 2293, attachment features 2296, an outlet plate 2297, an axial opening 2298, and a fluid opening 2299, among other features; redundant explanation of which is omitted here for clarity.

Notwithstanding the foregoing similarities, the conditioning assembly 2270 may be configured to adjust a length of a tortuous path of the conditioning assembly by moving the torque knob 2244 generally linearly along a longitudinal axis of the conditioning assembly 2270. Generally, the length of the tortuous path may decrease as the torque knob 2244 is increasingly pulled out or away from the discs 2272a-2272e, and may increase as the torque knob 2244 is increasingly pushed in toward the discs 2272a-2272e. To facilitate the foregoing functionality, the conditioning assembly 2270 may include an inner rod 2246a and an outer rod 2246b. The inner rod 2246a may be an elongated structure that is coupled to the torque knob 2244. The outer rod 2246b may be a sleeve or cylindrical structure that is generally configured to receive the inner rod 2246b therein. The outer rod 2246b may be configured to receive the inner rod 2246a such that the inner rod 2246a generally conforms or matches a contour of a tube volume or passage 2211 (FIG. 24) defined by the outer rod 2246b. The outer rod 2246 may include a series of rod holes 2247. The series of rod holes 2247 may be arranged generally serially along a longitudinal axis of the outer rod 2246b and extend into the passage 2211 of the outer rod 2246b. The outer rod 2246b may further include a free end 2249 positioned opposite the torque knob 2244. The outer rod 2246b may further include a series of rod inlet holes 2249a at the free end 2249. In the example of FIG. 23, the rod inlet holes 2249a are disposed circumferentially about the free end 2249 and extend into the passage 2211 the outer rod 2246b. Further, the example of FIGS. 22 and 23 shows the discs 2272a-2272e as having lock ridges 2273. The lock ridges 2273 may help secure the discs 2272a-2272e within a housing of a foam generating device.

The conditioning assembly 2270 may be coupled substantially analogously to the conditioning assembly 370. For example, the inner rod 2246a and the outer rod 2246b may be received by each of the discs 2272a-2272e and the plates 2286a-2286d. With reference to the example of FIG. 23, the outer rod 2246b may be received by each of the respective axial openings 2275, 2288 such that the free end 2249 protrudes from and is retained against the inlet plate 2293. The free end 2249 may protrude from the inlet plate 2293 such that the rod inlet holes 2249a are exposed outside of the inlet plate 2293. Fluid and/or foam may therefore enter the conditioning assembly 2270 via the rod inlet holes 2249a.

Figure 24:
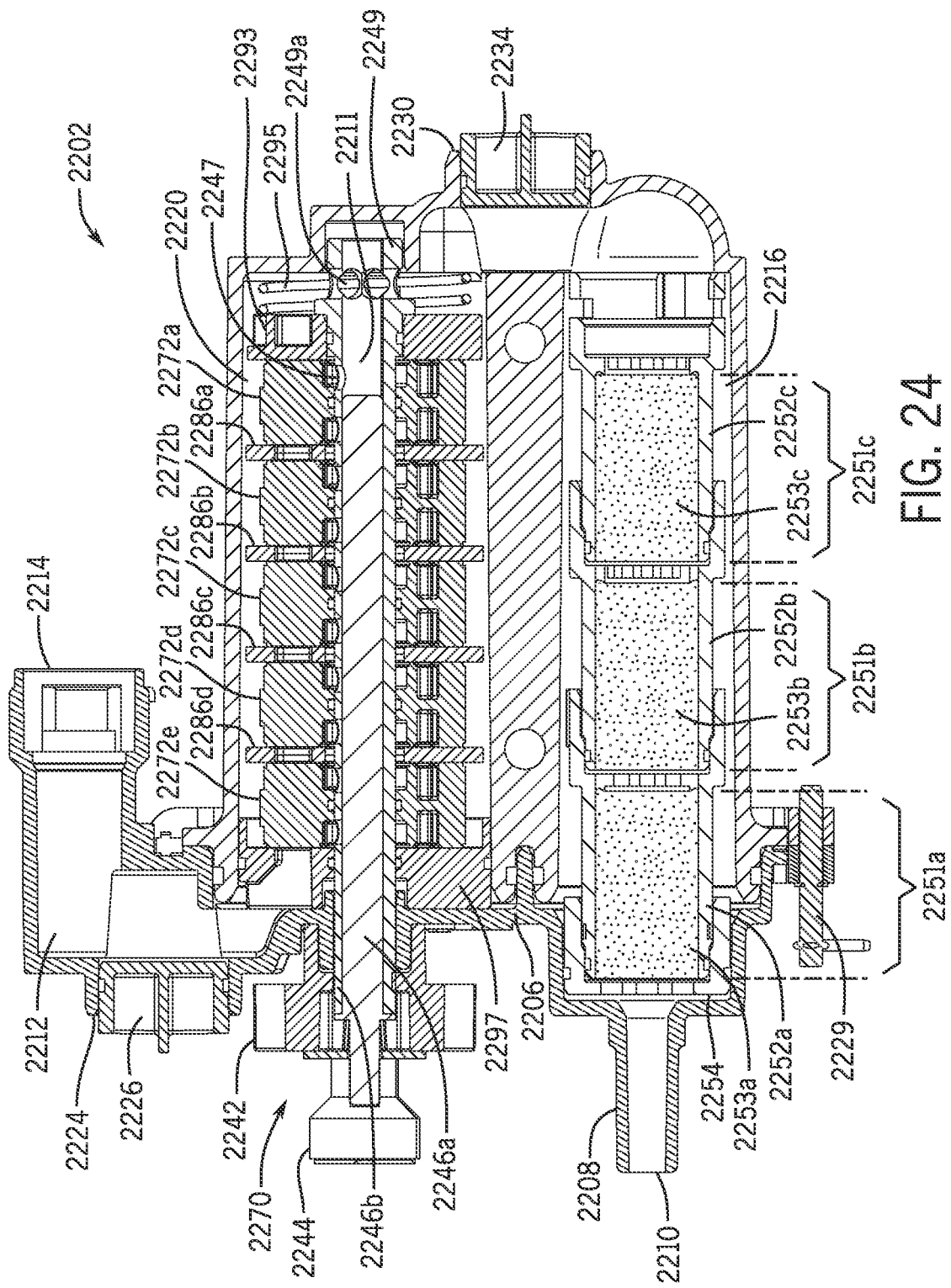
FIG. 24 depicts a cross-sectional view of a foam generating device in a first configuration according to implementations of the present disclosure.
Figure 25:
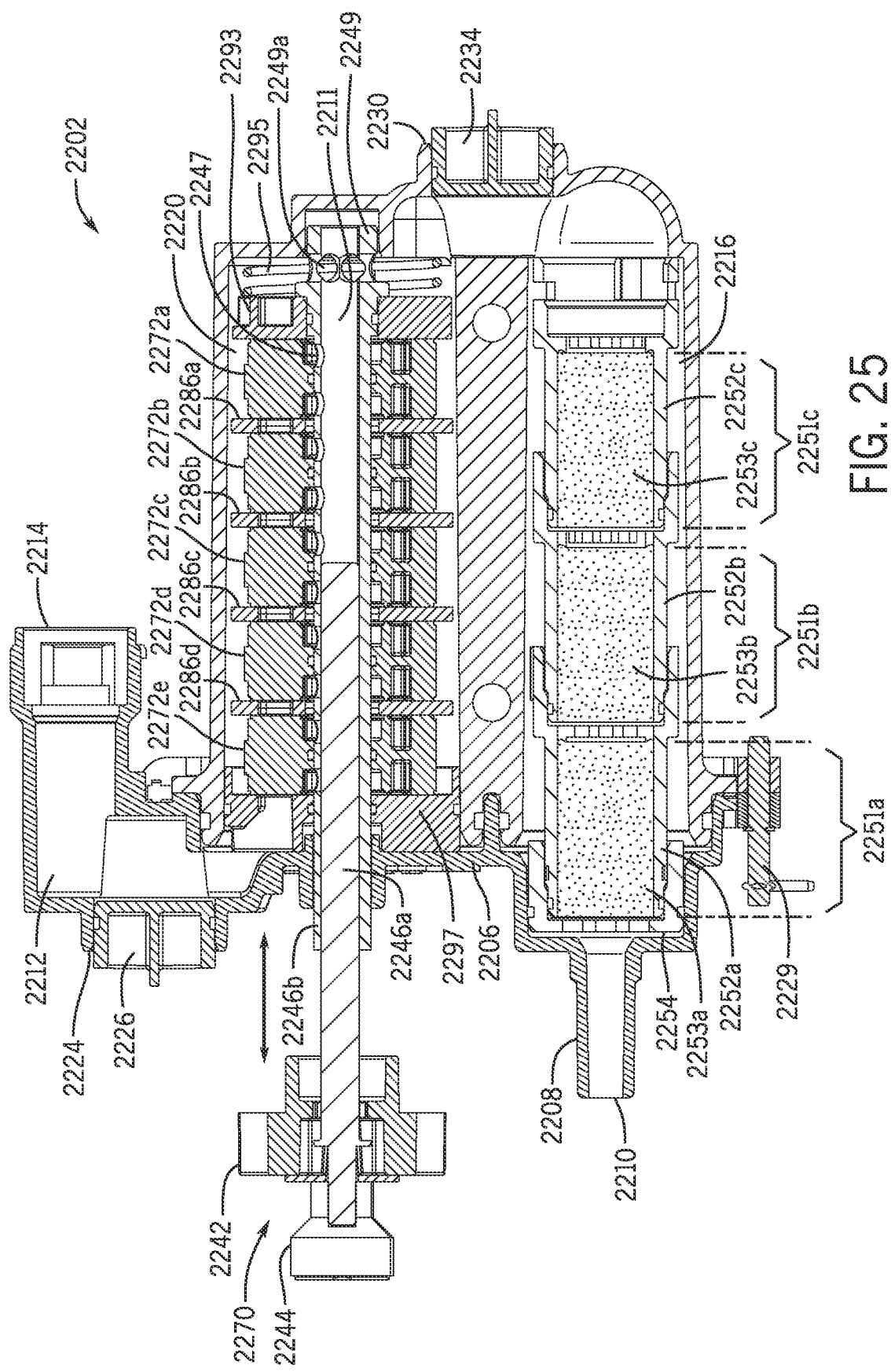
FIG. 25 depicts a cross-sectional view of the foam generating device of FIG. 24 in a second configuration.

In operation, and with reference to FIGS. 24 and 25, the conditioning assembly 2270 may be used with a foam generating device 2202. The conditioning assembly 2270 may be used to adjust a length of the tortuous path by pushing and/or pulling the adjustment knob 2242/the torque knob 2244 without necessarily requiring a rotation of either component, as described below. For purposes of illustration the conditioning assembly 2270 is shown with the foam generating device 2202 that may be substantially analogous to the foam generating device 370 described in relation to FIGS. 3-6 and include: a housing 2206, an inlet portion 2208, an inlet 2210, a passage 2211, an outlet portion 2212, an outlet 2214, an agitation chamber 2216, a conditioning chamber 2220, a clean out 2224, a plug 2226, securing features 2229, a clean out 2230, a plug 2234, stages of agitation 2251a-2251c, cartridges 2252a-2252c, chambers 2253a-2253c, an end piece 2254, conditioning plates 2286a-2286d, discs 2272a-2272e, and an inlet plate 2293, among other components; redundant explanation of which is omitted here for clarity.

FIG. 24 shows the foam generating device 2202 and the conditioning assembly 2270 in a first configuration. As shown in FIG. 24, the adjustment knob 2242/the torque knob 2244 may be arranged pushed toward the housing 2206. In turn, the inner rod 2246a may extend into the outer rod 2246b and occupy a substantial majority of the passage 2211. As shown in FIG. 24, the inner rod 2246a may fit in and generally match an interior contour of the outer rod 2246b. Accordingly, where the inner rod 2246a is received in the outer rod 2246b, the inner rod 2246a may block adjacent ones of the rod holes 2247. FIG. 24 shows the inner rod 2246a advanced into the outer rod 2246b such that that substantial majority of the rod holes 2247 are blocked by the inner rod 2246, with the rod hole 2247 closest to the conditioning assembly 2270 inlet remaining unblocked or exposed. In operation, the conditioning assembly 2270 may receive foam and/or other liquid from the agitation chamber 2216 according to any of the techniques described herein. In the example of FIG. 24, the foam may enter the conditioning assembly 2270 via the rod inlet holes 2249a, and subsequently flow into the passage 2211. Next, the foam may enter the tortuous path, starting with the first disc 2272a via the unblocked one of the rod holes 2247. Because the inner rod 2246a blocks the remaining rod holes 2247, foam is forced to traverse substantially the entire tortuous path as defined by the conditioning plates 2286a-2286d and discs 2272a-2272e, according to the techniques described herein.

The configuration of FIG. 24 may therefore be configured to define a maximum length of the tortuous path, for example, as the tortuous path is defined generally by all of the conditioning plates 2286a-2286d and discs 2272a-2272e. The length of the tortuous path may be adjusted from the configuration of FIG. 24 by pulling the torque knob 2244 axially out and away from the housing 2206. Pulling the torque knob 2244 away from the housing 2206 may correspondingly cause the inner rod 2246a to move out from the housing 2206. As the inner rod 2246a is moved out from housing 2206, the inner rod 2246a may slide relative to the outer rod 2246b and gradually expose more rod holes 2247. As the rod holes 2247 are increasingly exposed or unblocked, the length of the tortuous path may decrease. For example, and as shown in FIG. 25, a second configuration is shown in which the inner rod 2249a is partially pulled out from the outer rod 2249b, and as such, rod holes 2247 adjacent the discs 2272a-2272c are exposed. In this regard, unlike the first configuration in which the foam was forced to enter the tortuous path at the first disc 2272a, the foam may instead travel through the passage 2211 until reaching the third disc 2272c, at which the foam enters the tortuous path. The tortuous path in the second configuration of FIG. 25 may therefore be defined by the discs 2272c-2272e and plates 2286c and 2286d. Moving the inner rod 2246a outward effectively allows the foam to bypass the initial discs, and thereby shorten the tortuous path.

Other examples and implementations are within the scope and spirit of the disclosure and appended claims. For example, features implementing functions may also be physically located at various positions, including being distributed such that portions of functions are implemented at different physical locations. Further, while example shapes and sizes of various components are depicted herein for purposes of illustration, other shapes and sizes of said components are contemplated with the scope of the present disclosure. As one example, the discs and plates of the conditioning assembly 370 are shown as having a generally cylindrical shape or periphery. In other examples, the discs and plates may have other shapes and outer peripheries without departing from the scope of the conditioning assembly 370 described herein, including without limitation multi-sided shapes, faceted shapes, irregular shapes, and so on. Example shapes include, without limitation, oval, hexagon, polygon (e.g., 3, 4, 5, 6, 7, 8, 9, 10, 12, 14, 16, 18, 20, 22, 24, 26, 28-sided polygon), among other shapes. Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A foam generating device, comprising:
   a housing;
   a cartridge assembly received by the housing, the cartridge assembly configured to receive a solution and define an agitation flow path of the solution through a plurality of stages of agitation media, thereby increasing a quantity of a gas in the solution to produce an agitated solution; and
   a conditioning assembly received by the housing and configured to receive the agitated solution from the cartridge assembly, the conditioning assembly defining an adjustable tortuous flow path comprising a plurality of cylindrical discs configured to sequentially receive the solution, each of the discs defining a plurality of radial ribs on a first side and on a second side opposite the first side, the first and second sides separated by a floor, and a disc passage defined in the floor, wherein the conditioning assembly is adjustable such that in a first position of the conditioning assembly, the tortuous flow path comprises a first quantity of radial ribs of the plurality of the radial ribs such that the agitated solution travels along each of the first and second sides of the plurality of discs and is obstructed by the first quantity of the plurality of radial ribs during travel thereby defining a first tortuous flow path length, wherein in a second position of the conditioning assembly, the tortuous flow path comprises a second quantity of the plurality of the radial ribs different from the first quantity such that the solution travels along each of the first and second sides of the plurality of discs and is obstructed by the second quantity of the plurality of ribs during travel thereby defining a second tortuous flow path length different from the first tortuous flow path length, and wherein the quantity of gas in the solution exiting the first tortuous flow path or the second tortuous flow path is increased relative to the to the quantity of gas in the agitated solution.

2. The foam generator device of claim 1, wherein the conditioning assembly is rotatable to adjust the conditioning assembly from the first position to the second position.

3. The foam generator device of claim 2, wherein the second quantity of radial ribs is greater than the first quantity of radial ribs such that rotation to the second position increases the quantity of gas in the solution relative to the first position.

4. The foam generator device of claim 1, wherein the conditioning assembly further comprises a plurality of control plates interposed with the plurality of cylindrical discs, each control plate having a plate passage, wherein the solution travels through a plate passage of one of the plurality of control plates after traveling along the second side of the cylindrical disc.

5. The foam generator device of claim 4, further comprising a rod rotatable relative to the housing and configured to move the conditioning assembly from the first position to the second position, wherein the rod is engaged with either the cylindrical discs or the control plates and the other of the cylindrical discs or the control plates are fixed relative to the housing such that rotation of the rod rotates the cylindrical discs or control plates relative to the housing and the other of the cylindrical discs or the control plates.

6. The foam generator device of claim 5, wherein rotation of the rod causes one of a plurality of disc passages of the cylindrical discs or a plurality of plate passages of the control plates to rotate relative to the other such that alignment of one or more of the disc passages with one or more of the plate passages reduces the tortuous flow path length.

7. The foam generator device of claim 1, wherein the cartridge assembly comprises a plurality of cartridges, the plurality of cartridges comprising a first cartridge having a first agitation media holding chamber and a grate adjacent the first agitation media holding chamber, the grate being configured to permit a flow of solution therethrough while restraining the passage of the first agitation media, and a second cartridge, sealingly engaged with the first cartridge, and having a second agitation media holding chamber adjacent the grate opposite the first agitation media holding chamber.

8. The foam generator device of claim 7, wherein one or both of the first cartridge or the second cartridge comprises an annular lip configured to impede a flow or buildup of gas along an outer portion of the first agitation media holding chamber.

9. A foam generating system, comprising:
the foam generating device of claim 1, and
a nozzle assembly removably coupled to the foam generating device,
wherein the nozzle assembly is configured to receive the foam produced by the foam generating device and spray the foam away from the foam generating device and towards a target.

10. A foam generating device, comprising:
a housing;
a cartridge assembly received by the housing, the cartridge assembly configured to receive a solution and define an agitation flow path of the solution through a plurality of stages of agitation media, thereby increasing a quantity of a gas in the solution to produce an agitated solution; and
a conditioning assembly received by a conditioning chamber of the housing and configured to receive agitated solution from the cartridge assembly, the conditioning assembly comprising
a plurality of first members, each of the plurality of first members having a plurality of obstructions and a first member passage;
a plurality of second members interposed with the plurality of first members, each of the second members having a second member passage; and
an adjustable member engaged with the plurality of first members and the plurality of second members, and configured to move the plurality of first members relative to the plurality of second members,
wherein in a first configuration of the adjustable member, the first member passages of the plurality of first members and the second member passages of the plurality of second members define a conditioning flow path having a first length through the conditioning assembly that spans a first subset of obstructions of the plurality of obstructions, and
wherein in a second configuration of the adjustable member, the plurality of first members is rotated such that the first member passages of the plurality of first members and the second members passages of the plurality of second members are misaligned and define the conditioning flow path having a second length through the conditioning assembly that spans a second subset of obstructions of the plurality of obstructions.

11. The foam generating device of claim 10, wherein the plurality of obstructions comprises ribs.

12. The foam generating device of claim 10, wherein the adjustable member is configured to adjust a position of at least two of the plurality of first members within the conditioning chamber and alter the conditioning flow path without altering a length of the foam generating device.

13. The foam generating device of claim 10, wherein each first member includes:
a disc-shaped portion arranged radially from the adjustable member, and
a rim portion connected to an end of the disc-shaped portion and extending perpendicularly from opposing sides of the disc-shaped portion, and
each second member defines a face configured for seating an end of the rim portion of an adjacent first member and defining a portion of the conditioning flow path with the adjacent first member.

14. The foam generating device of claim 10, wherein the plurality of first members are rotationally fixed relative to the housing.

15. The foam generating device of claim 10, wherein the plurality of first members and the interposed plurality of second members are compressed relative to one another in the first configuration or the second configuration such that seals are defined between adjacent pairs of the first members and the second members.

* * * * *